(12) United States Patent
Hayashida et al.

(10) Patent No.: US 6,268,084 B1
(45) Date of Patent: Jul. 31, 2001

(54) HYDROGEN-ABSORBING ALLOY AND SECONDARY BATTERY

(75) Inventors: Hirotaka Hayashida, Fujisawa; Masaaki Yamamoto, Inzai; Hiroshi Kitayama, Fujisawa; Shusuke Inada; Isao Sakai, both of Yokohama; Tatsuoki Kono, Kawasaki; Hideki Yoshida, Yokohama; Takamichi Inaba, Yokohama; Motoya Kanda, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/475,037

(22) Filed: Dec. 30, 1999

Related U.S. Application Data

(63) Continuation-in-part of application No. 09/200,464, filed on Nov. 27, 1998.

(30) Foreign Application Priority Data

| Nov. 28, 1997 | (JP) | 9-329213 |
| Nov. 28, 1997 | (JP) | 9-329214 |
| Nov. 28, 1997 | (JP) | 9-329216 |

(51) Int. Cl.$^7$ .................................... H01M 4/58
(52) U.S. Cl. ............... 429/218.2; 423/644; 420/900
(58) Field of Search .............. 429/218.2; 420/900, 420/416, 422, 421; 423/644

(56) References Cited

U.S. PATENT DOCUMENTS

| 5,840,166 | * | 11/1998 | Kaneko | 429/29 |
| 5,964,968 | * | 10/1999 | Kaneko | 429/218.2 |

FOREIGN PATENT DOCUMENTS

| 62-271348 | 11/1987 | (JP) . |
| 62-271349 | 11/1987 | (JP) . |
| 7-56803 | 6/1995 | (JP) . |
| 9-25529 | * 1/1997 | (JP) . |
| 10-1731 | 1/1998 | (JP) . |
| 10-251782 | * 9/1998 | (JP) . |
| 10-259436 | * 9/1998 | (JP) . |
| 11-29832 | 2/1999 | (JP) . |
| 11-162459 | 6/1999 | (JP) . |
| 11-162460 | 6/1999 | (JP) . |
| 11-162503 | 6/1999 | (JP) . |
| 11-323469 | 11/1999 | (JP) . |
| WO 97/03213 | 1/1997 | (WO) . |

OTHER PUBLICATIONS

H. Oesterreicher, et al., Mat. Res. Bull., vol. 11, No. 10, pp. 1241–1247, "Hydrides of La–Ni Compounds", 1976.

H. Oesterreicher, et al., Journal of the Less–Common Metals, vol. 73, pp. 339–344, "Hydride Formation in $La_{1-x}Mg_xNi_2$", 1980.

K. Kadir, et al., Journal of Alloys and Compounds, vol. 257, pp. 115–121, "Synthesis and Structure Determination of an New Series of Hydrogen Storage Alloys $RMg_2Ni_9$ (R=La, Ce, Pr, Nd, SM, and Gd) Built From $MgNi_2$ Laves–Type Layers Alternating With $AB_5$ Layers", 1997.

K. Kadir, et al., Abstracts of the Japan Institute of Metals, 120th Meeting, Abstracts 759, p. 289, "Synthesis and Structure Determination of a New Series of Hydrogen Storage Alloys; $RMg_2Ni_9$ (R=La, Ce, Pr, Nd, Sm and Gd) Build From $MgNi_2$ Laves–Type Layers Alternating With $AB_5$ Layers", 1997.

* cited by examiner

*Primary Examiner*—Laura Weiner
(74) *Attorney, Agent, or Firm*—Oblon, Spivak, McClelland, Maier & Neustadt, P.C.

(57) ABSTRACT

There is provided a hydrogen-absorbing alloy comprising, as a principal phase, at least one kind of phase selected from the group consisting of a first phase having a hexagonal crystal system (excluding a phase having a $CaCu_5$ type crystal structure) and a second phase having a rhombohedral crystal system, the hydrogen-absorbing alloy having a composition represented by the following general formula (1):

$$R_{1-a-b}Mg_aT_bNi_{Z-X-Y-\alpha}M1_XM2_YMn_{60} \qquad (1)$$

wherein R is at least one kind of element selected from rare earth elements (which include Y), T is at least one element selected from the group consisting of Ca, Ti, Zr and Hf, M1 is at least one element selected from the group consisting of Co and Fe, M2 is at least one element selected from the group consisting of Al, Ga, Zn, Sn, Cu, Si, B, Nb, W, Mo, V, Cr, Ta, Li, P and S, and the atomic ratios of a, b, X, Y, α and Z are respectively a number satisfying the conditions of: $0.15 \leq a \leq 0.37$, $0 \leq b \leq 0.3$, $0 \leq X \leq 1.3$, $0 \leq Y \leq 0.5$, $0 \leq \alpha \leq 0.135$, and $2.5 \leq Z \leq 4.2$.

27 Claims, 6 Drawing Sheets

HYDROGEN-ABSORBING ALLOY AND SECONDARY BATTERY

CROSS-REFERENCE TO RELATED APPLICATIONS

This is a Continuation-in-Part application of U.S. patent application Ser. No. 09/200,464, filed Nov. 27, 1998, the entire contents of which are incorporated herein by reference.

BACKGROUND OF THE INVENTION

This invention relates to a hydrogen-absorbing alloy, a secondary battery comprising a negative electrode containing the hydrogen-absorbing alloy, a hybrid car equipped with a secondary battery comprising a negative electrode containing the hydrogen-absorbing alloy, and an electromobile equipped with the aforementioned secondary battery.

Hydrogen-absorbing alloy has been noticed as being capable of safely and easily storing hydrogen as an energy source, and also as being useful as an energy exchange material or an energy storage material. Therefore, there have being proposed various applications of hydrogen-absorbing alloy as a new functional material. For example, hydrogen-absorbing alloy has been proposed to employ for the storage and transport of hydrogen, the storage and transport of heat, the conversion of heat energy to mechanical energy, the separation and purification of hydrogen, the separation of hydrogen isotope, a battery employing hydrogen as an active material, a catalyst in synthetic chemistry, and a temperature sensor.

Particularly, the application of a secondary battery which is capable of reversibly absorbing and desorbing hydrogen to the negative electrode of a secondary battery is extensively studied. In fact, some of secondary batteries of this kind are put to practical use. By the way, a secondary battery has been employed as a power source for various kinds of portable electronic apparatus of small size and light weight. These portable electronic apparatuses are now being increasingly enhanced in the performance, function and miniaturization thereof, so that in order to enable these portable electronic apparatuses to be operable for a long period of time, the discharge capacity per unit volume of the secondary battery is required to be increased. Additionally, it is also desired in recent years to make the secondary battery more light in weight, i.e. to increase the discharge capacity per unit weight of the secondary battery in addition to increasing the discharge capacity per unit volume thereof.

A rare earth element-based hydrogen-absorbing alloy of $AB_5$ type is capable of reacting with hydrogen at the normal temperature and pressure, and is relatively excellent in chemical stability, so that this rare earth element-based hydrogen-absorbing alloy of $AB_5$ type is now extensively studied as a prospective hydrogen-absorbing alloy for the secondary battery, and is actually put to practical use for a negative electrode of the secondary battery available on the market. However, the discharge capacity of this secondary battery placed on the market and provided with the negative electrode containing this $AB_5$ type rare earth element-based hydrogen-absorbing alloy now reaches to as high as 80% or more of the theoretical capacity, so that any further increase in discharge capacity would be difficult.

By the way, there are a large number of the rare earth element-Ni based intermetallic compounds other than the aforementioned $AB_5$ type rare earth element-based intermetallic compound. For example, Mat. Res. Bull., 11, (1976) 1241 describes that an intermetallic compound containing a larger quantity of rare earth element as compared with the $AB_5$ type compound is capable of absorbing a larger quantity of hydrogen in the vicinity of room temperature as compared with the $AB_5$ type compound. Further, with respect to the system wherein the A-site is constituted by a mixture comprising a rare earth element and Mg, there are known a couple of publications as explained below.

Namely, J. Less-Common Metals, 73, (1980) 339 discloses a hydrogen-absorbing alloy having a composition represented by $La_{1-x}Mg_xNi_2$. However, this hydrogen-absorbing alloy is accompanied with a problem that due to its high stability in relative to hydrogen, hydrogen can be hardly released therefrom, thus making it difficult to fully desorb hydrogen at the occasion of discharging the secondary battery. On the other hand, there is also a report on a hydrogen-absorbing alloy having a composition of $LaMg_2Ni_9$ (a summary of lecture in the 120th Spring Meeting of Japan Institute of Metals, p.289 (1997). However, this hydrogen-absorbing alloy is accompanied with a problem that the degree of hydrogen absorption is relatively low.

Japanese Patent Unexamined Publication S/62-271348 discloses a hydrogen absorption electrode comprising a hydrogen-absorbing alloy represented by a general formula $Mm_{1-x}A_xNi_aCo_bM_c$, while Japanese Patent Unexamined Publication S/62-271349 discloses a hydrogen absorption electrode comprising a hydrogen-absorbing alloy represented by a general formula $La_{1-x}A_xNi_aCo_bM_c$.

However, a metal oxide-hydrogen secondary battery provided with any one of these hydrogen absorption electrodes is accompanied with a problem that it is low in discharge capacity and short in charge/discharge cycle life.

Further, International Re-publication No. WO97/03213 and U.S. Pat. No. 5,840,166 disclose a hydrogen-absorbing electrode comprising a hydrogen-absorbing alloy having a specific antiphase boundary and a composition represented by the following general formula (i). This hydrogen-absorbing alloy is said as having a crystal structure consisting of $LaNi_5$, i.e. $CaCu_5$ type single-phase.

$$(R_{1-x}L_x)(Ni_{1-y}L_y)_z \qquad (i)$$

wherein R is at least one element selected from La, Ce, Pr and Nd; L is at least one element selected from Gd, Tb, Dy, Ho, Er, Tm, Yb, Lu, Y, Sc, Mg and Ca; M is at least one element selected from Co, Al, Mn, Fe, Cu, Zr, Ti, Mo, Si, V, Cr, Nb, Hf, Ta, W, B and C; and x, y and z are respectively a number satisfying the conditions of: $0.05 \leq x \leq 0.4$, $0 \leq y \leq 0.5$, $0 \leq z < 4.5$.

This hydrogen-absorbing alloy is manufactured by allowing a melt of the alloy represented by the general formula (i) to drop on the surface of a roll having a surface roughness of 30 to 150 μm in mean maximum height Rmax, whereby cooling and solidifying the melt under cooling conditions: 50 to 500° C. in supercooling degree and 1,000 to 10,000° C./sec. in cooling rate, thus obtaining flakes having a thickness of 0.1 to 2.0 mm, which is then heat-treated. This publication also mentions that if the aforementioned manufacturing conditions are not met, the resultant alloy may have two phases, i.e. a $LaNi_5$ type phase and a $Ce_2Ni_7$ type phase, and hence it is impossible to obtain an alloy constituted by $LaNi_5$ type single phase.

However, a secondary battery equipped with a negative electrode comprising a hydrogen-absorbing alloy having a $CaCu_5$ type crystal structure, a specific antiphase boundary and a composition represented by the aforementioned general formula (i) is accompanied with problems that it is low in discharge capacity and short in charge/discharge cycle life.

Additionally, Japanese Patent Unexamined Publication H/11-29832 discloses a hydrogen-absorbing material represented by the following general formula (ii) and having a hexagonal system wherein a space group is P6$_3$/mmc, i.e. a Ce$_2$Ni$_7$ type crystal structure.

$$(R_{1-X}A_X)_2 (Ni_{7-Y-Z-\alpha-\beta}Mn_YNb_ZB_\alpha C_\beta)_n \qquad (ii)$$

wherein R is a rare earth element or a misch metal (Mm); A is at least one element selected from Mg, Ti, Zr, Th, Hf, Si and Ca; B is at least one element selected from Al and Cu; C is at least one element selected from Ga, Ge, In, Sn, Sb, Tl, Pb and Bi; and X, Y, Z, α, β and n are respectively a number satisfying the conditions of: 0<X≦0.3, 0.3≦Y≦1.5, 0<Z≦0.3, 0≦α≦1.0, 0≦β≦1.0, and 0.9≦n≦1.1.

In this hydrogen-absorbing alloy having a composition represented by the above formula (ii), the atomic ratio of Mn/(R+A) is in the range of 0.135 to 0.825.

However, since this hydrogen-absorbing alloy is poor in the reversibility of absorption/desorption reaction, the degree of hydrogen absorption and desorption is relatively low. Accordingly, a secondary battery equipped with a negative electrode comprising this hydrogen-absorbing alloy is accompanied with problems that the reversibility of absorption/desorption reaction is poor and the discharge voltage is also low, so that the discharge capacity thereof would be reduced.

BRIEF SUMMARY OF THE INVENTION

Accordingly, an object of the present invention is to provide a hydrogen-absorbing alloy, which is capable of overcoming the problem of prior art that the desorption of hydrogen is suppressed due to an excessively high stability in relative to hydrogen in a hydrogen-absorbing alloy having a composition wherein the A-site is included in a relatively large ratio as compared with the composition of the AB$_5$ type hydrogen-absorbing alloy; also capable of overcoming the problem of prior art that the hydrogen-absorbing alloy is vulnerable to corrosion and oxidation by the effect of an alkaline electrolyte; and capable of exhibiting an improved hydrogen absorption/desorption property.

Another object of the present invention is to provide a secondary battery which is large in capacity and excellent in charge/discharge cycles.

A further object of this invention is to provide a hybrid car and an electromobile, which are excellent in traveling performance such as fuel consumption, etc.

Namely, according to the present invention, there is provided a hydrogen-absorbing alloy comprising, as a principal phase, at least one kind of phase selected from the group consisting of a first phase having a hexagonal crystal system (excluding a phase having a CaCu$_5$ type crystal structure) and a second phase having a rhombohedral crystal system, the hydrogen-absorbing alloy having a composition represented by the following general formula (1):

$$R_{1-a-b}Mg_aT_bNi_{Z-X-Y-\alpha}M1_XM2_YMn_\alpha \qquad (1)$$

wherein R is at least one kind of element selected from rare earth elements (which include Y); T is at least one element selected from the group consisting of Ca, Ti, Zr and Hf; M1 is at least one element selected from the group consisting of Co and Fe; M2 is at least one element selected from the group consisting of Al, Ga, Zn, Sn, Cu, Si, B, Nb, W, Mo, V, Cr, Ta, Li, P and S; and the atomic ratios of a, b, X, Y, α and Z are respectively a number satisfying the conditions of: 0.15≦a≦0.37, 0≦b≦0.3, 0≦X≦1.3, 0≦Y≦0.5, 0≦α<0.135, and 2.5≦Z≦4.2.

According to the present invention, there is also provided a secondary battery which comprises a positive electrode, a negative electrode comprising a hydrogen-absorbing alloy, and an alkaline electrolyte;

wherein the hydrogen-absorbing alloy comprises, as a principal phase, at least one kind of phase selected from the group consisting of a first phase having a hexagonal crystal system (excluding a phase having a CaCu$_5$ type crystal structure) and a second phase having a rhombohedral crystal system; and the hydrogen-absorbing alloy has a composition represented by the aforementioned general formula (1).

According to the present invention, there is also provided a hybrid car comprising an electric driving means, and a power source for the electric driving means;

wherein the power source comprises a secondary battery which comprises a positive electrode, a negative electrode containing a hydrogen-absorbing alloy, and an alkaline electrolyte; and wherein the hydrogen-absorbing alloy comprises, as a principal phase, at least one kind of phase selected from the group consisting of a first phase having a hexagonal crystal system (excluding a phase having a CaCu$_5$ type crystal structure) and a second phase having a rhombohedral crystal system; and the hydrogen-absorbing alloy has a composition represented by the aforementioned general formula (1).

According to the present invention, there is also provided an electromobile comprising a secondary battery as a driving power source;

wherein the secondary battery comprises a positive electrode, a negative electrode comprising a hydrogen-absorbing alloy, and an alkaline electrolyte; and wherein the hydrogen-absorbing alloy comprises, as a principal phase, at least one kind of phase selected from the group consisting of a first phase having a hexagonal crystal system (excluding a phase having a CaCu$_5$ type crystal structure) and a second phase having a rhombohedral crystal system; and the hydrogen-absorbing alloy has a composition represented by the aforementioned general formula (1).

Further, according to the present invention, there is provided a hydrogen-absorbing alloy exhibiting less than 0.15 (including 0) in intensity ratio to be calculated according to the following formula (2) and having a composition represented by the following general formula (3):

$$I_1/I_2 \qquad (2)$$

wherein $I_2$ is an intensity of a peak exhibiting a highest intensity in an X-ray diffraction using CuKα-ray; and $I_1$ is an intensity of a peak exhibiting a highest intensity within 2θ of 8 to 13°, θ being Bragg angle, in the X-ray diffraction;

$$R_{1-a-b}Mg_aT_bNi_{Z-X}M3_X \qquad (3)$$

wherein R is at least one kind of element selected from rare earth elements (which include Y); T is at least one element selected from the group consisting of Ca, Ti, Zr and Hf; M3 is at least one element selected from the group consisting of Co, Mn, Fe, Al, Ga, Zn, Sn, Cu, Si, B, Nb, W, Mo, V, Cr, Ta, Li, P and S; and the atomic ratios of a, b, X and Z are respectively a number satisfying the conditions of: 0.1≦a≦0.6, 0≦b≦0.3, 0≦X≦2, and 2.5≦Z≦4.

According to the present invention, there is also provided a secondary battery which comprises a positive electrode, a negative electrode comprising a hydrogen-absorbing alloy, and an alkaline electrolyte;

wherein the hydrogen-absorbing alloy exhibits less than 0.15 (including 0) in intensity ratio to be calculated according to the aforementioned formula (2) and has a composition represented by the aforementioned general formula (3).

According to the present invention, there is also provided a hybrid car comprising an electric driving means, and a power source for the electric driving means;

wherein the power source comprises a secondary battery which comprises a positive electrode, a negative electrode containing a hydrogen-absorbing alloy, and an alkaline electrolyte; and wherein the hydrogen-absorbing alloy exhibits less than 0.15 (including 0) in intensity ratio to be calculated according to the aforementioned formula (2) and has a composition represented by the aforementioned general formula (3).

According to the present invention, there is also provided an electromobile comprising a secondary battery as a driving power source;

wherein the secondary battery comprises a positive electrode, a negative electrode comprising a hydrogen-absorbing alloy, and an alkaline electrolyte; and wherein the hydrogen-absorbing alloy exhibits less than 0.15 (including 0) in intensity ratio to be calculated according to the aforementioned formula (2) and has a composition represented by the aforementioned general formula (3).

Furthermore, according to the present invention, there is provided a hydrogen-absorbing alloy having a composition represented by the following general formula (4):

$$R_{1-a}Mg_aNi_{Z-X-Y}Al_XCo_YM4_\alpha \quad (4)$$

wherein R is at least one kind of element selected from rare earth elements (which include Y) with a proviso that the content of Ce in the R is less than 20% by weight (including 0% by weight); M4 is at least one element selected from the group consisting of Mn, Fe, Al, Ga, Zn, Sn, Cu, Si, B, Nb, W, Ti, Zr, In, Mo, V, Cr, P and S; and the atomic ratios of a, X, Y, Z and α are respectively a number satisfying the conditions of: $0.15 \leq a \leq 0.33$, $0.06 \leq X \leq 0.15$, $0 \leq Y \leq 0.2$, $3.15 < Z \leq 3.55$, and $0 \leq \alpha < 0.135$.

According to the present invention, there is also provided a secondary battery which comprises a positive electrode, a negative electrode comprising a hydrogen-absorbing alloy, and an alkaline electrolyte;

wherein the hydrogen-absorbing alloy has a composition represented by the aforementioned general formula (4).

According to the present invention, there is also provided a hybrid car comprising an electric driving means, and a power source for the electric driving means;

wherein the power source comprises a secondary battery which comprises a positive electrode, a negative electrode comprising a hydrogen-absorbing alloy, and an alkaline electrolyte; and wherein the hydrogen-absorbing alloy has a composition represented by the aforementioned general formula (4).

According to the present invention, there is also provided an electromobile comprising a secondary battery as a driving power source;

wherein the secondary battery comprises a positive electrode, a negative electrode comprising a hydrogen-absorbing alloy, and an alkaline electrolyte; and wherein the hydrogen-absorbing alloy has a composition represented by the aforementioned general formula (4).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

Figure 1:
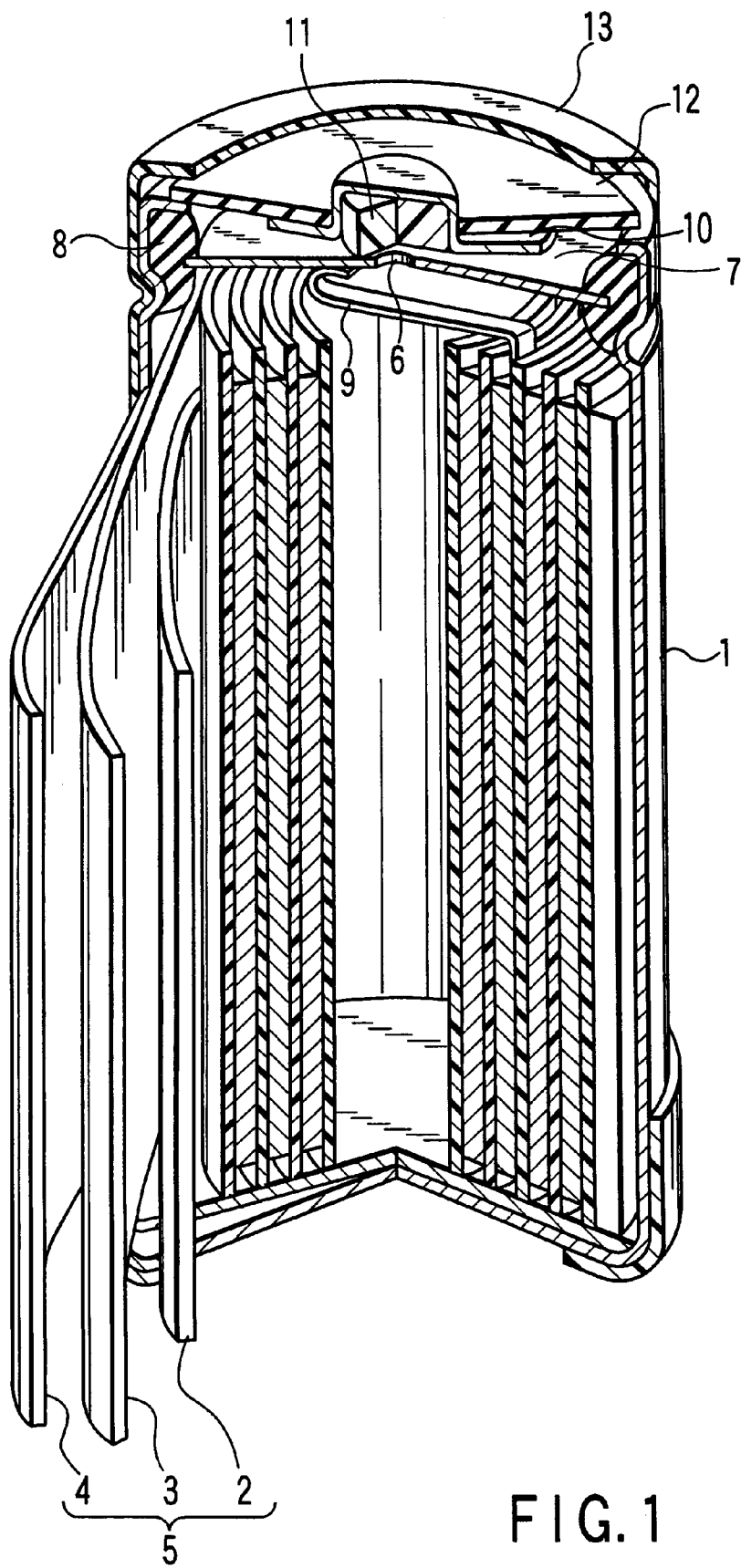
FIG. 1 is a partially sectioned perspective view showing a cylindrical nickel-hydrogen secondary battery representing one embodiment of an alkaline secondary battery of this invention.

DETAILED DESCRIPTION OF THE INVENTION (1) A first nickel-hydrogen secondary battery This invention will be explained further with reference to FIG. 1 showing a cylindrical nickel-hydrogen secondary battery representing one embodiment of the nickel-hydrogen secondary battery of this invention.

Referring to FIG. 1, a bottomed cylindrical case 1 is accommodated therein with an electrode group 5 which has been manufactured by stacking a positive electrode 2, a separator 3 and a negative electrode 4, and then by spirally winding the stacked body. The negative electrode 4 is disposed at the outermost periphery of the electrode group 5 so as to electrically contact with the cylindrical case 1. The cylindrical case 1 contains an alkaline electrolyte. A sealing plate 7 formed of a disk having an opening 6 at the center is disposed on the upper opening of the cylindrical case 1. An insulating gasket 8 having a ring-like shape is interposed between the periphery of the first sealing plate 7 and the upper inner wall surface of the opening of the cylindrical case 1. The peripheral fringe portion of the opening of the cylindrical case 1 is caulked inward so that the first sealing plate 7 is hermetically fixed via the gasket 8 to cylindrical case 1. The positive electrode lead 9 is connected through its one end to the positive electrode 2 and through its other end to the lower surface of the first sealing plate 7. A positive electrode terminal 10 having a hat-like shape is mounted over the first sealing plate 7 in such a manner as to cover the opening 6. A rubber safety valve 11 is disposed in a space surrounded by the first sealing plate 7 and the positive electrode terminal 10 in such a manner as to seal the opening 6. A holding plate 12 formed of an insulating disk having an opening at the center is disposed over the positive electrode terminal 10 in such a manner that the projected portion of the positive electrode terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the negative electrode 4, the separator 3 and the electrolyte will be explained.

(1) The Positive Electrode 2

This positive electrode 2 contains nickel hydroxide, and can be manufactured by a process wherein a conductive material is added at first to an active material, i.e. nickel hydroxide powder to obtain a mixture, which is then kneaded together with a binder and water to prepare a paste, which is then stuffed into a conductive substrate and, after being dried, molded into a predetermined shape.

Although there is not any particular limitation regarding the nickel hydroxide powder to be employed in this invention as far as the nickel hydroxide is capable of normally charging and discharging, it is preferable in view of obtaining desired properties as a battery to contain a transition metal such as zinc and cobalt.

As for the conductive material, cobalt oxide, cobalt hydroxide can be used.

Examples of the binder are carboxymethyl cellulose, methyl cellulose, sodium polyacrylate, polytetrafluoroethylene and polyvinyl alcohol (PVA).

The conductive substrate may be formed of a mesh-like, sponge-like, fibrous or metallic porous body which is made of a metal such as nickel, stainless steel or a nickel-plated metal.

(2) The Negative Electrode 4

This negative electrode comprises a hydrogen-absorbing alloy represented by the following general formula (A);

$$(R_{1-x}Mg_x)Ni_yA_z \qquad (A)$$

wherein R is at least one element selected from rare earth elements (including yttrium), Ca, Zr and Ti; A is at least one element selected from Co, Mn, Fe, V, Cr, Nb, Al, Ga, Zn, Sn, Cu, Si, P and B; and x, y and z are atomic ratio individually defined as $0<x<1$, $0 \leq z \leq 1.5$, $2.5 \leq y+z<4.5$;

This negative electrode 4 can be manufactured for example by a method wherein a conductive material is added at first to a hydrogen-absorbing alloy powder and then kneaded together with a binder and water to prepare a paste, which is then stuffed into a conductive substrate and, after being dried, press-molded into a predetermined shape, thereby forming the negative electrode.

As for the R to be incorporated into the hydrogen-absorbing alloy, it is preferable to employ a rare earth element (including yttrium). Further, if a rare earth element is to be employed as the R, it is more preferable in view of saving the manufacturing cost of a hydrogen-absorbing electrode to employ at least one kind of rare earth elements selected from the group consisting of La, Ce, Pr, Nd and Y. One example of such a preferable example of the R is a misch-metal (Mm) which is a mixture of rare earth elements such as Ce-rich Mm and La-rich Lm.

It is also possible to employ, as the R, a mixture containing at least one element selected from Ca, Zr and Ti, in addition to the aforementioned rare earth elements. In this case, the former elements may be incorporated therein substituting for 30 atom. % or less of the rare earth elements.

When the range of the x in the general formula (A) is confined to the aforementioned limitation, it is possible to overcome the problem of difficulty in releasing hydrogen and hence to realize a large discharge capacity. In particular, the range of the x should more preferably be confined to the range of $0.1 \leq x \leq 0.6$. Because if the x is less than 0.1, the problem of difficulty in releasing hydrogen from the hydrogen-absorbing alloy may not be sufficiently overcome, thus making it difficult to obtain a secondary battery of large discharge capacity. On the other hand, if the x exceeds over 0.6, the reversible absorption/desorption quantity of the alloy would be deteriorated, thus making it difficult to obtain a secondary battery of large discharge capacity. A most preferable range of the x is $0.15 \leq x \leq 0.45$.

When the range of the z in the general formula (A) absorbing alloy is confined to the aforementioned limitation, it is possible not only to enhance the hydrogen absorption/desorption property such as the hydrogen absorption/desorption rate of the alloy, but also to prominently improve the charge/discharge cycle property of the nickel-hydrogen secondary battery. However, if the z exceeds over 1.5, the discharge capacity of the secondary battery would be deteriorated. Therefore, a most preferable range of the z is $0.1 \leq z \leq 1.0$.

The A in the general formula (A) should preferably be at least one element selected from Co and Mn. Namely, the inclusion of these elements as A for a hydrogen-absorbing alloy to be incorporated in a negative electrode of secondary battery would lead to an improvement of the charge/discharge cycle property of the battery. In particular, when Co is included as A, the discharge capacity of the battery can be also enhanced.

When the value of the y+z in the general formula (A) is confined to 2.5 or more, it is possible to prominently improve the hydrogen absorption/desorption property such as the hydrogen absorption/desorption rate of the alloy, and hence to enhance the discharge capacity and charge/discharge cycle property of the nickel-hydrogen secondary battery. However, if the y+z exceeds over 4.5, the hydrogen site of the alloy would be decreased, thus reducing the hydrogen absorption capacity of the alloy and hence deteriorating the discharge capacity of the secondary battery. Therefore, a more preferable range of the y+z is $3.0 \leq y+z \leq 3.8$.

The hydrogen-absorbing alloy should preferably be such that, when the alloy is analyzed by an X-ray diffraction method using CuKα-ray, the alloy exhibits a highest peak in the range of 42.1°±1° and does not exhibit a peak having an intensity of more than 15% of the aforementioned highest peak in the range of 30.2°±1°. In other words, the hydrogen-absorbing alloy is analyzed by an X-ray diffraction method using CuKα-ray, a highest peak appears in the range of 42.1°±1°, and a peak does not appear in the range of 30.2°±1°, or even if a peak appears in the range of 30.2°±1°, the peak should be of not more than 15% in intensity of the aforementioned highest peak. It should be noted that the intensity of each peak is one obtained by subtracting the intensity of the background from the intensity of the peak actually measured.

If the hydrogen-absorbing alloy is constructed as mentioned above, the alloy contains as a principal phase a phase having an $AB_3$ type crystal structure such as $CeNi_3$ type crystal structure and $PuNi_3$ type crystal structure; an $A_2B_7$ type crystal structure such as $Ce_2Ni_7$ type crystal structure and $Gd_2Co_7$ type crystal structure; or a crystal structure which is similar to these types. In this case, the term "principal phase" noted above denotes a phase in the alloy which is highest in existing ratio.

If the hydrogen-absorbing alloy represented by the aforementioned general formula is such that, when the alloy is analyzed by an X-ray diffraction method using CuKα-ray, the alloy exhibits a highest peak in the range of 42.1°±1° and a peak having an intensity of more than 15% of the aforementioned highest peak in the range of 30.2°±1°, the alloy contains as a principal phase a phase having a $CaCu_5$ type crystal structure such as $LaNi_5$ type crystal structure, or otherwise the alloy contains such a high ratio of the phase having the $CaCu_5$ type crystal structure that cannot be disregarded just like a principal phase.

If the hydrogen-absorbing alloy contains as a principal phase a phase having a $CaCu_5$ type crystal structure such as $LaNi_5$ type crystal structure, or contains the phase having the $CaCu_5$ type crystal structure at such a high ratio that cannot be disregarded just like a principal phase, it may be impossible to obtain a secondary battery having a sufficient charge/discharge cycle life. A more preferable hydrogen-absorbing alloy among these preferable hydrogen-absorbing alloys is the one where a peak having an intensity of more than 10% of the aforementioned highest peak does not appear in the range of 30.2°±1°.

A most preferable alloy among the hydrogen-absorbing alloys represented by the aforementioned general formula (A) is such that, when the alloy is analyzed by an X-ray diffraction method using CuKα-ray, the alloy exhibits a highest peak in the range of 42.1°±1° and a peak having an intensity greater than 5% of that of the highest peak in the range of 32.5°±1° and does not exhibit a peak having an intensity greater than 15% of that of the highest peak in the range of 30.2°±1°. In particular, it is far more preferable to employ an alloy where a peak having an intensity of more than 10% of the aforementioned highest peak appears in the range of 32.5°±1°.

The hydrogen-absorbing alloy represented by the aforementioned general formula (A) can be manufactured by means of a casting method, a sintering method, an ultra-quenching method such as a single rolling method, a double rolling method, a disc-atomizing method or a gas-atomizing method.

The alloy thus obtained is then preferably heat-treated in vacuum or in an inert atmosphere at a temperature ranging from 300° C. to less than melting point thereof for a time period ranging from 0.1 to 500 hours. It is possible through this heat treatment to alleviate the distortion in lattice of the alloy, so that the hydrogen absorption/desorption characteristics such as the hydrogen absorption/desorption rate of the alloy can be improved. The heat treatment temperature should preferably be in the range from 750 to 1,050° C., more preferably in the range from 800 to 1,000° C. Further, the heat treatment period should preferably be in the range from 0.5 to 100 hours, more preferably in the range from 1 to 20 hours.

As for the binder, the same kinds of material as employed for the positive electrode can be employed.

As for the conductive material, carbon black, conductive metallic pieces, etc. can be used.

As for the conductive metal for the conductive metallic pieces, Ni, Cu, etc. can be employed. The conductive metallic pieces may be in the form of granule or flake having an average diameter of 1 to 100 μm. The conductive metallic pieces should preferably be employed at a ratio of 0.3 to 20 parts by weight per 100 parts by weight of a hydrogen-absorbing alloy.

The conductive substrate may be formed of a two-dimensional substrate such as a punched metal, an expanded metal and a nickel net; or a three-dimensional substrate such as a felt-shaped metallic porous body or a sponge-shaped metallic porous body.

(3) The Separator 3

There is not any particular limitation regarding the material and configuration of the separator 3 as long as the separator 3 is formed of an insulating material having a sufficient hydrophilicity and gas-permeability. However, in view of enhancing the properties of nickel-hydrogen secondary battery, it should preferably be formed of a sheet containing a polyolefin type resin fiber.

As for the polyolefin type resin fiber, a fiber consisting of only one kind of polyolefin; a composite fiber of core-sheath structure where a core material consisting of a polyolefin fiber is covered by a different kind of polyolefin fiber; or a composite fiber of split structure where polyolefin fibers which are different in kind from each other are connected with each other to form a ring-like structure may be employed. As for the polyolefin, it is possible to employ polyethylene, polypropylene, etc.

As for the sheet containing a polyolefin type resin fiber, it is possible to employ a non-woven fabric or woven fabric comprising the aforementioned polyolefin type resin fibers, or a composite sheet composed of these non-woven fabric and woven fabric. This non-woven fabric can be manufactured by means of a dry process, a wet process, a spun-bonding method, melt-blow method, etc. The average thickness of the fiber constituting the separator should preferably be in the range of 1 to 20 μm in view of the mechanical strength and of preventing a short circuit between the positive and negative electrodes.

For the purpose of providing the separator 3 with hydrophilicity, the surface of the polyolefin type resin fiber to be included in the sheet should preferably be covered with a copolymer having a hydrophilic group (such as ethylene vinyl alcohol copolymer), or the sheet should preferably be graft-copolymerized with a vinyl monomer having a hydrophilic group. Examples of vinyl monomer having a hydrophilic group are acrylic acid, methacrylic acid, acrylate, methacrylate, vinylpyridine, vinylpyrrolidone, styrene sulfonic acid, a monomer having a functional group which is capable of forming a salt through a reaction thereof with an acid or base such as styrene, or a monomer having a functional group which is capable of forming a salt through hydrolysis after being graft-copolymerized. Among these vinyl monomers, acrylic acid is most preferable.

(4) Alkaline Electrolyte

Examples of the alkaline electrolyte which are useful in this invention include an aqueous solution of potassium hydroxide (KOH), a mixed solution of potassium hydroxide (KOH) and sodium hydroxide (NaOH), a mixed solution of potassium hydroxide (KOH) and lithium hydroxide (LiOH), and a mixed solution of NaOH, KOH and LiOH. In particular, the alkaline electrolyte should preferably be the aqueous mixed solution of NaOH and KOH or the aqueous mixed solution of LiOH and KOH. The concentration of KOH in this alkaline electrolyte should preferably be 2.0 to 9.0N, more preferably 3.0 to 8.5N. Likewise, the concentration of NaOH in this alkaline electrolyte should preferably be 1.0 to 6.0N, more preferably 2.0 to 5.0N. Further, the concentration of LiOH in this alkaline electrolyte should preferably be 0.3 to 2.0N, more preferably 0.5 to 1.5N.

Although this invention has been explained about a cylindrical alkaline secondary battery, it is also possible according to this invention to apply it to a rectangular alkaline secondary battery, wherein a closed-end rectangular case is accommodated therein with an electrode group consisting of a laminated body that positive electrodes and negative electrodes which are alternately superimposed one upon another with a separator being interposed therebetween, and with an alkali electrolyte.

(2) A second nickel-hydrogen secondary battery

The second nickel-hydrogen secondary battery comprises an electrode group comprising a positive electrode, a negative electrode and a separator being interposed positive and negative electrodes. The secondary battery further comprises an alkali electrolyte and a case accommodating therein the aforementioned electrode group and alkali electrolyte.

This second nickel-hydrogen secondary battery is applicable to the cylindrical alkaline secondary battery shown for instance in FIG. 1. Further, this second nickel-hydrogen secondary battery is also applicable to a rectangular alkaline secondary battery, wherein a closed-end rectangular case is accommodated therein with an electrode group consisting of a laminated body that positive electrodes and negative electrodes which are alternately superimposed one upon another with a separator being interposed therebetween, and with an alkali electrolyte.

As for the positive electrode, the negative electrode, the separator and the electrolyte, the same kinds of materials as employed in the aforementioned first nickel-hydrogen secondary battery can be employed.

Followings are explanations on the case (battery case).

This case has a tensile strength of 65 to 80 kgf/mm$^2$, a yield point of 30 to 55 kgf/mm$^2$ and an elastic modulus of 20,000 to 30,000 kgf/mm$^2$.

The measurement of these mechanical properties of the case can be performed based on the method described in JIS Z 2241. The elastic modulus of the case can be calculated based on the data to be obtained from the method described in JIS Z 2241. Further, the test pieces to be employed are those of No. 5 which is described in JIS Z 2201.

Next, the reasons for limiting the mechanical properties of the case to the aforementioned ranges will be explained.

(1) Tensile strength

If the tensile strength of the case is less than 65 kgf/mm$^2$, not only the strength of the case becomes insufficient, but also a plastic deformation such as swelling of the case due to the stress resulting from the volumetric expansion of the negative electrode would be caused. On the other hand, since it is more or less difficult to manufacture the case having a tensile strength exceeding over 80 kgf/mm$^2$ by means of deep draw forming, there is a possibility that cracking or a great magnitude of strain which may be generated in the working of the case. Therefore, a preferable range of the tensile strength of the case is 68 to 75 kgf/mm$^2$.

(2) Yield point

If the yield point of the case is less than 30 kgf/mm$^2$, not only the strength of the case becomes insufficient, but also a plastic deformation such as swelling of the case due to the stress resulting from the volumetric expansion of the negative electrode would be caused. On the other hand, since it is more or less difficult to manufacture the case having a yield point exceeding over 55 kgf/mm$^2$ by means of deep draw forming, there is a possibility that cracking or a great magnitude of strain which may be generated in the working of the case. Therefore, a preferable range of the yield point of the case is 35 to 50 kgf/mm$^2$.

(3) Elastic modulus

As the elastic modulus is increased, a higher stress is required for generating an elastic deformation of the case. Namely, if the elastic modulus of the case exceeds over 30,000 kgf/mm$^2$, the magnitude of elastic deformation of the case in relative to the stress originating from a volumetric expansion of the negative electrode at the occasion of charging would become smaller, thus causing an internal short-circuit to be easily generated. Therefore, a preferable range of the elastic modulus of the case is 21000 to 26000 kgf/mm$^2$.

This case should preferably be formed of a steel plate containing not more than 0.13% (including 0%) of carbon, not more than 0.5% (including 0%) of manganese, not more than 0.05% (including 0%) of phosphorus, and not more than 0.05% (including 0%) of sulfur, at least a part of the surface of the steel plate being preferably plated with nickel. However, it should be noted that all of carbon, manganese, phosphorus and sulfur should not be simultaneously zero. When the composition of the steel plate is controlled as mentioned above, it becomes possible to obtain a steel plate which is suited for a deep draw forming, and at the same time, the mechanical property of the case can be controlled to a desired range. On the other hand, if the composition of the steel plate falls outside the aforementioned range, it may become difficult to perform the deep draw forming of the case due to an increase in mechanical strength of the steel plate, or the mechanical property of the case may fall outside the aforementioned desired ranges due to a strain originating from the molding of the case.

This case can be manufactured by cold-working such as deep draw forming a plate material having a tensile strength of 25 to 40 kgf/mm$^2$, a yield point of 10 to 30 kgf/mm$^2$ and an elastic modulus of 20,000 to 26,000 kgf/mm$^2$ thereby to form a closed-end cylindrical or square tubular configuration, which is then plated with nickel. This plate material may be formed of a metal such as steel. The purpose of nickel-plating is to enhance the alkali-resistance of the case, and hence this nickel-plating can be performed by any desired method as long as the method does not induce a deterioration of the mechanical and electric properties of the case.

For example, it is possible to adopt a method wherein an electroplating is performed after the plating material is molded into a desired configuration, or a method wherein a plating is performed after the plating material is molded into a desired configuration, subsequently a heat treatment is performed at a temperature lower than the melting point of the plated layer so as to enhance the strength of the plating. Although it is possible to perform a heat treatment during the deep draw forming so as to workability of the plate material, this heat treatment would lead to an increase in manufacturing cost of the case.

(3) A third nickel-hydrogen secondary battery

The third nickel-hydrogen secondary battery comprises an electrode group consisting of a positive electrode, a negative electrode and a separator being interposed positive and negative electrodes. The secondary battery further comprises an alkali electrolyte and a case accommodating therein the aforementioned electrode group and alkali electrolyte.

This third nickel-hydrogen secondary battery is applicable to the cylindrical alkaline secondary battery shown for instance in FIG. 1. Further, this second nickel-hydrogen secondary battery is also applicable to a rectangular alkaline secondary battery, wherein a closed-end rectangular case is accommodated therein with an electrode group consisting of a laminated body that positive electrodes and negative electrodes which are alternately superimposed one upon another with a separator being interposed therebetween, and with an alkali electrolyte.

As for the positive electrode, the separator and the electrolyte, the same kinds of materials as employed in the aforementioned first nickel-hydrogen secondary battery can be employed.

Followings are explanations on the negative electrode.

This negative electrode comprises a mixture containing a hydrogen-absorbing alloy represented by the aforementioned general formula (A), and a conductive substrate carrying this mixture.

This negative electrode can be manufactured by a process wherein a conductive material is added to the powder of the aforementioned hydrogen-absorbing alloy, and the resultant mixture is kneaded together with a binder and water to obtain a paste. The paste is then stuffed into the conductive substrate and, after being dried, press-molded to obtain the negative electrode.

As for the hydrogen-absorbing alloy, the conductive material, the binder and the conductive substrate, the same kinds of materials as employed in the aforementioned first nickel-hydrogen secondary battery can be employed.

In view of inhibiting the self-discharge at the initial stage of the charge/discharge cycle of the battery, the density of the mixture in the negative electrode should be set to 5.1 g/cc to 5.8 g/cc. The reason for the improvement in self-discharge by this density range of the mixture may be ascribed to the fact that this density of the mixture is almost the same as that of hydrogen-absorbing alloy in the negative electrode, thereby giving a great influence to the compression degree of the separator and to the distribution of the electrolyte. More preferable range of the density of the mixture is from 5.2 to 5.7 g/cc.

Next, details of the electrode group will be explained as follows.

In view of inhibiting the self-discharge at the initial stage of the charge/discharge cycle of the battery, the tightness of the electrode group is confined to the range of 98 to 110%. By the way, even if the tightness of the electrode group exceeds over 100%, it is possible to house the electrode group in the case, since the separator can be compressed at the occasion of housing the electrode group in the case. More preferable range of the tightness of the electrode group is from 99 to 105%.

This tightness of the electrode group can be calculated as follows.

(a) Cylindrical nickel-hydrogen secondary battery

First of all, the designed diameter $R_0$ of the electrode group is calculated according to the following formula (I).

$$R_0 = T_p \times N_p + T_n \times N_n + T_s \times N_s + r \quad (I)$$

wherein $T_p$ is the thickness (mm) of the positive electrode before making of the electrode group; $T_n$ is the thickness (mm) of the negative electrode before making of the electrode group; $T_s$ is the thickness (mm) of the separator before making of the electrode group; $N_p$ is the number of segments of the positive electrode which exist in a longitudinal section of the electrode group, taken along a longest diameter thereof; Nn is the number of segments of the negative electrode which exist in the longitudinal section; $N_s$ is the number of segments of the separator which exist in the longitudinal section; and r is the diameter (mm) of the core to be employed in the manufacture of the electrode group.

Figure 2:
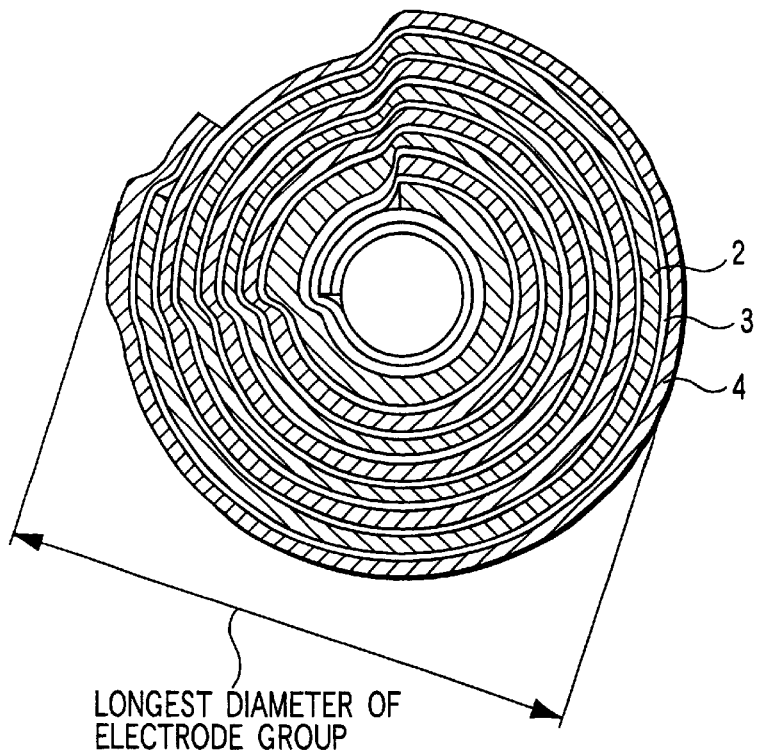
FIG. 2 is a cross-sectional view showing a spiral type electrode group.

The number of segments of the positive electrode, the negative electrode and the separator will be explained as follows. FIG. 2 is a cross-sectional view illustrating one example of spiral type electrode group. A longest diameter means a diameter that passing across the end portion of the positive electrode 2 and across a portion of the negative electrode 4 which is superimposed on the aforementioned end portion. In the case of the electrode group shown in FIG. 2, the number of segments of the positive electrode 2 which exit in the longitudinal section is 8, the number of segments of the negative electrode 4 which exit in the longitudinal section is 8, and the number of segments of the separator 3 which exit in the longitudinal section is 20.

By making use of this designed diameter $R_0$ thus obtained, the tightness X(%) is calculated according to the following formula (II).

$$X = (R_0/R_c) \times 100 \quad (II)$$

wherein $R_c$ is the inner diameter of the closed-end cylindrical case.

(b) Rectangular nickel-hydrogen secondary battery

First of all, the designed thickness $H_0$ of the electrode group is calculated according to the following formula (III).

$$H_0 = T_p \times M_p + T_n \times M_n + T_s \times M_s \quad (III)$$

wherein $T_p$ is the thickness (mm) of the positive electrode before making of the electrode group; $T_n$ is the thickness (mm) of the negative electrode before making of the electrode group; $T_s$ is the thickness (mm) of the separator before making of the electrode group; $M_p$ is the number of laminated layers of the positive electrode; $M_n$ is the number of laminated layers of the negative electrode; and $M_s$ is the number of laminated layers of the separator.

The number of laminated layers of the positive electrode, the negative electrode and the separator means the number of layers of the positive electrode, the negative electrode and the separator, respectively, each constituting a laminate type electrode group that has been actually manufactured.

By making use of this designed thickness $H_0$ thus obtained, the tightness X(%) is calculated according to the following formula (IV).

$$X = (H_0/H_c) \times 100 \quad (IV)$$

wherein $H_c$ is the inner width of the closed-end box-like case as measured taking along the laminated direction of the electrode group.

The width of the electrode group having the aforementioned specific tightness should preferably be set to 98 to 100% of the inner width of the case as measured taking along the laminated direction of the electrode group. The reason for limiting the width of the electrode group in this manner is as follows. Namely, if the width of the electrode group in the laminated direction thereof is less than 98%, it may become difficult to inhibit the self-discharge of the nickel-hydrogen secondary battery comprising a negative electrode comprising a hydrogen-absorbing alloy of the aforementioned specific composition. On the other hand, if the width of the electrode group in the laminated direction thereof exceeds over 100%, it may become difficult to house the electrode group in the case. The expression of "the width of the electrode group in the laminated direction" means herein the aforementioned longest diameter of the electrode group in the case of the cylindrical nickel-hydrogen secondary battery, or the thickness of the electrode group in the laminated direction in the case of the rectangular nickel-hydrogen secondary battery. Further, the expression of "the inner width of the case as measured taking along the laminated direction of the electrode group" means, in the case of the cylindrical nickel-hydrogen secondary battery, the inner diameter of the case.

The case housing an electrode group having the aforementioned specific tightness should preferably have a tensile strength of 65 to 80 kgf/mm$^2$, a yield point of 30 to 55 kgf/mm$^2$ and an elastic modulus of 20,000 to 30,000 kgf/mm$^2$.

The first nickel-hydrogen secondary battery according to this invention comprises a negative electrode comprising a hydrogen-absorbing alloy represented by the aforementioned general formula (A). Since the hydrogen absorption capacity per unit volume of this hydrogen-absorbing alloy is about 20% larger than that of LaNi$_5$ type hydrogen-absorbing alloy, it is possible to fabricate a secondary battery of high capacity even if the quantity of this hydrogen-absorbing alloy per theoretical capacity of the positive electrode is reduced. However, the negative electrode containing this hydrogen-absorbing alloy differs from the negative electrode containing the LaNi$_5$ type hydrogen-absorbing alloy in the pulverization rate and in the reactivity with the electrolyte. Therefore, in order to achieve a high battery capacity while ensuring other desired properties of the battery, the battery is required to satisfy the conditions represented by the following formulas (1) and (2).

$$3.2 \leq P \leq 5.0 \quad (1)$$
$$0.9 \leq Q \leq 0.2P+0.7 \quad (2)$$

wherein P is a quantity (g) of the hydrogen-absorbing alloy per theoretical capacity 1 Ah of the positive electrode; and Q is a quantity (mL) of the alkaline electrolyte per theoretical capacity 1 Ah of the positive electrode.

In the case of the closed-type nickel-hydrogen secondary battery where capacity of the positive electrode regulates the battery capacity, it is imperative, for the purpose of enhancing the battery capacity, to increase the quantity of active material of the positive electrode and to reduce the quantity of the active material of the negative electrode. Since the hydrogen absorption capacity per unit volume of this hydrogen-absorbing alloy represented by the aforementioned general formula (A) is larger than that of LaNi$_5$ type hydrogen-absorbing alloy, it is possible to provide a negative electrode having a sufficient capacity even if the quantity of this hydrogen-absorbing alloy is smaller than the quantity of LaNi$_5$ type hydrogen-absorbing alloy. By the way, the properties desired of the nickel-hydrogen secondary battery are not limited to a high battery capacity, but include those which are closely related to the quantity of electrolyte, such as the low temperature discharge property and the internal pressure at the occasion of over-charging. Only when these properties are well-balanced, a secondary battery which is practical and large in capacity can be obtained.

In order to obtain a nickel-hydrogen secondary battery which comprises a negative electrode containing the hydrogen-absorbing alloy represented by the aforementioned general formula (A), and which is capable of exhibiting a large capacity, the quantity P(g) of the hydrogen-absorbing alloy per theoretical capacity 1 Ah of the positive electrode should be the range of 3.2 to 5.0 g. Because if the quantity P(g) of the hydrogen-absorbing alloy is less than 3.2 g, a difference in capacity between the negative electrode and the positive electrode becomes too small, so that the electric potential of the negative electrode may become lowered at the terminal period of discharging of the positive electrode regulating the discharge capacity, thus rendering the capacity at low temperatures in particular in the vicinity of −20° C. to become lower than that of the LaNi$_5$ type hydrogen-absorbing alloy. On the other hand, if the quantity P(g) of the hydrogen-absorbing alloy is more than 5.0 g, the advantage that the hydrogen absorption quantity of the alloy represented by the aforementioned general formula (A) is higher than that of the LaNi$_5$ type hydrogen-absorbing alloy would be dissipated. More preferable range of the quantity P(g) of the hydrogen-absorbing alloy is $3.6 \leq P \leq 4.5$. By the way, the quantity P(g) can be adjusted by modifying the density of alloy of the negative electrode.

The quantity Q(mL) of the alkaline electrolyte per theoretical capacity 1 Ah of the positive electrode in the nickel-hydrogen secondary battery comprising a negative electrode containing the hydrogen-absorbing alloy represented by the aforementioned general formula (A) should be selected so as to meet the condition represented by the aforementioned formula (2).

The reason for limiting the quantity Q(mL) of the alkaline electrolyte to the range defined by the aforementioned formula (2) is as follows. Namely, if electrolyte which obviates the increase of internal pressure in the nickel-hydrogen secondary battery comprising a negative electrode containing the alloy in a quantity meeting the aforementioned formula (1). More preferable range of the quantity Q(mL) of the electrolyte is $0.95 \leq Q \leq 0.2P+0.6$.

According to the first nickel-hydrogen secondary battery of this invention, since the battery comprises a negative electrode containing the hydrogen-absorbing alloy represented by the aforementioned general formula (A), and since the quantity of the hydrogen-absorbing alloy in relative to the theoretical capacity of the positive electrode as well as the quantity of the alkaline electrolyte in relative to theoretical capacity of the positive electrode are both controlled according to the formulas (1) and (2), it is now possible to enhance the battery capacity while ensuring the properties desired of the battery such as the low temperature discharge property, the internal pressure, the charge/discharge cycle, etc.

In particular, when the hydrogen-absorbing alloy exhibits a highest peak in the range of 42.1°±1° and does not exhibit a peak having an intensity greater than 15% of that of the highest peak in the range of 30.2°±1° as measured by X-ray diffraction using CuKα-ray, it is possible not only to enhance the capacity of the secondary battery without damaging other desired the quantity Q(mL) of the alkaline electrolyte is less than 0.9 mL, it would be impossible to uniformly disperse the electrolyte in the negative electrode. As a result, the capacity at low temperatures in particular in the vicinity of −20° C. would be prominently deteriorated. On the other hand, if the quantity Q(mL) of the alkaline electrolyte is more than the value calculated from 0.2P+0.7 (P is a quantity (g) of the hydrogen-absorbing alloy per theoretical capacity 1 Ah of the positive electrode), the internal pressure of the battery would be increased, thus making it impossible to obtain a sufficient charge/discharge cycle life. This quantity of electrolyte is closely related to the quantity of the alloy as seen from the formula (2).

In order to suppress any increase in internal pressure of the battery, the oxygen gas generated at the occasion of over-charging is required to be quickly diffused over the surface of the alloy existing in the negative electrode, so that it is required to secure a space between the alloy particles for a gas passageway where no electrolyte is existed therein.

Therefore, the quantity of electrolyte per weight of the alloy becomes approximately constant, thus assumably allowing the aforementioned relational expression to be established. Therefore, this relational expression indicates the upper limit in quantity of the properties, but also to improve the charge/discharge cycle life of the secondary battery. Further, when the hydrogen-absorbing alloy further exhibits a peak having an intensity of more than 5% of the highest peak in the range of 32.5°±1°, it is possible to further improve the charge/discharge cycle life of the secondary battery.

According to the second nickel-hydrogen secondary battery of this invention, any volumetric changes due to the expansion and shrinkage of the negative electrode containing the hydrogen-absorbing alloy represented by the aforementioned general formula (A) at the occasion of charging and discharging can be absorbed by an elastic deformation of the case. As a result, the electrode group including the negative electrode can be inhibited from being oppressed by the case at the occasion of the expansion of the negative electrode, so that the space balance inside the electrode group can be maintained in a desired condition. Accordingly, the secondary battery can be prevented, at a relatively early stage of charge/discharge cycle, from generating an internal short-circuit, from decreasing quantity of electrolyte due to the actuation of safety valve due to an increase of internal pressure, or from decreasing effective quantity of electrolyte due to an irreversible expansion of the case. Therefore, it is possible to prevent the deterioration of discharge capacity at a relatively early stage of charge/discharge cycle and also to enhance the charge/discharge cycle life of the battery.

In particular, when the hydrogen-absorbing alloy exhibits a highest peak in the range of 42.1°±1° and does not exhibit a peak having an intensity greater than 15% of that of the highest peak in the range of 30.2°±1° as measured by X-ray diffraction using CuKα-ray, it is possible not only to prevent the battery from generating an internal short-circuit or increasing internal pressure at a relatively early stage of charge/discharge cycle, but also to enhance the charge/discharge cycle life of the battery. Further, when the hydrogen-absorbing alloy further exhibits a peak having an intensity of more than 5% of the highest peak in the range of 32.5°±1°, it is possible to further improve the charge/discharge cycle life of the secondary battery.

According to the third nickel-hydrogen secondary battery of this invention, since not only the density of the mixture containing the hydrogen-absorbing alloy represented by the aforementioned general formula (A) but also the tightness of the electrode group fall within specific ranges respectively, it is possible to suppress the self-discharging at the initial stage of the charge/discharge cycle of the nickel-hydrogen secondary battery comprising a negative electrode containing the hydrogen-absorbing alloy represented by the aforementioned general formula (A). The reason for this may be explained as follows.

In the case of a nickel-hydrogen secondary battery, a hydrogen partial pressure corresponding to the equilibrium pressure of the hydrogen-absorbing alloy contained in a negative electrode is retained in the case during the storage thereof. This phenomenon occurs inevitably in the case of the nickel-hydrogen secondary battery comprising the negative electrode containing the hydrogen-absorbing alloy. In the case of a closed type secondary battery, when this hydrogen is contacted with a positive electrode, the charge-reaction product of the positive electrode such as nickel oxyhydroxide is reduced, thus allowing a self-discharging reaction to proceed. This self-discharging reaction is further promoted as the ambient temperature of storage becomes higher. This self-discharging reaction can be effectively suppressed by reducing the chance of reaction between the charged positive electrode and the gaseous hydrogen. As one of the methods to reduce this chance of contact between them, there is known a method wherein the hydrophilicity of the separator is enhanced, thereby increasing the electrolyte retention quantity of the separator and hence filling the voids of the separator with the electrolyte, and at the same time, the wettability of the surface of the positive electrode is enhanced, thus inhibiting the diffusion of the hydrogen gas.

It has been found as a result of intensive study made by the present inventors that the hydrogen-absorbing alloy represented by the aforementioned general formula (A) indicates more prominent volumetric change at the occasion of charging/discharging as compared with the known alloys, and hence the magnitude of self-discharging reaction is more changeable at the initial period of the charge/discharge cycle. Based on this findings, the present inventors have further found that the self-discharging reaction can be suppressed by optimizing not only the density of the mixture of the negative electrode but also the construction of the electrode group. Thus, it has been found that the self-discharging reaction at the initial period of the charge/discharge cycle can be suppressed by taking into account the volumetric change accompanying the charging/discharging of the negative electrode containing the hydrogen-absorbing alloy represented by the aforementioned general formula (A) at the occasion of designing the negative electrode and the electrode group.

Namely, when the negative electrode is expanded due to the charging of the secondary battery, the separator is compressed. As a result of this compression of the separator, the voids inside the separator and the quantity of electrolyte are caused to change, and hence the magnitude in proceeding of the self-discharging reaction is also altered. The magnitude of expansion and shrinkage of the negative electrode is greatly influenced by the ratio in volumetric change of a hydrogen-absorbing alloy to be employed, and this ratio in volumetric change differs depending on the kinds of the hydrogen-absorbing alloy. In other words, the composition of the hydrogen-absorbing alloy, the density of the mixture of the negative electrode and the tightness of the electrode group are closely interrelated with each other. Accordingly, it is possible, in the nickel-hydrogen secondary battery comprising an negative electrode containing the hydrogen-absorbing alloy represented by the aforementioned general formula (A), to suppress the self-discharging by confining the density of the mixture in the negative electrode to 5.1 g/cc to 5.8 g/cc, and also confining the tightness of the electrode group to the range of 98 to 110%.

Namely, if the density of the mixture in the negative electrode is less than 5.1 g/cc, the compression of the separator becomes insufficient, thus making it difficult to minimize the void in the separator. On the other hand, if the density of the mixture in the negative electrode is more than 5.8 g/cc, even though it may be possible to reduce the void in the separator due to the expansion of the alloy as a result of charging, the gap between the particles of alloy in the negative electrode is enlarged, thus allowing the electrolyte in the separator to move into the gap. As a result, the retention of the electrolyte by the separator would be reduced, thus making it impossible to sufficiently fill the void in the separator with the electrolyte, and hence the magnitude of self-discharging would be increased.

On the other hand, if the tightness of the electrode group is less than 98%, the compression of the separator by the expansion of the negative electrode resulting from charging would become insufficient, thus enlarging the void in the separator. As a result, it becomes impossible to suppress the diffusion of hydrogen gas, and hence the self-discharging may be prominently proceed. On the other hand, if the tightness of the electrode group is more than 110%, even though it may be possible to strongly compress the separator thereby to minimize the void in the separator, the quantity of electrolyte in the separator would be reduced, thus promoting the process of self-discharge.

Therefore, it is now possible according to this invention to inhibit the self-discharge of the nickel-hydrogen secondary battery comprising a negative electrode containing the hydrogen-absorbing alloy represented by the aforementioned general formula (A).

Since the width of the electrode group along the laminated direction thereof is set to 98 to 100% of the inner width of the case as taken along the laminated direction of the electrode group, it is now possible to smoothly house the electrode group into the case and, at the same time, to further inhibit the self-discharge of the nickel-hydrogen secondary battery.

Further, when the hydrogen-absorbing alloy exhibits a highest peak in the range of 42.1°±1° and does not exhibit a peak having an intensity greater than 15% of that of the highest peak in the range of 30.2°±1° as measured by X-ray diffraction using CuK α-ray, it is now possible not only to improve the self-discharge-inhibiting property of the secondary battery, but also to improve the charge/discharge cycle life of the secondary battery. Further, when the hydrogen-absorbing alloy further exhibits a peak having an intensity of more than 5% of the aforementioned highest peak in the range of 32.5°±1°, it is now possible to further improve the charge/discharge cycle life of the secondary battery.

Next, a hydrogen-absorbing alloy according to the present invention, a secondary battery comprising a negative electrode containing such a hydrogen-absorbing alloy, a hybrid car comprising such a secondary battery, and an electromobile comprising such a secondary battery will be explained as follows.

<A First Hydrogen-absorbing Alloy>

This first hydrogen-absorbing alloy contains, as a principal phase, at least one kind of phase selected from the group consisting of a first phase having a hexagonal crystal system (excluding a phase having a CaCu$_5$ type crystal structure) and a second phase having a rhombohedral crystal system. Further, this hydrogen-absorbing alloy has a composition represented by the following general formula (1):

$$R_{1-a-b}Mg_aT_bNi_{Z-X-Y-\alpha}M1_XM2_Y Mn_\alpha \quad (1)$$

wherein R is at least one kind of element selected from rare earth elements (which include Y); T is at least one element selected from the group consisting of Ca, Ti, Zr and Hf; M1 is at least one element selected from the group consisting of Co and Fe; M2 is at least one element selected from the group consisting of Al, Ga, Zn, Sn, Cu, Si, B, Nb, W, Mo, V, Cr, Ta, Li, P and S; and the atomic ratios of a, b, X, Y, α and Z are respectively a number satisfying the conditions of: $0.15 \leq a \leq 0.37$, $0 \leq b \leq 0.3$, $0 \leq X \leq 1.3$, $0 \leq Y \leq 0.5$, $0 \leq \alpha < 0.135$, and $2.5 \leq Z \leq 4.2$.

The aforementioned first phase should preferably be constituted by a phase having Ce$_2$Ni$_7$ type crystal structure, a phase having CeNi$_3$ type crystal structure and a phase having a crystal structure which is similar to Ce$_2$Ni$_7$ or CeNi$_3$ type structure. On the other hand, the aforementioned second phase should preferably be constituted by a phase having Gd$_2$Co$_7$ type crystal structure, a phase having PuNi$_3$ type crystal structure and a phase having a crystal structure which is similar to Gd$_2$Co$_7$ or PuNi$_3$ type structure.

In this case, by the expressions of "a phase having a crystal structure which is similar to Ce$_2$Ni$_7$ type structure, CeNi$_3$ type structure, Gd$_2$Co$_7$ type structure or PuNi$_3$ type structure (hereinafter, referred to as an analogous crystal phase)", it is meant a phase whose main peak in the X-ray diffraction pattern thereof is similar to the main peak in the X-ray diffraction pattern of the normal structure. This analogous crystal phase should preferably have a crystal structure which can be defined by the Miller index of the Ce$_2$Ni$_7$ type crystal structure, CeNi$_3$ type crystal structure, Gd$_2$Co$_7$ type crystal structure or PuNi$_3$ type crystal structure. It is more preferable that this analogous crystal phase has such a crystal structure as explained with reference to the following items (1) or (2).

(1) A crystal structure wherein a peak exhibiting a highest intensity in an X-ray diffraction using CuKα-ray appears within 2θ of 42.1±1°, θ being Bragg angle, and the intensity ratio represented by the following formula (I) is not more than 80%:

$$I_3/I_4 \quad (I)$$

wherein $I_4$ is an intensity of a peak exhibiting a highest intensity in an X-ray diffraction using CuKα-ray; and $I_3$ is an intensity of a peak appearing within 2θ of 31 to 34°, θ being Bragg angle, in the X-ray diffraction.

(2) A crystal structure wherein a peak exhibiting a highest intensity in an X-ray diffraction using CuKα-ray appears within 2θ of 42.1±1°, and the peak appearing within 2θ of 31 to 34° in the X-ray diffraction is split into a plurality of peaks. θ is Bragg angle.

Figure 6:
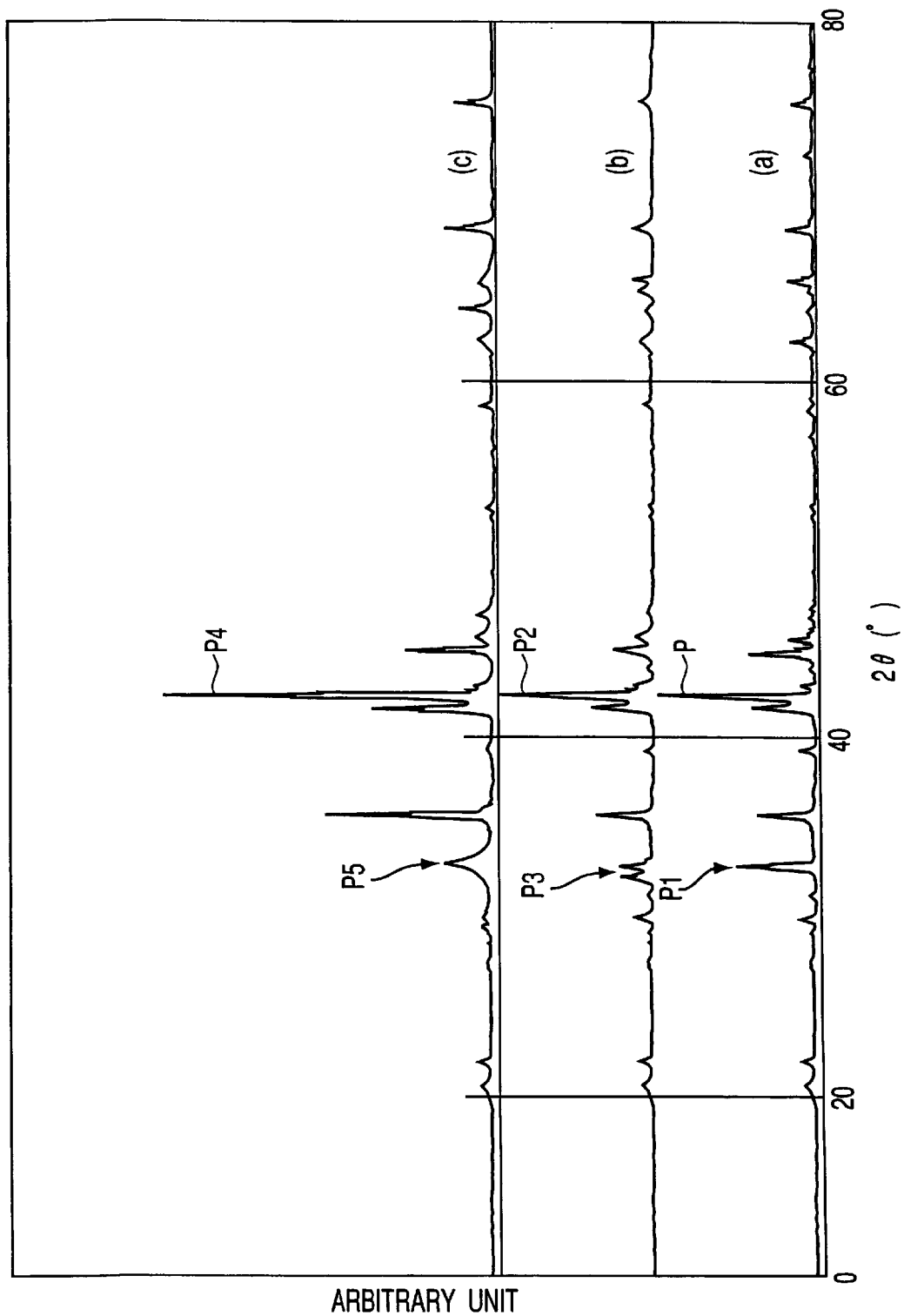
FIG. 6 is a chart showing an X-ray diffraction pattern which was obtained using CuKα-ray on the examples of the hydrogen-absorbing alloy according to this invention.

FIG. 6 shows an X-ray diffraction pattern which was obtained using CuKα-ray on the hydrogen-absorbing alloy containing as a principal phase a phase having the Ce$_2$Ni$_7$ type crystal structure, and on the hydrogen-absorbing alloy containing as a principal phase a phase having a crystal structure which is similar to the Ce$_2$Ni$_7$ type crystal structure. The diffraction pattern of (a) in FIG. 6 is of the hydrogen-absorbing alloy containing as a principal phase a phase having the Ce$_2$Ni$_7$ type crystal structure. In this hydrogen-absorbing alloy, the main peaks P, P1 thereof appear within 2θ of 42.1±1° and within 2θ of 31 to 34° in the X-ray diffraction. Further, the peak P appearing within 2θ of 42.1±1° is the highest in intensity.

The diffraction patterns of (b) and (c) in FIG. 6 are of the hydrogen-absorbing alloys containing as a principal phase a phase having a crystal structure which is similar to the Ce$_2$Ni$_7$ type structure. In the diffraction pattern of (b) of FIG. 6, a peak P2 exhibiting the highest intensity appears within 2θ of 42.1±1°, and the peak P3 appearing within 2θ of 31 to 34° is split into two. The intensity of this peak P3 which is split into two is lower in intensity than that of the peak P1 appearing within 2θ of 31 to 34° in the diffraction pattern of aforementioned (a). On the other hand, in the diffraction pattern of (c) of FIG. 6, a peak P4 exhibiting the highest intensity appears within of 2θ of 42.1±1°, and the peak P5 appearing within 2θ of 31 to 34° is lower in intensity than that of the peak P1 appearing within 2θ of 31 to 34° in the diffraction pattern of aforementioned (a). When the intensity ratio is calculated in this case according to the aforementioned formula (I) based on the diffraction pattern of (c), it would become not more than 20%. A hydrogen-absorbing alloy containing as a principal phase a phase having a crystal structure which is similar to the Ce$_2$Ni$_7$ structure can be obtained by adjusting the temperature of heat treatment of the alloy.

The principal phase of the hydrogen-absorbing alloy should preferably be formed of at least one kind of phase selected from the group consisting of a phase having $PuNi_3$ type crystal structure, a phase having a crystal structure which is similar to the $PuNi_3$ type structure, a phase having $Ce_2Ni_7$ type crystal structure, and a phase having a crystal structure which is similar to the $Ce_2Ni_7$ type structure. It is more preferable that the aforementioned principal phase is formed of at least one kind of phase selected from the group consisting of a phase having $Ce_2Ni_7$ type crystal structure and a phase having a crystal structure which is similar to the $Ce_2Ni_7$ type structure.

In this case, by the expression of "principal phase", it is meant a situation where at least one kind of phase selected from the group consisting of the aforementioned first phase and second phase occupies the largest volume ratio in the hydrogen-absorbing alloy, or occupies the largest area in a cross-section of the hydrogen-absorbing alloy. It is more preferable that at least one kind of phase selected from the group consisting of the aforementioned first phase and second phase occupies 50% or more in areal ratio in the hydrogen-absorbing alloy. Because, if this areal ratio is less than 50%, the hydrogen storage capacity would be undesirably reduced, thereby deteriorating the discharge capacity of the secondary battery comprising a negative electrode containing such a hydrogen-absorbing alloy, or deteriorating the charge/discharge cycle life of the battery. A more preferable range of the areal ratio is not less than 60%, most preferably not less than 70%.

In addition to the aforementioned at least one kind of phase selected from the group consisting of the aforementioned first phase and second phase, the hydrogen-absorbing alloy may further contain a phase having an $AB_5$ type crystal structure such as a $CaCu_5$ type crystal structure, a phase having an $AB_2$ type crystal structure such as a $MgCu_2$ type crystal structure, or a phase containing both of these $AB_5$ type and $AB_2$ type crystal structures.

As for the R, it is more preferable in view of saving the manufacturing cost of the electrode containing a hydrogen-absorbing alloy to employ at least one kind of rare earth elements selected from the group consisting of La, Ce, Pr, Nd and Y. Among them, a most preferable example of the R is a misch metal which is a mixture of rare earth elements. As for the misch metal, it is possible to employ a Ce-rich misch metal (Mm) or a La-rich misch metal (Lm).

It is also preferable that the R includes La, the preferable content of which being at a ratio of 60 at % or more. Because, if the content of La is less than 60 at %, the pulverization of the alloy that may be brought about repeating the hydrogen absorption/desorption reaction may occur. As a result, the cycle life of the secondary battery comprising a negative electrode containing such a hydrogen-absorbing alloy may be deteriorated. More preferable content of La is 70 at % or more. However, the upper limit of La should preferably be set to 99 at %. Because, if the content of La is more than 99 at %, the reversibility of the hydrogen absorption/desorption reaction of the hydrogen-absorbing alloy would be more likely to be deteriorated.

It is possible, through the limitation of atomic ratio "a" to the aforementioned range, to enhance the hydrogen storage capacity, and to facilitate the release of hydrogen, thereby improving the discharge capacity of the resultant secondary battery. If the atomic ratio "a" is less than 0.15, the hydrogen-desorption property of the alloy would be deteriorated. On the other hand, if the atomic ratio "a" is more than 0.37, the hydrogen storage capacity would be greatly lowered, thus making it impossible to obtain a secondary battery having a large discharge capacity. The atomic ratio "a" should more preferably be in the range of 0.15 to 0.35, further preferably in the range of 0.15 to 0.32, most preferably in the range of 0.17 to 0.3.

When the aforementioned "T" is included in the hydrogen-absorbing alloy, it becomes possible to improve the characteristics of the alloy such as hydrogen-desorption rate without greatly deteriorating the hydrogen storage capacity of the alloy, or to suppress the pulverization of the alloy that may be brought about repeating the absorption and desorption of hydrogen.

If the atomic ratio "b" is more than 0.3, it would become impossible to expect any improvement in the hydrogen desorption property of the alloy and to suppress the pulverization of the alloy. As a result, the secondary battery comprising a negative electrode containing such a hydrogen-absorbing alloy would become deteriorated in discharge capacity. Therefore, the atomic ratio "b" should more preferably be in the range of 0 to 0.2, most preferably in the range of 0 to 0.1.

When the aforementioned "M1" is included in the hydrogen-absorbing alloy, it becomes possible to improve the hydrogen absorption and desorption characteristics of the alloy such as hydrogen-absorption/desorption rate. This may be ascribed to the facts that when M1 is added to the hydrogen-absorbing alloy, the diffusion of hydrogen that has entered into the alloy can be facilitated, and at the same time, the absorption and desorption of hydrogen in the hydrogen-absorbing alloy can be facilitated. As a result, the secondary battery comprising a negative electrode containing such a hydrogen-absorbing alloy would be improved in initial activity.

If the atomic ratio X exceeds over 1.3, the charge/discharge cycle life of the secondary battery would be deteriorated. Therefore, the atomic ratio X should more preferably be in the range of 0 to 0.3.

When the aforementioned "M2" is included in the hydrogen-absorbing alloy, it becomes possible to improve the hydrogen absorption and desorption characteristics of the alloy such as hydrogen-absorption/desorption rate. This may be ascribed to the facts that when M2 is added to the hydrogen-absorbing alloy, the diffusion of hydrogen that has entered into the alloy can be facilitated, and at the same time, the absorption and desorption of hydrogen in the hydrogen-absorbing alloy can be facilitated. As a result, the secondary battery comprising a negative electrode containing such a hydrogen-absorbing alloy would be greatly improved in charge/discharge cycle life.

If the atomic ratio Y exceeds over 0.5, the discharge capacity of the secondary battery would be deteriorated. Therefore, the atomic ratio Y should more preferably be in the range of 0.01 to 0.2.

Next, the reasons for limiting the atomic ratio $\alpha$ to the aforementioned range will be explained. When the atomic ratio $\alpha$ is 0.135 or more, the hydrogen equilibrium pressure would be deteriorated, and at the same time, the reversibility of the hydrogen absorption/desorption reaction would be deteriorated. The secondary battery comprising a negative electrode containing such a hydrogen-absorbing alloy would be deteriorated in terms of discharge voltage, thereby lowering the discharge capacity. The atomic ratio $\alpha$ should more preferably be in the range of 0 to 0.13, most preferably in the range of 0 to 0.1.

Then, the reasons for limiting the atomic ratio Z to the aforementioned range will be explained. When the atomic ratio Z becomes less than 2.5, a phase having an $AB_2$ type crystal structure such as an $MgCu_2$ type crystal structure would become a principal phase. On the other hand, when the atomic ratio Z exceeds over 4.2, a phase having an $AB_5$ type crystal structure such as a $CaCu_5$ type crystal structure would become a principal phase. Therefore, a secondary battery comprising a negative electrode containing such a hydrogen-absorbing alloy where the atomic ratio Z is less than 2.5 or more than 4.2 would be deteriorated in terms of discharge capacity and charge/discharge cycle life. Therefore, the atomic ratio Z should more preferably be in the range of 2.5 to 4, further preferably in the range of 3 to 3.8, most preferably in the range of 3 to 3.7.

It is particularly preferable that the atomic ratios of a, X, Y and Z are respectively satisfy the conditions of: $0.15 \leq a \leq 0.35$, $0 \leq X \leq 0.3$, $0 \leq Y \leq 0.3$, and $2.5 \leq Z \leq 4$. The secondary battery comprising a negative electrode containing such a hydrogen-absorbing alloy can be greatly improved in discharge capacity as well as in charge/discharge cycle life.

The hydrogen-absorbing alloy according to this invention may contain other kinds of elements such as C, N, O, F, etc. more or less as an impurity as long as it would not substantially obstruct the property of the hydrogen-absorbing alloy of this invention. By the way, it is preferable that the inclusion of these impurities should be limited to not more than 1 wt %, respectively.

Next, the method of manufacturing this first hydrogen-absorbing alloy will be explained.

First of all, each element was weighed to obtain a predetermined mixture, which was then subjected to a high frequency induction melting in an inert gas atmosphere such as an argon atmosphere for instance to obtain an alloy ingot having a composition represented by the aforementioned general formula (1). By the way, if an aimed alloy is produced by making use of a rapid solidification such as a single rolling method, a double rolling method, a disc-atomizing method or a gas-atomizing method, it is possible to enhance the homogeneity of the alloy. However, in view of reducing the manufacturing cost, the employment of a casting method as represented by the aforementioned high frequency induction melting is more preferable in obtaining the alloy having an aimed composition.

The aforementioned at least one kind of phase selected from the group consisting of the first phase and the second phase is assumed to be produced through a peritectic reaction between the $AB_2$ phase and the $AB_5$ phase. Therefore, the resultant alloy having a composition represented by the formula (1) should desirably be heat-treated in vacuum or in an inert atmosphere at a temperature ranging from 300° C. to less than melting point thereof for a time period ranging from 0.1 to 500 hours. More preferable temperature for this heat treatment is in the range of 600 to 1,100° C., though the optimum temperature for this heat treatment may depend on the specific composition of the alloy. Because, if the temperature for this heat treatment is less than 600° C., the peritectic reaction would not sufficiently take place, thereby possibly leaving a large quantity of a phase having the $AB_2$ type crystal structure as well as a large quantity of a phase having the $AB_5$ type crystal structure in the alloy. On the other hand, if the temperature for this heat treatment is higher than 1,100° C., a portion of the hydrogen-absorbing alloy may be melted, thereby deteriorating the characteristics of the alloy.

<A Second Hydrogen-absorbing Alloy>

This second hydrogen-absorbing alloy exhibits less than 0.15 (including 0) in intensity ratio to be calculated according to the following formula (2):

$$I_1/I_2 \quad (2)$$

wherein $I_2$ is an intensity of a peak exhibiting a highest intensity in an X-ray diffraction pattern using CuKα-ray; and $I_1$ is an intensity of a peak exhibiting a highest intensity within 2θ of 8 to 13°, θ being Bragg angle, in the X-ray diffraction pattern.

By the way, a situation where this intensity ratio ($I_1/I_2$) is zero means a case where no peak can be detected in 2θ of 8 to 13°. Meanwhile, if there is only one peak within 2θ of 8 to 13°, the intensity of the peak is determined as $I_1$. On the other hand, if a plurality of peaks all exhibiting the same intensity with each other are appeared within 2θ of 8 to 13°, the intensity of any one of the peaks is determined as $I_1$.

Further, the composition of this hydrogen-absorbing alloy is represented by the following general formula (3):

$$R_{1-a-b}Mg_aT_bNi_{Z-X}M3_X \quad (3)$$

wherein R is at least one kind of element selected from rare earth elements (which include Y); T is at least one element selected from the group consisting of Ca, Ti, Zr and Hf; M3 is at least one element selected from the group consisting of Co, Mn, Fe, Al, Ga, Zn, Sn, Cu, Si, B, Nb, W, Mo, V, Cr, Ta, Li, P and S; and the atomic ratios of a, b, X and Z are respectively a number satisfying the conditions of: $0.1 \leq a \leq 0.6$, $0 \leq b \leq 0.3$, $0 \leq X \leq 2$, and $2.5 \leq Z \leq 4$.

When the intensity ratio, $I_1/I_2$ becomes more than 0.15, the hydrogen-absorbing property of the alloy would be deteriorated. Therefore, a secondary battery comprising a negative electrode containing such a hydrogen-absorbing alloy would be deteriorated in terms of discharge capacity and charge/discharge cycle life. Therefore, the intensity ratio should more preferably be not more than 0.1, most preferably not more than 0.05.

As for the R, it is more preferable in view of saving the manufacturing cost of the electrode containing a hydrogen-absorbing alloy to employ at least one kind of rare earth elements selected from the group consisting of La, Ce, Pr, Nd and Y. Among them, a most preferable example of the R is a misch metal which is a mixture of rare earth elements. As for the misch metal, it is possible to employ a Ce-rich misch metal (Mm) or a La-rich misch metal (Lm).

It is also preferable that the R includes La, the preferable content of which being at a ratio of 60 at % or more. Because, if the content of La is less than 60 at %, the pulverization of the alloy that may be brought about repeating the hydrogen absorption/desorption reaction may occur. As a result, the cycle life of the secondary battery comprising a negative electrode containing such a hydrogen-absorbing alloy may be deteriorated. More preferable content of La is 70 at % or more. However, the upper limit of La should preferably be set to 99 at %. Because, if the content of La is more than 99 at %, the reversibility of the hydrogen absorption/desorption reaction of the hydrogen-absorbing alloy would be more likely to be deteriorated.

It is possible, through the limitation of atomic ratio "a" to the aforementioned range, to enhance the hydrogen storage capacity, and to facilitate the release of hydrogen, thereby improving the discharge capacity of the resultant secondary battery. If the atomic ratio "a" is less than 0.1, the hydrogen-desorption property of the alloy would be deteriorated. On the other hand, if the atomic ratio "a" is more than 0.6, the hydrogen storage capacity would be greatly lowered, thus making it impossible to obtain a secondary battery having a large discharge capacity. As the atomic ratio "a" is increased, the intensity of peak appearing within 2θ of 8 to 13° of the X-ray diffraction pattern would be proportionately increased, thereby increasing the intensity ratio, $I_1/I_2$. Therefore, the atomic ratio "a" should more preferably be confined within the range of 0.15 to 0.35, further preferably in the range of 0.15 to 0.32, most preferably in the range of 0.17 to 0.3.

When the aforementioned "T" is included in the hydrogen-absorbing alloy, it becomes possible to improve the characteristics of the alloy such as hydrogen-desorption rate without greatly deteriorating the hydrogen storage capacity of the alloy, or to suppress the pulverization of the alloy that may be brought about repeating the absorption and desorption of hydrogen.

If the atomic ratio "b" is more than 0.3, it would become impossible to expect any improvement in the hydrogen desorption property of the alloy and to suppress the pulverization of the alloy. As a result, the secondary battery comprising a negative electrode containing such a hydrogen-absorbing alloy would become deteriorated in discharge capacity. Therefore, the atomic ratio "b" should more preferably be in the range of 0 to 0.2, most preferably in the range of 0 to 0.1.

When the aforementioned "M3" is included in the hydrogen-absorbing alloy, it becomes possible to improve the hydrogen absorption and desorption characteristics of the alloy such as hydrogen-absorption/desorption rate. This may be ascribed to the facts that when M3 is added to the hydrogen-absorbing alloy, the diffusion of hydrogen that has entered into the alloy can be facilitated, and at the same time, the absorption and desorption of hydrogen in the hydrogen-absorbing alloy can be facilitated. As a result, the secondary battery comprising a negative electrode containing such a hydrogen-absorbing alloy would be improved in charge/discharge cycle property.

If the atomic ratio X exceeds over 2.0, the discharge capacity of the secondary battery would be deteriorated. Therefore, the atomic ratio X should more preferably be in the range of 0 to 0.5.

Then, the reasons for limiting the atomic ratio Z to the aforementioned range are as follows. When the atomic ratio Z becomes less than 2.5, a large quantity of hydrogen would be accumulated in the alloy, thereby deteriorating the desorption rate of hydrogen. On the other hand, when the atomic ratio Z exceeds over 4, a phase having an $AB_5$ type crystal structure would generated in large quantity, so that a secondary battery comprising a negative electrode containing such a hydrogen-absorbing alloy would be deteriorated in terms of discharge capacity. Therefore, the atomic ratio Z should more preferably be in the range of 3.0 to 4.0.

It is particularly preferable that the atomic ratios of "a" and X are respectively satisfy the conditions of: $0.15 \leq a \leq 0.35$, and $0 \leq X \leq 0.5$. The secondary battery comprising a negative electrode containing such a hydrogen-absorbing alloy can be greatly improved in discharge capacity as well as in charge/discharge cycle life.

The hydrogen-absorbing alloy according to this invention may contain other kinds of elements such as C, N, O, F, etc. more or less as an impurity as long as it would not substantially obstruct the property of the hydrogen-absorbing alloy of this invention. By the way, it is preferable that the inclusion of these impurities should be limited to not more than 1 wt %, respectively.

Next, the method of manufacturing this second hydrogen-absorbing alloy will be explained.

First of all, each element was weighed to obtain a predetermined mixture, which was then subjected to a high frequency induction melting in an inert gas atmosphere such as an argon atmosphere for instance to obtain an alloy ingot having a composition represented by the aforementioned general formula (3). By the way, if an aimed alloy is produced by making use of a rapid solidification such as a single rolling method, a double rolling method, a disc-atomizing method or a gas-atomizing method, it is possible to enhance the homogeneity of the alloy. However, in view of reducing the manufacturing cost, the employment of a casting method as represented by the aforementioned high frequency induction melting is more preferable in obtaining the alloy having an aimed composition. The aforementioned crystal structure where the intensity ratio, $I_1/I_2$ is not more than 0.15 is assumed to be produced through a peritectic reaction between the $AB_2$ phase and the $AB_5$ phase.

Therefore, the resultant alloy having a composition represented by the formula (3) should desirably be heat-treated in vacuum or in an inert atmosphere at a temperature ranging from 300° C. to less than melting point thereof for a time period ranging from 0.1 to 500 hours. More preferable temperature for this heat treatment is in the range of 600 to 1,100° C., though the optimum temperature for this heat treatment may depend on the specific composition of the alloy. Because, if the temperature for this heat treatment is less than 600° C., the peritectic reaction would not sufficiently take place, thereby possibly leaving a large quantity of a phase having the $AB_2$ type crystal structure as well as a large quantity of a phase having the $AB_5$ type crystal structure in the alloy. On the other hand, if the temperature for this heat treatment is higher than 1,100° C., a portion of the hydrogen-absorbing alloy may be melted, thereby deteriorating the characteristics of the alloy.

<A Third Hydrogen-absorbing Alloy>

This third hydrogen-absorbing alloy has a composition represented by the following general formula (4):

$$R_{1-a}Mg_aNi_{Z-X-Y}Al_XCo_YM4_\alpha \qquad (4)$$

wherein R is at least one kind of element selected from rare earth elements (which include Y) with a proviso that the content of Ce in said R is less than 20% by weight (including 0% by weight); M4 is at least one element selected from the group consisting of Mn, Fe, Al, Ga, Zn, Sn, Cu, Si, B, Nb, W, Ti, Zr, In, Mo, V, Cr, P and S; and the atomic ratios of a, X, Y, Z and α are respectively a number satisfying the conditions of: $0.15 \leq a \leq 0.33$, $0.06 \leq X \leq 0.15$, $0 \leq Y \leq 0.2$, $3.15 < Z \leq 3.55$, and $0 \leq \alpha < 0.135$.

The reasons for limiting the atomic ratio "a" to the aforementioned range are as follows. Namely, if the atomic ratio "a" is less than 0.15, the hydrogen absorbed in the hydrogen-absorbing alloy is stabilized, thereby making it difficult to release the hydrogen from the hydrogen-absorbing alloy. On the other hand, if the atomic ratio "a" is more than 0.33, a phase (for example, $CaCu_5$ type crystal phase) which differs from the aimed phase is more likely to be precipitated, thereby possibly deteriorating the hydrogen storage capacity. Therefore, more preferable range of the atomic ratio "a" is: $0.17 \leq a \leq 0.31$, most preferably $0.18 \leq a \leq 0.3$.

As for the R, it is more preferable in view of saving the manufacturing cost of the electrode containing a hydrogen-absorbing alloy to employ at least one kind of rare earth elements selected from the group consisting of La, Ce, Pr, Nd and Y. Among them, a most preferable example of the R is a misch metal which is a mixture of rare earth elements.

Next, the reasons for limiting the content of Ce in the R will be explained. If the content of Ce is 20% by weight or more, a phase (for example, $CaCu_5$ type crystal phase)

which differs from the aimed phase is more likely to be precipitated, thereby possibly deteriorating the hydrogen storage capacity. Therefore, a preferable range of Ce content is less than 18% by weight, more preferably less than 16% by weight.

It is also preferable that the R includes La, the preferable content of which being at a ratio of 60 at % or more. Because, if the content of La is less than 60 at %, the pulverization of the alloy that may be brought about repeating the hydrogen absorption/desorption reaction may occur. As a result, the cycle life of the secondary battery comprising a negative electrode containing such a hydrogen-absorbing alloy may be deteriorated. More preferable content of La is 70 at % or more. However, the upper limit of La should preferably be set to 99 at %. Because, if the content of La is more than 99 at %, the reversibility of the hydrogen absorption/desorption reaction of the hydrogen-absorbing alloy would be more likely to be deteriorated.

Next, the reasons for limiting the atomic ratio X to the aforementioned range will be explained. Namely, if the atomic ratio X is less than 0.06, the deterioration of characteristics to be induced by the oxidation of the alloy under a high temperature environment would be especially accelerated. On the other hand, if the atomic ratio X exceeds over 0.15, a phase (for example, $CaCu_5$ type crystal phase) which differs from the aimed phase may be precipitated. Therefore, more preferable range of the atomic ratio X is in the range of $0.07 \leq X \leq 0.13$, most preferably $0.08 \leq X \leq 0.12$.

Next, the reasons for limiting the atomic ratio Y to the aforementioned range will be explained. Even if the atomic ratio Y of Co is increased more than 0.2 in the alloy where the atomic ratio X of Al is confined within the aforementioned range, not only it is impossible to improve the corrosion resistance of the alloy, but also it will become disadvantageous in terms of manufacturing cost. Therefore, the atomic ratio Y should more preferably be in the range of $0 \leq Y \leq 0.18$, most preferably $0 \leq Y \leq 0.15$.

Next, the reasons for limiting the atomic ratio $\alpha$ to the aforementioned range will be explained. When the atomic ratio $\alpha$ is 0.135 or more, a phase (for example, $CaCu_5$ type crystal phase) which differs from the aimed phase may be precipitated, thereby possibly deteriorating the hydrogen storage capacity. Therefore, the atomic ratio $\alpha$ should more preferably be in the range of $0 \leq \alpha \leq 0.13$, more preferably $0 \leq \alpha \leq 0.12$, most preferable $0 \leq \alpha \leq 0.1$.

Then, the reasons for limiting the atomic ratio Z to the aforementioned range will be explained. When the atomic ratio Z becomes 3.15 or less, a Laves type phase (an $AB_2$ type crystal phase) is more likely to be precipitated, thereby increasing the residual hydrogen in concurrent with the repetition of hydrogen absorption/desorption. On the other hand, when the atomic ratio Z exceeds over 3.55, a phase (for example, $CaCu_5$ type crystal phase) which differs from the aimed phase is more likely to be precipitated, thereby deteriorating the hydrogen storage capacity. Therefore, the atomic ratio Z should more preferably be in the range of $3.17 \leq Z \leq 3.53$, most preferably $3.18 \leq Z \leq 3.52$.

This third hydrogen-absorbing alloy should preferably contains, as a principal phase, at least one kind of phase selected from the group consisting of a first phase having a hexagonal crystal system (excluding a phase having a $CaCu_5$ type crystal structure) and a second phase having a rhombohedral crystal system. The definition of "principal phase" is the same as explained with reference to the first hydrogen-absorbing alloy.

As for the specific examples of the first phase and the second phase, the same crystal phases as explained with reference to the first hydrogen-absorbing alloy will be employed.

The principal phase of this hydrogen-absorbing alloy should preferably be formed of at least one kind of phase selected from the group consisting of a phase having $PuNi_3$ type crystal structure, a phase having a crystal structure which is similar to the $PuNi_3$ type structure, a phase having $Ce_2Ni_7$ type crystal structure, and a phase having a crystal structure which is similar to the $Ce_2Ni_7$ type structure. It is more preferable that the aforementioned principal phase is formed of at least one kind of phase selected from the group consisting of a phase having $Ce_2Ni_7$ type crystal structure and a phase having a crystal structure which is similar to the $Ce_2Ni_7$ type structure.

It is more preferable, by the same reasons as explained with reference to the first hydrogen-absorbing alloy, that at least one kind of phase selected from the group consisting of the aforementioned first phase and second phase occupies 50% or more in areal ratio in the hydrogen-absorbing alloy. A more preferable range of the areal ratio is not less than 60%, most preferably not less than 70%.

In addition to the aforementioned at least one kind of phase selected from the group consisting of the aforementioned first phase and second phase, the hydrogen-absorbing alloy may further contain a phase having an $AB_5$ type crystal structure such as a $CaCu_5$ type crystal structure, a phase having an $AB_2$ type crystal structure such as a $MgCu_2$ type crystal structure, or a phase containing both of these $AB_5$ type and $AB_2$ type crystal structures.

The hydrogen-absorbing alloy according to this invention may contain other kinds of elements such as C, N, O, F, etc. more or less as an impurity as long as it would not substantially obstruct the property of the hydrogen-absorbing alloy of this invention. By the way, it is preferable that the inclusion of these impurities should be limited to not more than 1 wt %, respectively.

Next, the method of manufacturing this third hydrogen-absorbing alloy will be explained.

First of all, each element was weighed to obtain a predetermined mixture, which was then subjected to a high frequency induction melting in an inert gas atmosphere such as an argon atmosphere for instance to obtain an alloy ingot having a composition represented by the aforementioned general formula (4). By the way, if an aimed alloy is produced by making use of a rapid solidification such as a single rolling method, a double rolling method, a disc-atomizing method or a gas-atomizing method, it is possible to enhance the homogeneity of the alloy. However, in view of reducing the manufacturing cost, the employment of a casting method as represented by the aforementioned high frequency induction melting is more preferable in obtaining the alloy having an aimed composition.

The aforementioned at least one kind of phase selected from the group consisting of the first phase group and the second phase is assumed to be produced through a peritectic reaction between the $AB_2$ phase and the $AB_5$ phase. Therefore, the resultant alloy having a composition represented by the formula (4) should desirably be heat-treated in vacuum or in an inert atmosphere at a temperature ranging from 300° C. to less than melting point thereof for a time period ranging from 0.1 to 500 hours. More preferable temperature for this heat treatment is in the range of 600 to 1,100° C., though the optimum temperature for this heat treatment may depend on the specific composition of the alloy. Because, if the temperature for this heat treatment is less than 600° C., the peritectic reaction would not sufficiently take place, thereby possibly leaving a large quantity of a phase having the $AB_2$ type crystal structure as well as a large quantity of a phase having the $AB_5$ type crystal structure in the alloy. On the other hand, if the temperature for this heat treatment is higher than 1,100° C., a portion of the hydrogen-absorbing alloy may be melted, thereby deteriorating the characteristics of the alloy.

Next, the secondary battery according to this invention will be explained.

This secondary battery comprises an electrode group essentially consisting of a positive electrode, a negative electrode containing a hydrogen-absorbing alloy, and a separator interposed between the positive electrode and the negative electrode; and an electrolyte impregnated in the electrode group. As for the hydrogen-absorbing alloy, at least one kind of hydrogen-absorbing alloy selected from the aforementioned first, second and third hydrogen-absorbing alloys can be employed.

In the followings, the details of the positive electrode, the negative electrode, the separator and the electrolyte will be explained.

(1) The Positive Electrode

This positive electrode can be manufactured by a process wherein a conductive material is added at first to an active material, e.g. nickel hydroxide powder to obtain a mixture, which is then kneaded together with a binder and water to prepare a paste, which is then stuffed into a conductive substrate and, after being dried, pressed and punched into a predetermined shape.

The nickel hydroxide powder may contain at least one kind of compound selected from the group consisting of zinc oxide, cobalt oxide, zinc hydroxide and cobalt hydroxide.

As for the conductive material, cobalt oxide, cobalt hydroxide, metallic cobalt, metallic nickel and carbon can be used.

Examples of the binder are carboxymethyl cellulose, methyl cellulose, sodium polyacrylate, polytetrafluoroethylene.

The electroconductive substrate may be formed of a mesh-shape, sponge-shape, fibrous or felt-shape metallic porous body which is made of a metal such as nickel, stainless steel or a nickel-plated metal.

(2) The Negative Electrode

This negative electrode can be manufactured for example by a method wherein a conductive material is added at first to a hydrogen-absorbing alloy powder and then kneaded together with a binder and water to prepare a paste, which is then stuffed into an electroconductive substrate and, after being dried, pressed and punched into a predetermined shape, thereby forming the negative electrode.

As for the binder, the same materials as explained with reference to the positive electrode can be employed.

As for the conductive material, carbon black for example can be used.

An oxide such as $Y_2O_3$, $Er_2O_3$, $Yb_2O_3$, $Sm_2O_3$, $Mn_3O_4$, $LiMn_2O_4$, $Nb_2O_5$ or $SnO_2$ may be added to the aforementioned paste. It is possible, through the addition of these oxide to the negative electrode, to improve the charge/discharge cycle life of the battery at high temperatures. These oxides may be added singly or in combination of two or more kinds. The content of the oxide to be added should preferably be limited to the range of 0.2 to 5 wt %, more preferably 0.4 to 2 wt % based on the hydrogen-absorbing alloy.

The electroconductive substrate may be formed from a two-dimensional substrate such as a punched metal, an expanded metal and a nickel net; or a three-dimensional substrate such as a felt-shape metallic porous body or a sponge-shape metallic substrate.

(3) The Separator

The separator may be formed of a nonwoven polymer fabric such as a polypropylene nonwoven fabric, a nylon nonwoven fabric or a nonwoven fabric comprising polypropylene fiber and nylon fiber. In particular, a polypropylene nonwoven fabric treated to have a hydrophilic surface is preferable as a separator.

(4) Alkaline Electrolyte

Examples of the alkaline electrolyte which are useful in this invention include an aqueous solution of sodium hydroxide (NaOH), an aqueous solution of lithium hydroxide (LiOH), an aqueous solution of potassium hydroxide (KOH), a mixed solution of sodium hydroxide (NaOH) and lithium hydroxide (LiOH), a mixed solution of potassium hydroxide (KOH) and lithium hydroxide (LiOH), and a mixed solution of NaOH, KOH and LiOH.

The secondary battery according to this invention can be applied to such a cylindrical alkaline secondary battery as shown in FIG. 1. Alternatively, it is also possible to apply the secondary battery to a rectangular alkaline secondary battery, wherein a closed-end rectangular case is accommodated therein with an electrode group consisting of a laminated body comprising positive electrodes and negative electrodes which are alternately superimposed one upon another with a separator being interposed therebetween, and with an alkali electrolyte.

As for the hydrogen-absorbing alloy for the negative electrode of the aforementioned first, second and third nickel-hydrogen secondary batteries, at least one kind of hydrogen-absorbing alloy selected from the aforementioned first, second and third hydrogen-absorbing alloys can be employed.

Next, the hybrid car and electromobile according to this invention will be explained as follows.

The hybrid car according to this invention includes an external or internal combustion engine, an electric driving means such as a motor, and a power source for actuating the electric driving means. This power source comprises a secondary battery comprising a positive electrode, a negative electrode containing a hydrogen-absorbing alloy, and an alkaline electrolyte. As for the hydrogen-absorbing alloy, at least one kind of alloy selected from the aforementioned first, second and third hydrogen-absorbing alloys can be employed. By the way, with regard to the secondary battery, the aforementioned first, second and third nickel-hydrogen secondary batteries can be employed.

The "hybrid car" in this specification includes a car wherein an external or internal combustion engine is employed for actuating a generator, and the power generated by the generator and the power from the aforementioned secondary batteries are used for actuating the electric driving means to drive the wheels of the car; as well as a car wherein an external or internal combustion engine and the electric driving means are individually and properly selected in driving the wheels of the car.

The electromobile according to this invention includes a secondary battery as a driving power source. This secondary battery comprises a positive electrode, a negative electrode containing a hydrogen-absorbing alloy, and an alkaline electrolyte. As for the hydrogen-absorbing alloy, at least one kind of alloy selected from the aforementioned first, second and third hydrogen-absorbing alloys can be employed. By the way, with regard to the secondary battery, the aforementioned first, second and third nickel-hydrogen secondary batteries can be employed.

The aforementioned first hydrogen-absorbing alloy according to the present invention comprises, as a principal phase, at least one kind of phase selected from the group consisting of a first phase having a hexagonal crystal system (excluding a phase having a $CaCu_5$ type crystal structure) and a second phase having a rhombohedral crystal system. This hydrogen-absorbing alloy has a composition represented by the aforementioned general formula (1). According to this hydrogen-absorbing alloy, it becomes possible to enhance the hydrogen equilibrium pressure and to improve the reversibility of the hydrogen absorption/desorption reaction. Further, a secondary battery comprising a negative electrode containing this hydrogen-absorbing alloy is capable of enhancing the discharge voltage, so that the discharge capacity and charge/discharge cycle life thereof can be improved. Therefore, a hybrid car as well as an electromobile comprising such a secondary battery will exhibit an improved traveling performance such as fuel consumption.

The aforementioned second hydrogen-absorbing alloy according to the present invention exhibits an intensity ratio of less than 0.15 (including 0) as it is calculated according to the following formula (2). Further, this hydrogen-absorbing alloy has a composition represented by the aforementioned general formula (3). This hydrogen-absorbing alloy is excellent in hydrogen absorption property and exhibits an improved hydrogen desorption property in the vicinity of normal temperature. Further, a secondary battery comprising a negative electrode containing this hydrogen-absorbing alloy is of high capacity, exhibiting an excellent charge/discharge cycle property. Therefore, a hybrid car as well as an electromobile comprising such a secondary battery will exhibit an improved traveling performance such as fuel consumption.

The aforementioned third hydrogen-absorbing alloy according to the present invention has a composition represented by the aforementioned general formula (4). Since the atomic ratio X of Al in this hydrogen-absorbing alloy is in the range of 0.06 to 0.15, the equilibrium pressure thereof can be enhanced and the corrosion resistance thereof can be improved. Additionally, since the atomic ratio Y of Co in this hydrogen-absorbing alloy is in the range of 0 to 0.2, the pulverization of the alloy can be inhibited. Therefore, since a secondary battery comprising a negative electrode containing this hydrogen-absorbing alloy is capable of enhancing the discharge voltage, the discharge capacity thereof can be improved. Additionally, since a secondary battery comprising a negative electrode containing this hydrogen-absorbing alloy is capable of inhibiting the corrosion of hydrogen-absorbing alloy, the degree of consumption of alkaline electrolyte due to the corrosion of hydrogen-absorbing alloy can be minimized, thus making it possible to improve the charge/discharge cycle life thereof. As a result, a hybrid car as well as an electromobile comprising such a secondary battery will exhibit an improved traveling performance such as fuel consumption.

Since this third hydrogen-absorbing alloy comprises, as a principal phase, at least one kind of phase selected from the group consisting of a first phase having a hexagonal crystal system (excluding a phase having a $CaCu_5$ type crystal structure) and a second phase having a rhombohedral crystal system, the rechargeable hydrogen storage capacity can be greatly improved. As a result, a secondary battery comprising a negative electrode containing this hydrogen-absorbing alloy would be enabled to greatly improve the discharge capacity and charge/discharge cycle life thereof.

Next, the examples of this invention will be explained in detail as follows with reference to drawings.

EXAMPLES 1–25 and

Comparative Examples 1–12

<Preparation of a Negative Electrode>

By making use of a high frequency furnace, a hydrogen-absorbing alloy having a composition of $(La_{0.7}Mg_{0.3})Ni_{2.5}Co_{0.5}$ was obtained. The alloy thus obtained was then homogenized in an argon atmosphere by heat-treating it at a temperature of 900° C. This hydrogen-absorbing alloy was then subjected to an X-ray diffraction analysis using CuKα-ray to obtain a diffraction chart shown in FIG. 3.

Figure 3:
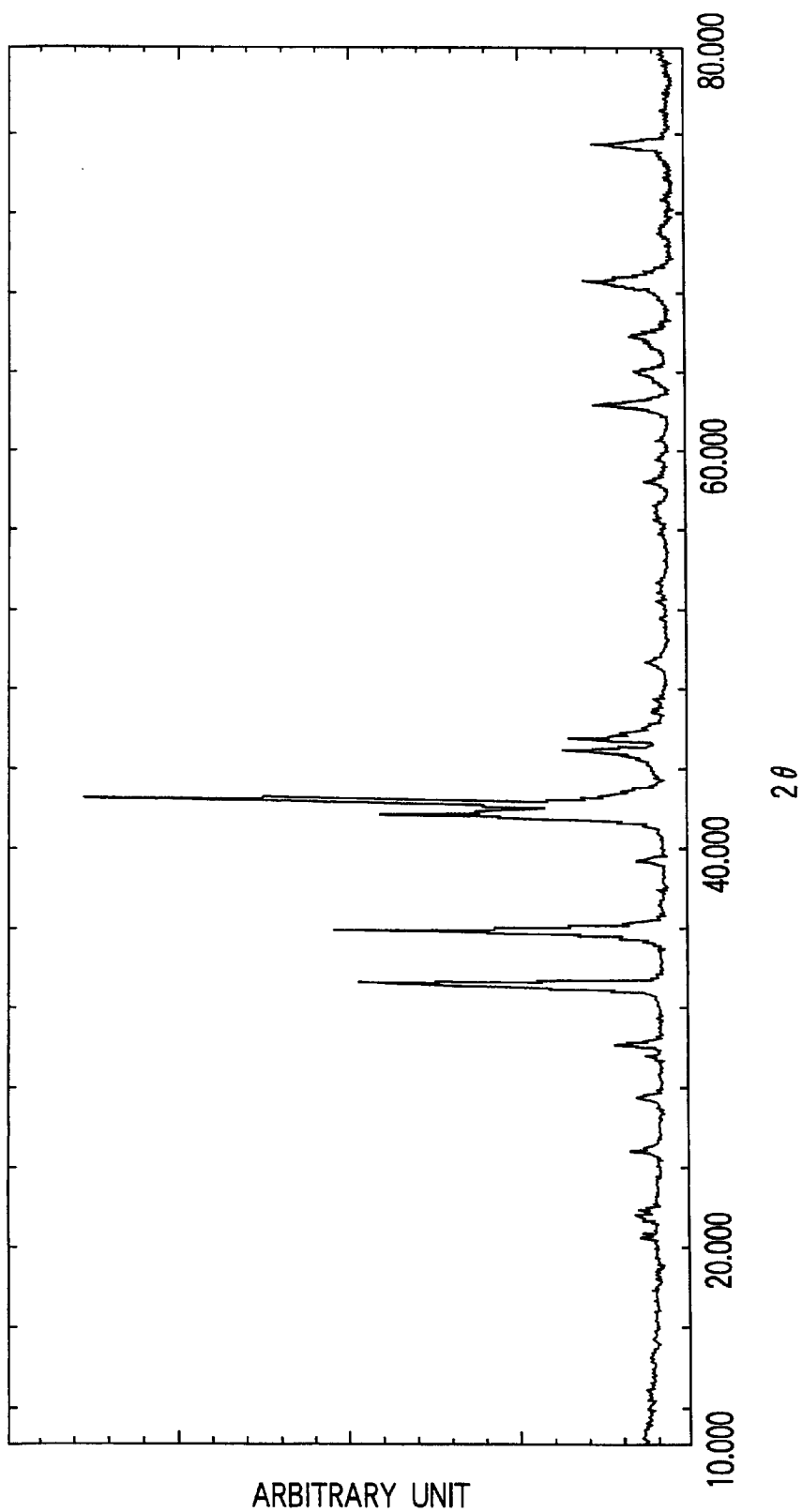
FIG. 3 is a chart as obtained in an X-ray diffraction analysis using CuKα-ray on the hydrogen-absorbing alloy contained in the negative electrode of nickel-hydrogen secondary battery according to Example 1.

As seen from FIG. 3, the hydrogen-absorbing alloy thus obtained indicated a highest peak in the range of 42.1°±1°, a peak having an intensity of 8.8% of the aforementioned highest peak in the range of 30.2°±1° and a peak having an intensity of 56% of the aforementioned highest peak in the range of 32.5°±1°. It should be noted that the intensity of each peak is one obtained by subtracting the intensity of the background from the intensity of the peak actually measured.

This hydrogen-absorbing alloy was then pulverized in an inert atmosphere, and subsequently sieved to select alloy powder having particle sizes ranging from 400 mesh to 200 mesh. Then, 100 parts by weight of the hydrogen-absorbing alloy powder was mixed with 0.5 part by weight of nickel powder which was prepared by means of carbonyl process and available in the market thereby to obtain a mixture. Thereafter, to 100 parts by weight of this mixture was added 25 parts by weight of a 4% aqueous solution of polyvinyl alcohol thereby to obtain a paste. The paste was then stuffed into a nickel foamed substrate employed as a conductive substrate, and the resultant substrate was then press-molded to obtain a paste type negative electrode.

<Preparation of Positive Electrode>

First of all, 90 parts by weight of nickel hydroxide powder and 10 parts by weight of cobalt oxide powder were mixed together to obtain a mixture, which was then mixed with 0.15 part by weight of carboxymethyl cellulose, 0.15 part by weight of sodium polyacrylate and 0.5 part by weight (reduced to solid matter) of a dispersion of polytetrafluoroethylene (1.5 in specific gravity and 60 wt % in solid matter) to obtain a mixed solution. Subsequently, 45% by weight of water was further added to the above mixed solution and the resultant mixture was kneaded to prepare a paste. Then, this paste was filled in a nickel-plated fibrous substrate and, after being dried, the substrate was rolled by making use of a roller press to manufacture a paste-type nickel positive electrode.

<Preparation of Separator>

A polypropylene non-woven fabric was manufactured from polypropylene resin by means of a spun-bonding method. Then, the resultant non-woven fabric was dipped into an aqueous solution of acrylic acid and then irradiated with ultraviolet rays to graft-polymerize the non-woven fabric with acrylic monomer. Thereafter, the resultant non-woven fabric was washed to remove any unreacted acrylic acid and then dried to obtain a separator having a weight per unit area of 50 g/m².

The negative electrode and the positive electrode thus prepared was spirally wound with the aforementioned separator being interposed therebetween thereby to obtain an electrode group. In this case, the volumetric ratio between the positive electrode and the negative electrode was set such that the capacity of the positive electrode regulates the discharge capacity. Then, this electrode group and an electrolyte consisting of 2.75N of KOH, 4.75N of NaOH and 1N of LiOH were placed in a closed-end cylindrical case thereby to assembling an AA size cylindrical nickel-hydrogen secondary battery having a structure as shown in FIG. 1.

The quantity P(g) of the hydrogen-absorbing alloy per theoretical capacity 1 Ah of the positive electrode and the quantity Q(mL) of the alkaline electrolyte per theoretical capacity 1 Ah of the positive electrode in the secondary battery thus obtained are shown in the following Tables 1 to 3.

Comparative Example 13

By making use of a high frequency furnace, a hydrogen-absorbing alloy represented by a composition of $Mm_{1.0}Ni_{4.0}Co_{0.4}Mn_{0.3}Al_{0.3}$ (Mm is a lanthanum-rich misch-metal) was obtained. The alloy thus obtained was then homogenized in an argon atmosphere by heat-treating it at a temperature of 1000° C. This hydrogen-absorbing alloy was then subjected to an X-ray diffraction analysis using CuKα-ray to find that the hydrogen-absorbing alloy thus obtained indicated a highest peak in the range of 42.1°±1°, a peak having an intensity of 52% of the aforementioned highest peak in the range of 30.2°±1°. However, a peak having an intensity of more than 5% of the aforementioned highest peak was not recognized in the range of 32.5°±1°. It should be noted that the intensity of each peak is one obtained by subtracting the intensity of the background from the intensity of the peak actually measured. As a result, this hydrogen-absorbing alloy was admitted as containing a phase having a $LaNi_5$ type crystal structure as a principle phase.

Then, a cylindrical nickel-hydrogen secondary battery was assembled in the same manner as that of Example 13 except that the aforementioned hydrogen-absorbing alloy was employed herein.

Comparative Example 14

A cylindrical nickel-hydrogen secondary battery was assembled in the same manner as that of Comparative Example 11 except that the same hydrogen-absorbing alloy as explained in Comparative Example 13 was also employed herein.

Each of the secondary batteries obtained from Examples 1 to 25 and Comparative Examples 1 to 14 was activated and then subjected to a charge/discharge cycle at a temperature of 20° C. wherein each battery was charged to a depth of 150% with a current of 1C, and, after 30 minutes of cut-off, discharged with 1C until the voltage was lowered down to 1.1V. In this case, a discharge capacity was measured at the 20th cycle. The discharge capacity of each sample was indicated in comparison with the value of discharge capacity of Example 13 which was defined as 100, the results being shown in Tables 1 to 3.

Further, each of the secondary batteries obtained from Examples 1 to 25 and Comparative Examples 1 to 14 was charged to a depth of 150% with a current of 1C, and, after being sufficiently cooled in a thermostat of −20° C., discharged with 0.3C under the condition of −20 ° C. until the voltage of battery was lowered down to 1.1V, upon which the discharge capacity of the battery was measured. The discharge capacity of each sample was indicated in comparison with the value of discharge capacity of Example 13 which was defined as 100, the results being shown in Tables 1 to 3.

Further, each of the secondary batteries obtained from Examples 1 to 25 and Comparative Examples 1 to 14 was measured with regard to the internal pressure thereof. The measurement of internal pressure of these secondary batteries was performed by placing respectively the secondary batteries of Examples 1 to 25 and Comparative Examples 1 to 14 in the case of a pressure-measuring apparatus shown in FIG. 4.

Figure 4:
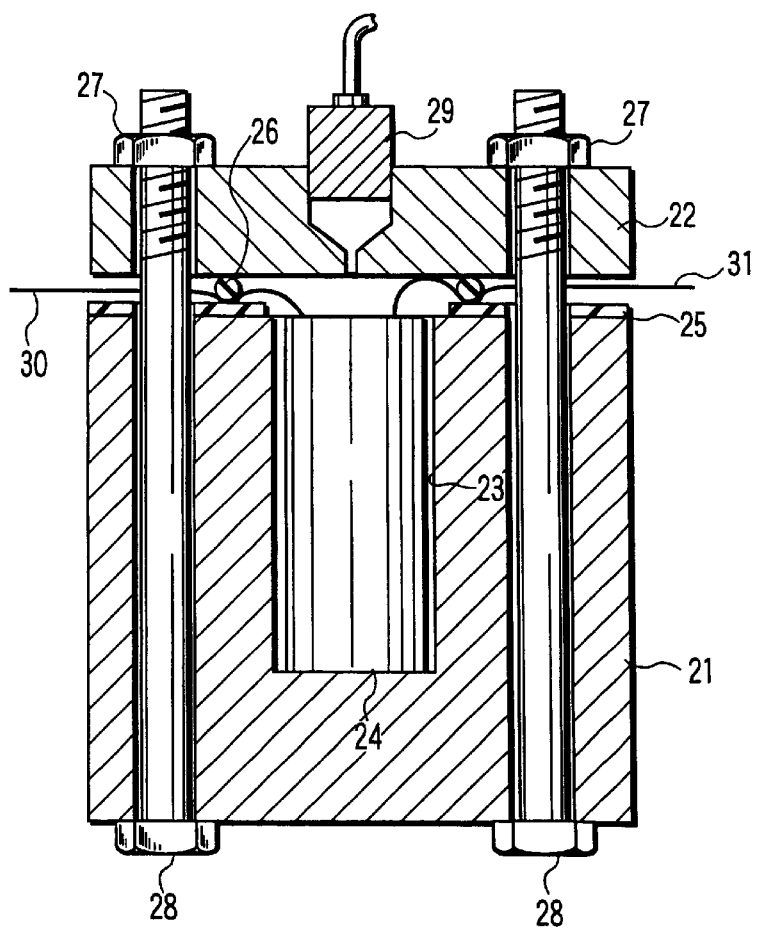
FIG. 4 is a cross-sectional view of a battery internal pressure-measuring apparatus employed in Examples of this invention.

As shown in FIG. 4, each pressure-measuring apparatus is provided with a main case body 21 and a cap 22, both being made of acrylic resin. The main case body 21 is provided at the center thereof with a space 23 having the same inner diameter and the same height as those of the metallic case of the AA size battery, so as to allow each of these batteries 24 to be placed in the interior of this space 23. This battery 24 is placed in this space 23 in a state that the top of the closed-end cylindrical case is left open without being attached with a sealing plate. The top surface of the main case body 21 is hermetically closed with the cap 22, which is fixed, via a packing 25 and an O-ring 26, to the main case body 21 by making use of bolts 27 and nuts 28. A pressure detector 29 is attached to the cap 22. The lead 30 extending from the negative electrode and the lead 31 extending from the positive electrode are lead out through a space between the packing 25 and the O-ring 26.

By making use of this internal pressure-measuring apparatus, a maximum internal pressure of battery at the moment where each of the secondary batteries of Examples 1 to 25 and Comparative Examples 1 to 14 was charged to a depth of 480% with a current of 0.5C was measured, the results being shown in the following Tables 1 to 3.

Figure 5:
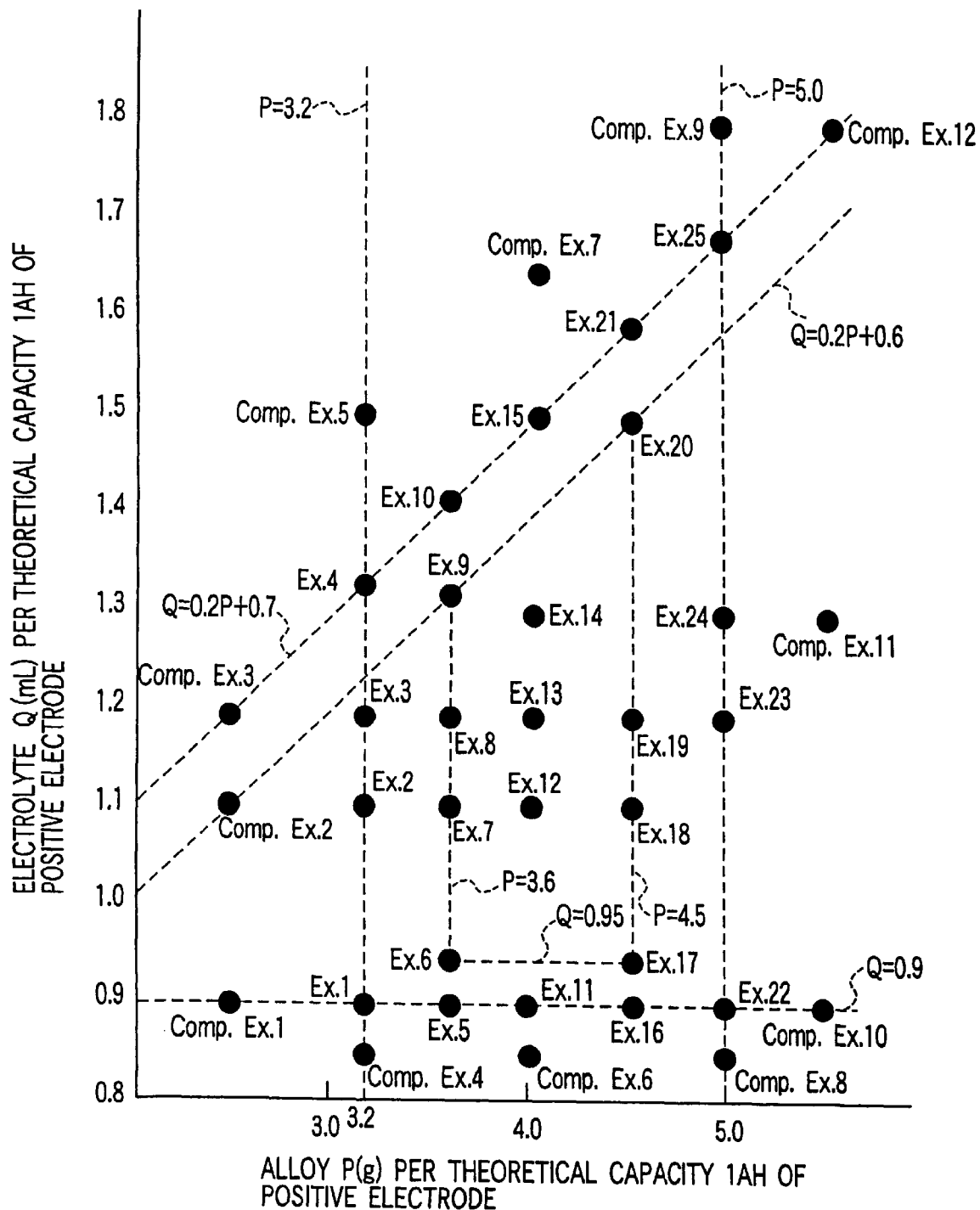
FIG. 5 is a graph illustrating a relationship between the quantity P(g) of the hydrogen-absorbing alloy per theoretical capacity 1Ah of the positive electrode and the quantity Q(mL) of the alkaline electrolyte per theoretical capacity 1Ah of the positive electrode in the nickel-hydrogen secondary batteries according to Examples 1 to 25 and Comparative Examples 1 to 12.

Further, a relationship between the quantity P(g) of the hydrogen-absorbing alloy per theoretical capacity 1 Ah of the positive electrode and the quantity Q(mL) of the electrolyte per theoretical capacity 1 Ah of the positive electrode was plotted on each of the nickel-hydrogen secondary batteries of Examples 1 to 25 and Comparative Examples 1 to 12, the results being shown in FIG. 5.

TABLE 1

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm²) |
|---|---|---|---|---|---|---|---|
| Example 1 | La—Mg—Ni type | 3.2 | 1.34 | 0.90 | 91 | 89 | 1.0 |
| Example 2 | La—Mg—Ni type | 3.2 | 1.34 | 1.10 | 92 | 91 | 2.0 |
| Example 3 | La—Mg—Ni type | 3.2 | 1.34 | 1.20 | 92 | 92 | 3.0 |
| Example 4 | La—Mg—Ni type | 3.2 | 1.34 | 1.34 | 92 | 93 | 4.7 |
| Example 5 | La—Mg—Ni type | 3.6 | 1.42 | 0.90 | 94 | 92 | 1.1 |
| Example 6 | La—Mg—Ni type | 3.6 | 1.42 | 0.95 | 98 | 96 | 1.5 |
| Example 7 | La—Mg—Ni type | 3.6 | 1.42 | 1.10 | 98 | 98 | 2.0 |

TABLE 1-continued

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm²) |
|---|---|---|---|---|---|---|---|
| Example 8 | La—Mg—Ni type | 3.6 | 1.42 | 1.20 | 99 | 99 | 3.1 |
| Example 9 | La—Mg—Ni type | 3.6 | 1.42 | 1.32 | 99 | 98 | 4.0 |
| Example 10 | La—Mg—Ni type | 3.6 | 1.42 | 1.42 | 99 | 100 | 5.5 |
| Example 11 | La—Mg—Ni type | 4.0 | 1.50 | 0.90 | 94 | 93 | 2.0 |
| Example 12 | La—Mg—Ni type | 4.0 | 1.50 | 1.10 | 100 | 99 | 2.5 |
| Example 13 | La—Mg—Ni type | 4.0 | 1.50 | 1.20 | 100 | 100 | 3.5 |

TABLE 2

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm²) |
|---|---|---|---|---|---|---|---|
| Example 14 | La—Mg—Ni type | 4.0 | 1.50 | 1.30 | 100 | 100 | 4.5 |
| Example 15 | La—Mg—Ni type | 4.0 | 1.50 | 1.50 | 100 | 101 | 5.8 |
| Example 16 | La—Mg—Ni type | 4.5 | 1.60 | 0.90 | 94 | 93 | 2.0 |
| Example 17 | La—Mg—Ni type | 4.5 | 1.60 | 0.95 | 98 | 97 | 2.5 |
| Example 18 | La—Mg—Ni type | 4.5 | 1.60 | 1.10 | 99 | 99 | 2.8 |
| Example 19 | La—Mg—Ni type | 4.5 | 1.60 | 1.20 | 100 | 100 | 3.6 |
| Example 20 | La—Mg—Ni type | 4.5 | 1.60 | 1.50 | 99 | 100 | 4.9 |
| Example 21 | La—Mg—Ni type | 4.5 | 1.60 | 1.60 | 99 | 101 | 6.0 |
| Example 22 | La—Mg—Ni type | 5.0 | 1.70 | 0.90 | 93 | 91 | 2.8 |
| Example 23 | La—Mg—Ni type | 5.0 | 1.70 | 1.20 | 93 | 93 | 4.6 |
| Example 24 | La—Mg—Ni type | 5.0 | 1.70 | 1.30 | 93 | 94 | 5.2 |
| Example 25 | La—Mg—Nitype | 5.0 | 1.70 | 1.70 | 93 | 95 | 6.5 |

TABLE 3

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm²) |
|---|---|---|---|---|---|---|---|
| Comparative Example 1 | La—Mg—Ni type | 2.5 | — | 0.90 | 70 | 55 | 0.8 |
| Comparative Example 2 | La—Mg—Ni type | 2.5 | — | 1.10 | 75 | 60 | 4.5 |
| Comparative Example 3 | La—Mg—Ni type | 2.5 | — | 1.20 | 75 | 65 | 6.5 |
| Comparative Example 4 | La—Mg—Ni type | 3.2 | 1.34 | 0.85 | 80 | 72 | 1.0 |
| Comparative Example 5 | La—Mg—Ni type | 3.2 | 1.34 | 1.50 | 100 | 97 | 12.2 |
| Comparative Example 6 | La—Mg—Ni type | 4.0 | 1.50 | 0.85 | 80 | 72 | 0.9 |
| Comparative Example 7 | La—Mg—Ni type | 4.0 | 1.50 | 1.65 | 100 | 100 | 12.5 |
| Comparative Example 8 | La—Mg—Ni type | 5.0 | 1.70 | 0.85 | 80 | 74 | 1.7 |
| Comparative Example 9 | La—Mg—Ni type | 5.0 | 1.70 | 1.80 | 100 | 99 | 13.0 |
| Comparative Example 10 | La—Mg—Ni type | 5.5 | — | 0.90 | 80 | 70 | 1.2 |
| Comparative | La—Mg—Ni type | 5.5 | — | 1.30 | 80 | 75 | 6.2 |

TABLE 3-continued

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Example 11 | | | | | | | |
| Comparative Example 12 | La—Mg—Ni type | 5.5 | — | 1.80 | 82 | 78 | 16.0 |
| Comparative Example 13 | MmNi$_5$ type | 4.0 | 1.50 | 1.20 | 80 | 75 | 4.5 |
| Comparative Example 14 | MmNi$_5$ type | 5.5 | — | 1.30 | 82 | 76 | 11.0 |

As seen from Tables 1 to 3 and FIG. 5, the secondary batteries of Examples 1 to 25 each having a suitable quantity P(g) of the hydrogen-absorbing alloy and a suitable quantity Q(mL) of the electrolyte, i.e. both quantities falling within the region encircled by four straight lines; Q=0.9, Q=0.2P+0.7, P=3.2, P=5.0, were found satisfactory in all of discharge capacity, low temperature discharge property and internal pressure property.

Whereas in the case of the secondary batteries of Comparative Examples 1 to 12 wherein both of the quantity P(g) of the hydrogen-absorbing alloy and the quantity Q(mL) of the electrolyte fall out of the aforementioned region were found unsatisfactory in at least one of the aforementioned three properties, i.e. discharge capacity, low temperature discharge property and internal pressure property.

On the other hand, in the case of the secondary battery of Comparative Example 13 which comprised a negative electrode containing a hydrogen-absorbing alloy having a MmNi$_5$ type composition and containing a phase having a LaNi$_5$ type crystal structure as a principle phase, even though the quantity P(g) and the quantity Q(mL) were both existed within the aforementioned region, the discharge capacity and low temperature discharge property thereof were found as being almost the same as those of the secondary battery of Comparative Example 14 where the quantity P(g) and the quantity Q(mL) were both existed outside the aforementioned region.

Therefore, it will be understood that as long as a hydrogen-absorbing alloy to be employed has a MmNi$_5$ type composition and contains a phase having a LaNi$_5$ type crystal structure as a principle phase, it would be impossible, even if the quantity P(g) and quantity Q(mL) are suitably regulated, to obtain a secondary battery which is satisfactory in all of discharge capacity, low temperature discharge property and internal pressure property.

Each of the secondary batteries obtained from Examples 3, 13, 23 and Comparative Example 13 was subjected to a charge/discharge cycle at a temperature of 20° C. wherein each battery was charged to a depth of 150% with a current of 1C, and, after 30 minutes of cut-off, discharged with 1C until the voltage was lowered down to 1.1V. In this case, the number of cycle when the discharge capacity was lowered to 80% of the discharge capacity at moment of the first cycle was measured, the results being shown in Table 4.

TABLE 4

| | Cycle life |
|---|---|
| Example 3 | 780 |
| Example 13 | 810 |
| Example 23 | 680 |
| Comparative Example 13 | 490 |

As seen from Table 4, the secondary batteries of Examples 3, 13 and 23 were found superior in charge/discharge cycle life as compared with the secondary battery of Comparative Example 13.

EXAMPLES 26–50 and

Comparative Examples 15–28

The batteries of Examples 26–50 and Comparative Examples 15–28 were prepared in the same manner as those of Examples 1–25 and Comparative Examples 1–14 except that the weight per unit area of the separator was altered to 40 g/m$^2$.

In the same manner as described above, the discharge capacity at the normal temperature, the discharge capacity at a low temperature and the maximum internal pressure were measured using the batteries of Examples 26–50 and Comparative Examples 15–28, the results being shown in the following Tables 5 to 7. By the way, the discharge capacity of each secondary battery at normal temperature was indicated in comparison with the discharge capacity measured at normal temperature of the secondary battery of Example 13, which was defined as 100. Further, the discharge capacity of each secondary battery at the low temperature was indicated in comparison with the discharge capacity measured at the low temperature of the secondary battery of Example 13, which was defined as 100.

TABLE 5

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
| --- | --- | --- | --- | --- | --- | --- | --- |
| Example 26 | La—Mg—Ni type | 3.2 | 1.34 | 0.90 | 92 | 90 | 0.7 |
| Example 27 | La—Mg—Ni type | 3.2 | 1.34 | 1.10 | 93 | 92 | 1.8 |
| Example 28 | La—Mg—Ni type | 3.2 | 1.34 | 1.20 | 93 | 93 | 2.7 |
| Example 29 | La—Mg—Ni type | 3.2 | 1.34 | 1.34 | 93 | 95 | 4.5 |
| Example 30 | La—Mg—Ni type | 3.6 | 1.42 | 0.90 | 95 | 96 | 0.8 |
| Example 31 | La—Mg—Ni type | 3.6 | 1.42 | 0.95 | 99 | 97 | 1.2 |
| Example 32 | La—Mg—Ni type | 3.6 | 1.42 | 1.10 | 99 | 99 | 1.7 |
| Example 33 | La—Mg—Ni type | 3.6 | 1.42 | 1.20 | 100 | 100 | 2.8 |
| Example 34 | La—Mg—Ni type | 3.6 | 1.42 | 1.32 | 100 | 99 | 3.6 |
| Example 35 | La—Mg—Ni type | 3.6 | 1.42 | 1.42 | 101 | 102 | 5.0 |
| Example 36 | La—Mg—Ni type | 4.0 | 1.50 | 0.90 | 95 | 94 | 1.8 |
| Example 37 | La—Mg—Ni type | 4.0 | 1.50 | 1.10 | 101 | 99 | 2.2 |
| Example 38 | La—Mg—Ni type | 4.0 | 1.50 | 1.20 | 101 | 101 | 3.1 |

TABLE 6

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
| --- | --- | --- | --- | --- | --- | --- | --- |
| Example 39 | La—Mg—Ni type | 4.0 | 1.50 | 1.30 | 101 | 101 | 4.0 |
| Example 40 | La—Mg—Ni type | 4.0 | 1.50 | 1.50 | 101 | 102 | 5.5 |
| Example 41 | La—Mg—Ni type | 4.5 | 1.60 | 0.90 | 95 | 94 | 1.8 |
| Example 42 | La—Mg—Ni type | 4.5 | 1.60 | 0.95 | 99 | 98 | 2.3 |
| Example 43 | La—Mg—Ni type | 4.5 | 1.60 | 1.10 | 100 | 100 | 2.5 |
| Example 44 | La—Mg—Ni type | 4.5 | 1.60 | 1.20 | 101 | 102 | 3.3 |
| Example 45 | La—Mg—Ni type | 4.5 | 1.60 | 1.50 | 100 | 102 | 4.7 |
| Example 46 | La—Mg—Ni type | 4.5 | 1.60 | 1.60 | 100 | 102 | 5.8 |
| Example 47 | La—Mg—Ni type | 5.0 | 1.70 | 0.90 | 94 | 92 | 2.6 |
| Example 48 | La—Mg—Ni type | 5.0 | 1.70 | 1.20 | 94 | 94 | 4.4 |
| Example 49 | La—Mg—Ni type | 5.0 | 1.70 | 1.30 | 94 | 95 | 5.0 |
| Example 50 | La—Mg—Ni type | 5.0 | 1.70 | 1.70 | 94 | 96 | 6.2 |

TABLE 7

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm²) |
|---|---|---|---|---|---|---|---|
| Comparative Example 15 | La—Mg—Ni type | 2.5 | — | 0.90 | 72 | 57 | 0.6 |
| Comparative Example 16 | La—Mg—Ni type | 2.5 | — | 1.10 | 75 | 61 | 4.0 |
| Comparative Example 17 | La—Mg—Ni type | 2.5 | — | 1.20 | 76 | 67 | 6.1 |
| Comparative Example 18 | La—Mg—Ni type | 3.2 | 1.34 | 0.85 | 81 | 74 | 0.9 |
| Comparative Example 19 | La—Mg—Ni type | 3.2 | 1.34 | 1.50 | 101 | 98 | 11.5 |
| Comparative Example 20 | La—Mg—Ni type | 4.0 | 1.50 | 0.85 | 80 | 74 | 0.8 |
| Comparative Example 21 | La—Mg—Ni type | 4.0 | 1.50 | 1.65 | 100 | 101 | 11.6 |
| Comparative Example 22 | La—Mg—Ni type | 5.0 | 1.70 | 0.85 | 80 | 76 | 0.8 |
| Comparative Example 23 | La—Mg—Ni type | 5.0 | 1.70 | 1.80 | 101 | 100 | 12.2 |
| Comparative Example 24 | La—Mg—Ni type | 5.5 | — | 0.90 | 81 | 72 | 1.1 |
| Comparative Example 25 | La—Mg—Ni type | 5.5 | — | 1.30 | 81 | 75 | 5.7 |
| Comparative Example 26 | La—Mg—Ni type | 5.5 | — | 1.80 | 82 | 79 | 15.4 |
| Comparative Example 27 | MmNi₅ type | 4.0 | 1.50 | 1.20 | 81 | 77 | 3.8 |
| Comparative Example 28 | MmNi₅ type | 5.5 | — | 1.30 | 82 | 77 | 9.8 |

EXAMPLES 51–75 and Comparative Examples 29–42

The batteries of Examples 51–75 and Comparative Examples 29–42 were prepared in the same manner as those of Examples 1–25 and Comparative Examples 1–14 except that the conductive substrate of the negative electrode was changed to a punched metal.

In the same manner as described above, the discharge capacity at the normal temperature, the discharge capacity at a low temperature and the maximum internal pressure were measured using the batteries of Examples 51–75 and Comparative Examples 29–42, the results being shown in the following Tables 8 to 10. By the way, the discharge capacity of each secondary battery at normal temperature was indicated in comparison with the discharge capacity measured at normal temperature of the secondary battery of Example 13, which was defined as 100. Further, the discharge capacity of each secondary battery at the low temperature was indicated in comparison with the discharge capacity measured at the low temperature of the secondary battery of Example 13, which was defined as 100.

TABLE 8

|  | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm²) |
|---|---|---|---|---|---|---|---|
| Example 51 | La—Mg—Ni type | 3.2 | 1.34 | 0.90 | 90 | 89 | 0.9 |
| Example 52 | La—Mg—Ni type | 3.2 | 1.34 | 1.10 | 92 | 91 | 1.9 |
| Example 53 | La—Mg—Ni type | 3.2 | 1.34 | 1.20 | 92 | 92 | 3.0 |
| Example 54 | La—Mg—Ni type | 3.2 | 1.34 | 1.34 | 92 | 93 | 4.7 |
| Example 55 | La—Mg—Ni type | 3.6 | 1.42 | 0.90 | 94 | 92 | 1.1 |
| Example 56 | La—Mg—Ni type | 3.6 | 1.42 | 0.95 | 98 | 96 | 1.5 |
| Example 57 | La—Mg—Ni type | 3.6 | 1.42 | 1.10 | 97 | 98 | 2.0 |
| Example 58 | La—Mg—Ni type | 3.6 | 1.42 | 1.20 | 99 | 99 | 3.1 |
| Example 59 | La—Mg—Ni type | 3.6 | 1.42 | 1.32 | 99 | 98 | 3.7 |
| Example 60 | La—Mg—Ni type | 3.6 | 1.42 | 1.42 | 98 | 99 | 5.5 |
| Example 61 | La—Mg—Ni type | 4.0 | 1.50 | 0.90 | 94 | 93 | 2.0 |
| Example 62 | La—Mg—Ni type | 4.0 | 1.50 | 1.10 | 100 | 99 | 2.4 |
| Example 63 | La—Mg—Ni type | 4.0 | 1.50 | 1.20 | 99 | 100 | 3.5 |

TABLE 9

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Example 64 | La—Mg—Ni type | 4.0 | 1.50 | 1.30 | 99 | 100 | 4.5 |
| Example 65 | La—Mg—Ni type | 4.0 | 1.50 | 1.50 | 99 | 100 | 5.8 |
| Example 66 | La—Mg—Ni type | 4.5 | 1.60 | 0.90 | 94 | 93 | 2.0 |
| Example 67 | La—Mg—Ni type | 4.5 | 1.60 | 0.95 | 99 | 98 | 2.4 |
| Example 68 | La—Mg—Ni type | 4.5 | 1.60 | 1.10 | 99 | 99 | 2.9 |
| Example 69 | La—Mg—Ni type | 4.5 | 1.60 | 1.20 | 100 | 100 | 3.6 |
| Example 70 | La—Mg—Ni type | 4.5 | 1.60 | 1.50 | 98 | 100 | 4.9 |
| Example 71 | La—Mg—Ni type | 4.5 | 1.60 | 1.60 | 99 | 100 | 6.0 |
| Example 72 | La—Mg—Ni type | 5.0 | 1.70 | 0.90 | 93 | 91 | 2.8 |
| Example 73 | La—Mg—Ni type | 5.0 | 1.70 | 1.20 | 92 | 93 | 4.6 |
| Example 74 | La—Mg—Ni type | 5.0 | 1.70 | 1.30 | 93 | 94 | 5.2 |
| Example 75 | La—Mg—Ni type | 5.0 | 1.70 | 1.70 | 92 | 95 | 6.4 |

TABLE 10

| | Hydrogen-absorbing alloy | Alloy P (g) | 0.2P + 0.7 (mL) | Electrolyte Q (mL) | Normal Temperature (20° C.) Discharge capacity | Low temperature (−20° C.) Discharge capacity | Internal pressure (kgf/cm$^2$) |
|---|---|---|---|---|---|---|---|
| Comparative Example 29 | La—Mg—Ni type | 2.5 | — | 0.90 | 68 | 52 | 0.8 |
| Comparative Example 30 | La—Mg—Ni type | 2.5 | — | 1.lo | 73 | 58 | 4.6 |
| Comparative Example 31 | La—Mg—Ni type | 2.5 | — | 1.20 | 73 | 63 | 6.5 |
| Comparative Example 32 | La—Mg—Ni type | 3.2 | 1.34 | 0.85 | 79 | 70 | 0.9 |
| Comparative Example 33 | La—Mg—Ni type | 3.2 | 1.34 | 1.50 | 98 | 95 | 12.5 |
| Comparative Example 34 | La—Mg—Ni type | 4.0 | 1.50 | 0.85 | 78 | 69 | 1.0 |
| Comparative Example 35 | La—Mg—Ni type | 4.0 | 1.50 | 1.65 | 97 | 98 | 12.4 |
| Comparative Example 36 | La—Mg—Ni type | 5.0 | 1.70 | 0.85 | 78 | 71 | 1.0 |
| Comparative Example 37 | La—Mg—Ni type | 5.0 | 1.70 | 1.80 | 99 | 97 | 13.3 |
| Comparative Example 38 | La—Mg—Ni type | 5.5 | — | 0.90 | 78 | 68 | 1.4 |
| Comparative Example 39 | La—Mg—Ni type | 5.5 | — | 1.30 | 79 | 74 | 6.1 |
| Comparative Example 40 | La—Mg—Ni type | 5.5 | — | 1.80 | 81 | 76 | 16.2 |
| Comparative Example 41 | MmNi$_5$ type | 4.0 | 1.50 | 1.20 | 78 | 73 | 4.4 |
| Comparative Example 42 | MmNi$_5$ type | 5.5 | — | 1.30 | 80 | 74 | 10.5 |

EXAMPLE 76
<Preparation of a Paste-type Negative Electrode>

Each element was weighed so as to obtain a composition of $La_{0.63}Mg_{0.37}(Ni_{0.85}Co_{0.1}Al_{0.05})_{3.2}$, and the resultant mixture was melted in an argon atmosphere by making use of a high frequency furnace thereby to obtain an alloy ingot having the aforementioned composition.

Then, this hydrogen-absorbing alloy was then subjected to an X-ray diffraction analysis using CuKα-ray. As a result, the hydrogen-absorbing alloy thus obtained indicated a highest peak in the range of 42.1°±1°, a peak having an intensity of 9.2% of the aforementioned highest peak in the range of 30.2°±1°, and a peak having an intensity of 27% of the aforementioned highest peak in the range of 32.5°±1°. It should be noted that the intensity of each peak is one obtained by subtracting the intensity of the background from the intensity of the peak actually measured.

Then, this alloy ingot was pulverized to obtain hydrogen-absorbing alloy powder. After 100 parts by weight of the hydrogen-absorbing alloy powder thus obtained was mixed with 0.5 part by weight of carbon black, 100 parts by weight of the resultant mixture was mixed with 25 parts by weight of a 4% aqueous solution of polyvinyl alcohol thereby to obtain a paste. The paste was coated on the surface of a punched metal and then dried to obtain a negative electrode.

<Preparation of Positive Electrode>

First of all, 90 parts by weight of nickel hydroxide powder and 10 parts by weight of cobalt oxide powder were mixed together to obtain a mixture, which was then mixed with 0.15 part by weight of carboxymethyl cellulose, 0.15 part by weight of sodium polyacrylate and 0.5 part by weight (reduced to solid matter) of a dispersion of polytetrafluoroethylene (1.5 in specific gravity and 60 wt % in solid matter) to obtain a mixed solution. Subsequently, 45% by weight of pure water was further added to the above mixed solution and the resultant mixture was kneaded to prepare a paste. Then, this paste was filled in a nickel-plated fibrous substrate and, after being dried, the substrate was rolled by making use of a roller press to manufacture a paste-type nickel positive electrode.

The negative electrode and the positive electrode thus prepared was spirally wound with a separator consisting of a polymer unwoven fabric being interposed therebetween thereby to obtain an electrode group.

<Preparation of a Case>

A steel plate having a composition shown in the following Table 11 and exhibiting a tensile strength of 35 kgf/mm$^2$, a yield point of 20 kgf/mm$^2$ and an elastic modulus of 22,900 kgf/mm$^2$ was cold-worked thereby to form a closed-end cylindrical, which was then plated with nickel. As a result, a case (battery case) having a tensile strength, a yield point and an elastic modulus shown in the following Table 11 was obtained. By the way, the tensile strength, yield point and elastic modulus of the case were measured by the methods explained above.

Then, the aforementioned electrode group was placed in this case, and then a 8N KOH electrolyte was poured into the case. Thereafter, the case was sealed to obtain a cylindrical nickel-hydrogen secondary battery having a 4/3 A size and a capacity of 4,500 mAh. By repeating the same procedures as described above, 100 pieces of the same kind of cylindrical nickel-hydrogen secondary batteries were prepared.

EXAMPLE 77

<Preparation of a Case>

A steel plate having a composition shown in the following Table 11 and exhibiting a tensile strength of 33 kgf/mm$^2$, a yield point of 19 kgf/mm$^2$ and an elastic modulus of 22,100 kgf/mm$^2$ was cold-worked thereby to form a closed-end cylindrical, which was then plated with nickel. As a result, a case (battery case) having a tensile strength, a yield point and an elastic modulus shown in the following Table 11 was obtained.

The same procedures as explained in Example 76 were repeated except that the case prepared in this example was employed, thereby manufacturing 100 pieces of the same kind of cylindrical nickel-hydrogen secondary batteries.

Comparative Example 43

<Preparation of a Case>

A steel plate having a composition shown in the following Table 11 and exhibiting a tensile strength of 46 kgf/mm$^2$, a yield point of 36 kgf/mm$^2$ and an elastic modulus of 27,000 kgf/mm$^2$ was cold-worked, while applying a heat treatment, thereby to form a closed-end cylindrical, which was then plated with nickel. As a result, a case (battery case) having a tensile strength, a yield point and an elastic modulus shown in the following Table 11 was obtained.

The same procedures as explained in Example 76 were repeated except that the case prepared in this example was employed, thereby manufacturing 100 pieces of the same kind of cylindrical nickel-hydrogen secondary batteries.

The secondary batteries of Examples 76 and 77 and Comparative Example 43 (100 pieces in each example) were subjected to a charge/discharge cycle under the conditions shown below thereby to investigate percent defective in capacity that has been generated up to the ends of 10th cycle, 50th cycle, 100th cycle and 200th cycle. The results are shown in Table 12.

| Charge/discharge condition | |
| --- | --- |
| Charge current: | 4,500 mA |
| Charging time: | 1.3 hours |
| Discharge current: | 4,500 mA |
| Discharge-terminating voltage: | 1 V |

TABLE 11

| | Components of case (%) | | | | Tensile strength (kgf/mm$^2$) | Yield point (kgf/mm$^2$) | Elastic modulus (kgf/mm$^2$) |
| --- | --- | --- | --- | --- | --- | --- | --- |
| | C | Mn | P | S | | | |
| Example 76 | 0.09 | 0.43 | 0.020 | 0.031 | 71 | 43 | 24100 |
| Example 77 | 0.07 | 0.37 | 0.028 | 0.025 | 69 | 40 | 23800 |
| Comparative Example 43 | 0.19 | 0.60 | 0.031 | 0.036 | 83 | 59 | 31000 |

TABLE 12

| | Percent lowering capacity (%) | | | |
| --- | --- | --- | --- | --- |
| | After 10 cycles | After 50 cycles | After 100 cycles | After 200 cycles |
| Example 76 | 0 | 0 | 0 | 0 |
| Example 77 | 0 | 0 | 0 | 0 |
| Comparative Example 43 | 9 | 18 | 24 | 35 |

As seen from Tables 11 and 12, the secondary batteries of Examples 76 and 77 each comprising a negative electrode containing the hydrogen-absorbing alloy represented by the aforementioned general formula (A) and a case having a tensile strength falling within the range of 65 to 80 kgf/mm$^2$, a yield point falling within the range of 30 to 55 kgf/mm$^2$ and an elastic modulus falling within the range of 20,000 to 30,000 kgf/mm$^2$ were free from any percent defective in capacity during the charge/discharge cycle. Whereas the secondary battery of Comparative Example 43 comprising the aforementioned negative electrode and a case which does not meet the aforementioned conditions with respect to the tensile strength, yield point and elastic modulus was subject to percent defective in capacity at the initial stage of the charge/discharge cycle.

EXAMPLE 78

<Preparation of a Case>

A steel plate having a composition shown in the following Table 13 and exhibiting a tensile strength of 33 kgf/mm$^2$, a yield point of 19 kgf/mm$^2$ and an elastic modulus of 21,500 kgf/mm$^2$ was cold-worked thereby to form a closed-end cylindrical, which was then plated with nickel. As a result, a case (battery case) having a tensile strength, a yield point and an elastic modulus shown in the following Table 13 was obtained.

The same procedures as explained in Example 76 were repeated except that the case prepared in this example was employed, thereby manufacturing 100 pieces of the same kind of cylindrical nickel-hydrogen secondary batteries.

EXAMPLE 79

<Preparation of a Case>

A steel plate having a composition shown in the following Table 13 and exhibiting a tensile strength of 34 kgf/mm$^2$, a yield point of 23 kgf/mm$^2$ and an elastic modulus of 22,600 kgf/mm$^2$ was cold-worked thereby to form a closed-end cylindrical, which was then plated with nickel. As a result, a case (battery case) having a tensile strength, a yield point and an elastic modulus shown in the following Table 13 was obtained.

The same procedures as explained in Example 76 were repeated except that the case prepared in this example was employed, thereby manufacturing 100 pieces of the same kind of cylindrical nickel-hydrogen secondary batteries.

Comparative Example 44

<Preparation of a Case>

A steel plate having a composition shown in the following Table 13 and exhibiting a tensile strength of 49 kgf/mm$^2$, a yield point of 38 kgf/mm$^2$ and an elastic modulus of 26,500 kgf/mm$^2$ was cold-worked thereby to form a closed-end cylindrical, which was then plated with nickel. As a result, a case (battery case) having a tensile strength, a yield point and an elastic modulus shown in the following Table 13 was obtained.

The same procedures as explained in Example 76 were repeated except that the case prepared in this example was employed, thereby manufacturing 100 pieces of the same kind of cylindrical nickel-hydrogen secondary batteries.

The secondary batteries of Examples 78 and 79 and Comparative Example 44 (100 pieces in each example) were subjected to a charge/discharge cycle under the same conditions as mentioned above thereby to investigate percent defective in capacity that has been generated up to the ends of 10th cycle, 50th cycle, 100th cycle and 200th cycle. The results are shown in Table 14.

TABLE 14

| | Percent lowering capacity (%) | | | |
| --- | --- | --- | --- | --- |
| | After 10 cycles | After 50 cycles | After 100 cycles | After 200 cycles |
| Example 78 | 0 | 0 | 0 | 0 |
| Example 79 | 0 | 0 | 0 | 0 |
| Comparative Example 44 | 8 | 21 | 26 | 34 |

As seen from Tables 13 and 14, the secondary batteries of Examples 78 and 79 each comprising a negative electrode containing the hydrogen-absorbing alloy represented by the aforementioned general formula (A) and a case having a tensile strength falling within the range of 65 to 80 kgf/mm$^2$, a yield point falling within the range of 30 to 55 kgf/mm$^2$ and an elastic modulus falling within the range of 20,000 to 30,000 kgf/mm$^2$ were free from any percent defective in capacity during the charge/discharge cycle. Whereas the secondary battery of Comparative Example 44 comprising the aforementioned negative electrode and a case which does not meet the aforementioned conditions with respect to the tensile strength, yield point and elastic modulus was subject to percent defective in capacity at the initial stage of the charge/discharge cycle.

EXAMPLES 80–95 and

Comparative Examples 45–60

<Preparation of a Negative Electrode>

100 parts by weight of the hydrogen-absorbing alloy powder of the same kind as employed in Example 1 was mixed with 25 parts by weight of a 4% aqueous solution of polyvinyl alcohol thereby to obtain a paste. The paste was then stuffed into a nickel foamed substrate employed as a conductive substrate, and the resultant substrate was then press-molded to obtain a paste type negative electrode where a mixture containing the hydrogen-absorbing alloy was carried on the conductive substrate.

<Preparation of Positive Electrode>

First of all, 90 parts by weight of nickel hydroxide powder and 10 parts by weight of cobalt oxide powder were mixed together to obtain a mixture, which was then mixed with 0.15 part by weight of carboxymethyl cellulose, 0.15 part by weight of sodium polyacrylate and 0.5 part by weight (reduced to solid matter) of a dispersion of polytetrafluoroethylene (1.5 in specific gravity and 60 wt % in solid matter) to obtain a mixed solution. Subsequently, 45% by weight of water was further added to the above mixed solution and the

TABLE 13

| | Components of case (%) | | | | Tensile strength (kgf/mm$^2$) | Yield point (kgf/mm$^2$) | Elastic modulus (kgf/mm$^2$) |
| --- | --- | --- | --- | --- | --- | --- | --- |
| | C | Mn | P | S | | | |
| Example 78 | 0.06 | 0.40 | 0.037 | 0.030 | 68 | 42 | 22000 |
| Example 79 | 0.07 | 0.35 | 0.040 | 0.023 | 70 | 45 | 22800 |
| Comparative Example 44 | 0.20 | 0.57 | 0.036 | 0.034 | 85 | 60 | 30500 | resultant mixture was kneaded to prepare a paste. Then, this paste was filled in a nickel-plated fibrous substrate and, after being dried, the substrate was rolled by making use of a roller press to manufacture a paste-type nickel positive electrode.

<Preparation of Separator>

A polypropylene non-woven fabric was manufactured from polypropylene resin by means of a spun-bonding method. Then, the resultant non-woven fabric was dipped into an aqueous solution of acrylic acid and then irradiated with ultraviolet rays to graft-polymerize the non-woven fabric with acrylic monomer. Thereafter, the resultant non-woven fabric was washed to remove any unreacted acrylic acid and then dried to obtain a separator.

The negative electrode and the positive electrode thus prepared was spirally wound with the aforementioned separator being interposed therebetween thereby to obtain an electrode group. The density of the mixture in the negative electrode, the tightness of the electrode group to be calculated from the aforementioned formula (II) and the ratio of longest diameter of electrode group in relative to the inner diameter of the case are shown in the following Tables 15 to 16. In this case, the density of the mixture in the negative electrode was varied by altering the filling quantity of the paste. Further, the tightness was varied by altering the thickness of the negative electrode.

Then, each electrode group and an electrolyte consisting of 3.5N of KOH, 4N of NaOH and 1N of LiOH were placed in a closed-end cylindrical case thereby to assembling a 4/3A size cylindrical nickel-hydrogen secondary battery having a structure as shown in FIG. 1.

Comparative Examples 61–65

A cylindrical nickel-hydrogen secondary battery where the density of the mixture in the negative electrode and the tightness of the electrode group were those as indicated in the following Table 17 was assembled in the same manner as that of Examples 80–95 except that the same kind of hydrogen-absorbing alloy as employed in Comparative Example 13 was employed herein.

The secondary batteries obtained from Examples 80 to 95 were subjected to one charge/discharge cycle wherein these batteries were charged to a depth of 150% with a current of 0.1 C, and then discharged with 1 C until the voltage was lowered down to 0.8V, and then further subjected to ten charge/discharge cycles wherein these batteries were charged to a depth of 150% with a current of 0.3 C, and then discharged with 1 C until the voltage was lowered down to 1.0V in each cycle, thus rendering the discharge capacity of each battery to become constant. After this constant discharge capacity was confirmed, the self-discharge property of the batteries was measured.

First of all, these secondary batteries were charged to a depth of 150% with a current of 0.3 C at the normal temperature, and then stored for seven days in a thermostat which was kept at a temperature of 50° C. Thereafter, the temperature of these secondary batteries was returned to the normal temperature. Then, these secondary batteries were discharged with an electric quantity of 1 C until the battery voltage was decreased down to 1.0V, and the discharge capacity at this moment (residual capacity) was measured. Then, the ratio of residual capacity "R" was calculated from the following formula, and the self-discharge property of the secondary battery was determined based on this ratio of residual capacity "R". The results are shown in Tables 15 to 17.

$$R(\%) = (C_2/C_1) \times 100$$

wherein $C_1$ denotes a discharge capacity which was measured after a charge/discharge cycle wherein a secondary battery was charged to a depth of 150% with a current of 0.3 C, and then discharged with an electric quantity of 1 C until the battery voltage was decreased down to 1.0V before it was stored in a thermostat kept at a temperature of 50° C. for seven days; and $C_2$ denotes a residual capacity, i.e. a discharge capacity which was measured after a secondary battery was stored in a thermostat kept at a temperature of 50° C. for seven days.

TABLE 15

| | Hydrogen-absorbing alloy | Density of mixture (g/cc) | Tightness (%) | Ratio of longest diameter of electrode group to inner diameter of case (%) | Ratio of residual capacity (%) |
|---|---|---|---|---|---|
| Example 80 | $La_{0.7}Mg_{0.3}Ni_{2.5}Co_{0.5}$ | 5.1 | 98 | 99 | 75 |
| Example 81 | $La_{0.7}Mg_{0.3}Ni_{2.5}Co_{0.5}$ | 5.3 | 98 | 99 | 77 |
| Example 82 | $La_{0.7}Mg_{0.3}Ni_{2.5}Co_{0.5}$ | 5.5 | 98 | 99 | 78 |
| Example 83 | $La_{0.7}Mg_{0.3}Ni_{2.5}Co_{0.5}$ | 5.8 | 98 | 99 | 76 |
| Example 84 | $La_{0.7}Mg_{0.3}Ni_{2.5}Co_{0.5}$ | 5.1 | 100 | 99 | 78 |
| Example 85 | $La_{0.7}Mg_{0.3}Ni_{2.5}Co_{0.5}$ | 5.3 | 100 | 99 | 80 |
| Example 86 | $La_{0.7}Mg_{0.3}Ni_{2.5}Co_{0.5}$ | 5.5 | 100 | 99 | 81 |
| Example 87 | $La_{0.7}Mg_{0.3}Ni_{2.5}Co_{0.5}$ | 5.8 | 100 | 99 | 79 |
| Example 88 | $La_{0.7}Mg_{0.3}Ni_{2.5}Co_{0.5}$ | 5.1 | 105 | 100 | 80 |
| Example 89 | $La_{0.7}Mg_{0.3}Ni_{2.5}Co_{0.5}$ | 5.3 | 105 | 100 | 82 |
| Example 90 | $La_{0.7}Mg_{0.3}Ni_{2.5}Co_{0.5}$ | 5.5 | 105 | 100 | 83 |
| Example 91 | $La_{0.7}Mg_{0.3}Ni_{2.5}Co_{0.5}$ | 5.8 | 105 | 100 | 81 |
| Example 92 | $La_{0.7}Mg_{0.3}Ni_{2.5}Co_{0.5}$ | 5.1 | 110 | 100 | 76 |
| Example 93 | $La_{0.7}Mg_{0.3}Ni_{2.5}Co_{0.5}$ | 5.3 | 110 | 100 | 78 |
| Example 94 | $La_{0.7}Mg_{0.3}Ni_{2.5}Co_{0.5}$ | 5.5 | 110 | 100 | 80 |
| Example 95 | $La_{0.7}Mg_{0.3}Ni_{2.5}Co_{0.5}$ | 5.8 | 110 | 100 | 77 |

TABLE 16

|  | Hydrogen-absorbing alloy | Density of mixture (g/cc) | Tightness (%) | Ratio of longest diameter of electrode group to inner diameter of case (%) | Ratio of residual capacity (%) |
|---|---|---|---|---|---|
| Comparative Example 45 | $La_{0.7}Mg_{0.3}Ni_{2.5}Co_{0.5}$ | 5.0 | 98 | 98 | 61 |
| Comparative Example 46 | $La_{0.7}Mg_{0.3}Ni_{2.5}Co_{0.5}$ | 5.0 | 100 | 98 | 62 |
| Comparative Example 47 | $La_{0.7}Mg_{0.3}Ni_{2.5}Co_{0.5}$ | 5.0 | 105 | 100 | 64 |
| Comparative Example 48 | $La_{0.7}Mg_{0.3}Ni_{2.5}Co_{0.5}$ | 5.0 | 110 | 100 | 65 |
| Comparative Example 49 | $La_{0.7}Mg_{0.3}Ni_{2.5}Co_{0.5}$ | 6.0 | 98 | 99 | 64 |
| Comparative Example 50 | $La_{0.7}Mg_{0.3}Ni_{2.5}Co_{0.5}$ | 6.0 | 100 | 100 | 63 |
| Comparative Example 51 | $La_{0.7}Mg_{0.3}Ni_{2.5}Co_{0.5}$ | 6.0 | 105 | 100 | 60 |
| Comparative Example 52 | $La_{0.7}Mg_{0.3}Ni_{2.5}Co_{0.5}$ | 6.0 | 110 | 100 | 58 |
| Comparative Example 53 | $La_{0.7}Mg_{0.3}Ni_{2.5}Co_{0.5}$ | 5.1 | 95 | 95 | 55 |
| Comparative Example 54 | $La_{0.7}Mg_{0.3}Ni_{2.5}Co_{0.5}$ | 5.3 | 95 | 95 | 58 |
| Comparative Example 55 | $La_{0.7}Mg_{0.3}Ni_{2.5}Co_{0.5}$ | 5.5 | 95 | 96 | 60 |
| Comparative Example 56 | $La_{0.7}Mg_{0.3}Ni_{2.5}Co_{0.5}$ | 5.8 | 95 | 96 | 63 |
| Comparative Example 57 | $La_{0.7}Mg_{0.3}Ni_{2.5}Co_{0.5}$ | 5.1 | 112 | 100 | 66 |
| Comparative Example 58 | $La_{0.7}Mg_{0.3}Ni_{2.5}Co_{0.5}$ | 5.3 | 112 | 100 | 65 |
| Comparative Example 59 | $La_{0.7}Mg_{0.3}Ni_{2.5}Co_{0.5}$ | 5.5 | 112 | 100 | 64 |
| Comparative Example 60 | $La_{0.7}Mg_{0.3}Ni_{2.5}Co_{0.5}$ | 5.8 | 112 | 100 | 62 |

TABLE 17

|  | Hydrogen-absorbing alloy | Density of mixture (g/cc) | Tightness (%) | Ratio of longest diameter of electrode group to inner diameter of case (%) | Ratio of residual capacity (%) |
|---|---|---|---|---|---|
| Comparative Example 61 | $Mm_{1.0}Ni_{4.0}Co_{0.4}Mn_{0.3}Al_{0.3}$ | 5.1 | 100 | 98 | 65 |
| Comparative Example 62 | $Mm_{1.0}Ni_{4.0}Co_{0.4}Mn_{0.3}Al_{0.3}$ | 5.3 | 100 | 98 | 65 |
| Comparative Example 63 | $Mm_{1.0}Ni_{4.0}Co_{0.4}Mn_{0.3}Al_{0.3}$ | 5.5 | 100 | 99 | 65 |
| Comparative Example 64 | $Mm_{1.0}Ni_{4.0}Co_{0.4}Mn_{0.3}Al_{0.3}$ | 5.8 | 100 | 100 | 66 |
| Comparative Example 65 | $Mm_{1.0}Ni_{4.0}Co_{0.4}Mn_{0.3}Al_{0.3}$ | 6.0 | 112 | 100 | 65 |

It is clear from Tables 15 to 17 that the secondary batteries of Examples 80 to 95, which comprising a hydrogen-absorbing alloy represented by the aforementioned general formula (A) and where the density of the mixture in the negative electrode was set to fall within the range of 5.1 to 5.8 g/cc and the tightness of the electrode group was set to fall within the range of 98 to 110%, were capable of improving the ratio of residual capacity in the situation where the batteries were stored at high temperatures.

By contrast, although the aforementioned hydrogen-absorbing alloy was being employed, the secondary batteries of Comparative Examples 45 to 60 where the density of the mixture in the negative electrode or the tightness of the electrode group fell outside aforementioned ranges were found poor in the ratio of residual capacity in the situation where the batteries were stored at high temperatures.

Further, the secondary batteries of Comparative Examples 61 to 64 which comprised a negative electrode containing a $MmNi_5$ type hydrogen-absorbing alloy, and where the density of the mixture in the negative electrode and the tightness of the electrode group fell within the aforementioned ranges were found almost equivalent in the ratio of residual capacity to the secondary battery of Comparative Example 65 which comprised a negative electrode containing a $MmNi_5$ type hydrogen-absorbing alloy, and where the density of the mixture in the negative electrode and the tightness of the electrode group fell outside the aforementioned ranges.

Each of the secondary batteries obtained from Examples 85, 89, 93 and Comparative Example 62 was subjected to a repetition of charge/discharge cycle wherein each battery was charged to a depth of 150% with a current of 0.3 C, and then discharged with 1 C until the voltage was lowered down to 1.0V in each cycle. In this case, the number of cycle when the discharge capacity was lowered to 80% of the discharge capacity at moment of the first cycle was measured, the results being shown in Table 18.

TABLE 18

|  | Cycle life |
|---|---|
| Example 85 | 650 |
| Example 89 | 740 |
| Example 93 | 800 |
| Example 62 | 480 |

As seen from Table 18, the secondary batteries of Examples 85, 89 and 93 were found superior in charge/discharge cycle life as compared with the secondary battery of Comparative Example 62.

EXAMPLES 94–100 and

Comparative Examples 63–64

Each element was weighed so as to obtain the compositions shown in Tables 19 and 20 shown below, and the resultant compositions were melted in a high frequency induction furnace filled with an argon gas atmosphere, thereby preparing various kinds of hydrogen-absorbing alloy ingot. These alloy ingots were then heat-treated at a temperature of 970° C. in an argon gas atmosphere for 6 hours. By the way, the Lm in these Tables 19 and 20 was formed of a composition of: La=94 at. %, Ce=2 at. %, Pr=1 at. %, and Nd=3 at. %. Likewise, the Mm was formed of a composition of: La=35 at. %, Ce=50.3 at. %, Pr=5.5 at. %, Nd=9 at. %, and Sm=0.2 at. %.

Each of the hydrogen-absorbing alloys thus obtained was subjected to measurements to investigate the characteristics as illustrated in the following items (a) to (c).

(a) The crystal system of the principal phase in each hydrogen-absorbing alloys was determined by observing the crystal structure obtained from an X-ray diffraction pattern formed using CuKα-ray as an X-ray source.

(b) The areal ratio of the principal phase in each of the hydrogen-absorbing alloys was measured by making use of a scanning electron microscope (SEM). By the way, in the calculation of this areal ratio, SEM photographs of five view fields were employed wherein the areal ratio of the principal phase in relative to the entire area of the alloy in the view field of each SEM photograph was determined at first, and then, an average value of these areal ratios obtained was calculated to determine the areal ratio.

(c) Each hydrogen-absorbing alloys was tested to measure, as one of the hydrogen absorption characteristics, a rechargeable hydrogen storage capacity (JIS H7003: Term for Hydrogen Absorbing Alloy) from the iso-thermal line of pressure-composition which was measured under a hydrogen pressure of less than 10 atm. at a temperature of 60° C. by making use of Sievert's method (JIS H7201).

The results of these measurements are shown in the following Tables 19 and 20.

Subsequently, the alloy ingots thus obtained were pulverized to a particle diameter of 150 μm or less to prepare hydrogen absorbing alloy powder of 9 kinds.

Each hydrogen absorbing alloy powder was then mixed with electrolytic copper powder at a ratio of 1:2 (weight ratio), and 1 g of the resultant mixture was pressed for 5 minutes with a pressure of 10,000 kg/cm², thus obtaining 9 kinds of pellet each having a diameter of 12 mm. These pellets were sandwiched between Ni wire nettings, and the peripheral portion thereof was spot-welded to achieve the press-bonding thereof. Subsequently, to this press-bonded body was connected Ni lead wires by means of spot-welding thereby preparing 9 kinds of hydrogen absorbing alloy electrode (a negative electrode).

Each of the negative electrodes thus obtained was dipped together with a counter electrode (sintered nickel electrode) into an aqueous solution of 8N-KOH, whereby assembling test.

Then, the test cells thus prepared were subjected to a charge/discharge cycle test at a temperature of 20° C. The charge/discharge conditions in this test were as follows. Namely, the cell was subjected at first to a charging for 5 hours with a current of 100 mA per 1 g of the hydrogen-absorbing alloy, and, after 10 minute cessation, discharged with a current of 100 mA per 1 g of the hydrogen-absorbing alloy until the voltage (with respect to a mercury oxide electrode) was decreased down to −0.6V. This charge/discharge cycle was repeated so as to measure the maximum discharge capacity and the cycle life. The cycle life is the number of cycle when the discharge capacity was lowered to 80% of the maximum discharge capacity. The results of this test are shown in the following Tables 19 and 20.

TABLE 19

|  | Composition | Crystal structure | Areal ratio of principal phase | Rechargeable hydrogen storage capacity (H/M) | Discharge capacity (mAh/g) | Cycle life |
|---|---|---|---|---|---|---|
| Example 94 | $La_{0.73}Mg_{0.27}(Ni_{0.85}Co_{0.14}Al_{0.01})_{3.4}$ | $Ce_2Ni_7$ | 85% | 1.09 | 400 | 380 |
| Example 95 | $Lm_{0.68}Mg_{0.32}(Ni_{0.98}Al_{0.02})_{3.15}$ | $PuNi_3$ | 90% | 1.05 | 365 | 290 |
| Example 96 | $Lm_{0.78}Mg_{0.22}(Ni_{0.85}Co_{0.1}Fe_{0.05})_{3.7}$ | $Ce_2Ni_7$ | 88% | 1.07 | 380 | 325 |
| Example 97 | $La_{0.8}Y_{0.05}Mg_{0.15}(Ni_{0.7}Co_{0.28}Sn_{0.02})_{4.08}$ | $Ce_2Ni_7$ | 74% | 0.92 | 290 | 325 |
| Example 98 | $Lm_{0.64}Mg_{0.36}(Ni_{0.85}Co_{0.1}Cu_{0.05})_{3.2}$ | $PuNi_3$ | 87% | 1.08 | 388 | 270 |

TABLE 20

| | Composition | Crystal structure | Areal ratio of principal phase | Rechargeable hydrogen storage capacity (H/M) | Discharge capacity (mAh/g) | Cycle life |
|---|---|---|---|---|---|---|
| Example 99 | $Lm_{0.74}Mg_{0.26}(Ni_{0.85}Co_{0.1}Nb_{0.04}B_{0.01})_{3.8}$ | $Ce_2Ni_7$ | 90% | 1.05 | 365 | 275 |
| Example 100 | $Lm_{0.6}Mg_{0.3}Ca_{0.1}(Ni_{0.8}Co_{0.05}Cr_{0.05})_{3.12}$ | $PuNi_3$ | 94% | 1.08 | 385 | 220 |
| Comparative Example 63 | $La_{0.3}Mg_{0.7}Ni_{4.7}$ | $CaCu_5$ | 78% | 0.1 | 50 | 120 |
| Comparative Example 64 | $La_{0.55}Mg_{0.45}Ni_{2.12}$ | $MgCu_2$ | 92% | 0.2 | 80 | 40 |

As apparent from Tables 19 and 20, the hydrogen-absorbing alloys according to Examples 94 to 100 which had a composition represented by the general formula (1) and contained, as a principal phase, at least one kind of phase selected from the group consisting of the aforementioned first phase and the aforementioned second phase indicated a higher rechargeable hydrogen storage capacity as compared with the hydrogen-absorbing alloy of Comparative Example 63 containing, as a principal phase, an $AB_5$ type phase such as a $CaCu_5$ type phase, as well as with the hydrogen-absorbing alloy of Comparative Example 64 containing, as a principal phase, an $AB_2$ type phase such as a $MgCu_2$ type phase.

Further, the metal oxide/hydrogen secondary batteries of Examples 94 to 100 indicated more excellent properties in both discharge capacity per unit weight and charge/discharge cycle life as compared with the secondary batteries of Comparative Examples 63 and 64.

EXAMPLES 101–119 and

Comparative Examples 65–69

(High Frequency Induction Melting)

Each element was weighed so as to obtain the compositions shown in the following Tables 21 and 23, and the resultant compositions were melted in a high frequency induction furnace filled with an argon gas atmosphere, thereby preparing the ingots of hydrogen-absorbing alloys.

(Rapidly Solidification)

Each element was weighed so as to obtain the compositions shown in the following Tables 21 and 23, and the resultant compositions were melted in a high frequency induction furnace filled with an argon gas atmosphere, thereby preparing the ingots of hydrogen-absorbing alloys. Then, each of these ingots was melted, and the resultant melt was dropped in an argon gas atmosphere on the surface of a copper single roll rotating at a peripheral velocity of 15 m/sec to solidify the melt, thereby obtaining a thin hydrogen-absorbing alloy flake.

Subsequently, each hydrogen-absorbing alloy ingot and each hydrogen-absorbing alloy flake were heat-treated under the conditions (temperature and time) shown in Tables 22 and 24. By the way, the Lm in these Tables 21 and 23 was formed of a composition of: La=94 at. %, Ce=2 at. %, Pr=1 at. %, and Nd=3 at. %. Likewise, the Mm was formed of a composition of: La=35 at. %, Ce=50.3 at. %, Pr=5.5 at. %, Nd=9 at. %, and Sm=0.2 at. %.

Each of the hydrogen-absorbing alloys thus obtained was subjected to measurements to investigate the characteristics as illustrated in the aforementioned items (a) to (b), the results being shown in the following Tables 21 and 23.

Subsequently, each of the alloy ingots and flakes thus obtained were mechanically pulverized and sieved to prepare hydrogen absorbing alloy powders having a particle diameter of 20 to 150 μm.

Each hydrogen absorbing alloy powder was then mixed with electrolytic copper powder at a ratio of 1:3 (weight ratio), and 1 g of the resultant mixture was pressed for 5 minutes with a pressure of 1,000 kg/cm², thus obtaining pellets each having a diameter of 12 mm. These pellets were then sandwiched between Ni wire nettings, and the peripheral portion thereof was spot-welded to achieve the press-bonding thereof. Subsequently, to this press-bonded body was connected Ni lead wires by means of spot-welding thereby preparing 24 kinds of hydrogen absorbing alloy electrode (a negative electrode).

Each of the negative electrodes thus obtained was dipped together with a counter electrode (sintered nickel electrode) into an aqueous solution of 8N-KOH, whereby assembling test.

Then, the test cells thus prepared were subjected to a charge/discharge cycle test at a temperature of 25° C. The charge/discharge conditions in this test were as follows. Namely, the cell was subjected at first to a charging for 5 hours with a current of 100 mA per 1 g of the hydrogen-absorbing alloy, and, after 10 minute cessation, discharged with a current of 50 mA per 1 g of the hydrogen-absorbing alloy until the voltage (with respect to a mercury oxide electrode) was decreased down to −0.6V. This charge/discharge cycle was repeated so as to measure the maximum discharge capacity. Further, the electric potential at the middle point of the third discharge cycle was also measured. Additionally, the cycle life was also measured. The results of this test are shown in the following Tables 22 and 24.

TABLE 21

|  | Composition | Crystal structure | Areal ratio of principal phase |
|---|---|---|---|
| Example 101 | $La_{0.69}Mg_{0.31}(Ni_{0.73}Co_{0.27})_{3.1}$ | $PuNi_3$ | 92 |
| Example 102 | $Lm_{0.72}Mg_{0.28}(Ni_{0.92}Fe_{0.08})_{3.2}$ | $PuNi_3$ | 89 |
| Example 103 | $La_{0.53}Nd_{0.24}Mg_{0.23}(Ni_{0.85}Cr_{0.12}Al_{0.03})_{3.3}$ | $Ce_2Ni_7$ | 88 |
| Example 104 | $La_{0.5}Mm_{0.16}Mg_{0.34}(Ni_{0.97}V_{0.01}Ga_{0.02})_{2.85}$ | $PuNi_3$ | 85 |
| Example 105 | $Lm_{0.67}Mg_{0.33}(Ni_{0.95}Al_{0.03}Cu_{0.02})_{3.1}$ | $PuNi_3$ | 91 |
| Example 106 | $La_{0.76}Mg_{0.24}(Ni_{0.97}Sn_{0.03})_{3.3}$ | $Ce_2Ni_7$ | 90 |
| Example 107 | $Lm_{0.75}Mg_{0.25}(Ni_{0.82}Co_{0.1}Si_{0.08})_{3.4}$ | $Ce_2Ni_7$ | 92 |
| Example 108 | $La_{0.45}Pr_{0.26}Mg_{0.29}(Ni_{0.88}Co_{0.1}P_{0.02})_{3.2}$ | $PuNi_3$ | 93 |
| Example 109 | $La_{0.67}Y_{0.1}Mg_{0.23}(Ni_{0.7}Co_{0.2}Cu_{0.1})_{3.9}$ | $Ce_2Ni_7$ | 89 |
| Example 110 | $La_{0.76}Mg_{0.24}(Ni_{0.89}V_{0.04}Nb_{0.07})_{3.5}$ | $Ce_2Ni_7$ | 97 |
| Example 111 | $La_{0.6}Mm_{0.13}Mg_{0.27}(Ni_{0.9}Zn_{0.02}Sn_{0.06})_{3.6}$ | $Ce_2Ni_7$ | 95 |
| Example 112 | $Lm_{0.71}Mg_{0.29}(Ni_{0.96}Si_{0.01}Nb_{0.03})_{3.55}$ | $Ce_2Ni_7$ | 96 |

TABLE 22

|  |  | Conditions for heat treatment | | Discharge Capacity (mAh/g) | Potential at middle point of discharging (V) | Cycle life |
|---|---|---|---|---|---|---|
|  | Methods | Temperature (° C.) | Time (H) |  |  |  |
| Example 101 | rf | 980 | 2 | 417 | 0.92 | 386 |
| Example 102 | mq | 950 | 40 | 366 | 0.88 | 354 |
| Example 103 | rf | 1000 | 10 | 382 | 0.87 | 375 |
| Example 104 | rf | 950 | 300 | 349 | 0.86 | 332 |
| Example 105 | rf | 1000 | 5 | 368 | 0.89 | 310 |
| Example 106 | rf | 950 | 1 | 379 | 0.89 | 368 |
| Example 107 | rf | 1000 | 10 | 398 | 0.89 | 379 |
| Example 108 | mq | 1020 | 3.5 | 395 | 0.88 | 354 |
| Example 109 | rf | 1050 | 5 | 346 | 0.92 | 305 |
| Example 110 | rf | 1030 | 20 | 376 | 0.91 | 347 |
| Example 111 | rf | 1040 | 50 | 382 | 0.9 | 365 |
| Example 112 | mq | 1050 | 0.5 | 392 | 0.91 | 329 |

(Note)
In the manufacturing method, rf represents a high frequency induction melting, and mq represents a rapidly solidification.

TABLE 23

|  | Composition | Crystal structure | Areal ratio of principal phase |
|---|---|---|---|
| Example 113 | $La_{0.74}Mg_{0.24}Ca_{0.02}(Ni_{0.92}Cr_{0.08})_{3.5}$ | $Ce_2Ni_7$ | 95 |
| Example 114 | $Lm_{0.40}Mm_{0.20}Mg_{0.32}Zr_{0.08}(Ni_{0.96}Ga_{0.02}Cu_{0.02})_{3.05}$ | $PuNi_3$ | 91 |
| Example 115 | $La_{0.64}Ce_{0.10}Mg_{0.22}Ca_{0.04}(Ni_{0.65}Co_{0.34}Si_{0.01})_{3.8}$ | $Ce_2Ni_7$ | 85 |
| Example 116 | $La_{0.76}Mg_{0.22}Zr_{0.02}(Ni_{0.99}Al_{0.01})_{3.65}$ | $Ce_2Ni_7$ | 89 |
| Example 117 | $La_{0.59}Mg_{0.34}Zr_{0.07}(Ni_{0.6}Si_{0.01}Nb_{0.03})_{3.02}$ | $PuNi_3$ | 95 |
| Example 118 | $Lm_{0.73}Mg_{0.24}Ca_{0.03}(Ni_{0.89}V_{0.04}Cu_{0.07})_{3.45}$ | $Ce_2Ni_7$ | 92 |
| Example 119 | $La_{0.59}Y_{0.04}Mg_{0.31}Ti_{0.06}(Ni_{0.98}Sn_{0.02})_{3.2}$ | $PuNi_3$ | 88 |
| Comparative Example 65 | $La_{0.36}Mg_{0.62}Zr_{0.12}(Ni_{0.35}Al_{0.65})_{4.1}$ | $CaCu_5$ | 65 |
| Comparative Example 66 | $Lm_{0.10}Mg_{0.32}Ti_{0.58}(Ni_{0.95}Sn_{0.05})_{3.1}$ | $TiNi_3$ | 55 |
| Comparative Example 67 | $Ce_{0.47}Mg_{0.48}Zr_{0.05}(Ni_{0.65}Zn_{0.35})_{4.1}$ | $CaCu_5$ | 70 |
| Comparative Example 68 | $Mm_{0.45}Mg_{0.32}Ca_{0.23}(Ni_{0.95}Si_{0.05})_{3.5}$ | $CaCu_5$ | 65 |
| Comparative Example 69 | $Lm_{0.62}Mg_{0.24}Zr_{0.14}(Ni_{0.96}Al_{0.03}B_{0.01})_{2.1}$ | $MgCu_2$ | 90 |

TABLE 24

| | Methods | Conditions for heat treatment Temperature (° C.) | Time (H) | Discharge Capacity (mAh/g) | Potential at middle point of discharging (V) | Cycle life |
|---|---|---|---|---|---|---|
| Example 113 | rf | 920 | 2 | 343 | 0.87 | 275 |
| Example 114 | rf | 950 | 2.5 | 369 | 0.91 | 376 |
| Example 115 | mq | 910 | 10 | 374 | 0.88 | 298 |
| Example 116 | mq | 930 | 15 | 341 | 0.91 | 380 |
| Example 117 | rf | 900 | 4 | 382 | 0.89 | 395 |
| Example 118 | rf | 920 | 10 | 377 | 0.88 | 305 |
| Example 119 | mq | 950 | 4 | 345 | 0.88 | 355 |
| Comparative Example 65 | rf | 1200 | 4 | 100 | 0.80 | 120 |
| Comparative Example 66 | rf | 1250 | 20 | 30 | 0.72 | 40 |
| Comparative Example 67 | mq | 900 | 0.01 | 80 | 0.75 | 78 |
| Comparative Example 68 | rf | 600 | 10 | 154 | 0.71 | 107 |
| Comparative Example 69 | mq | 950 | 10 | 55 | 0.70 | 67 |

(Note)
In the manufacturing method, rf represents a high frequency induction melting, and mq represents a rapidly solidification.

As apparent from Tables 21 to 24, the metal oxide-hydrogen secondary batteries of Examples 101 to 119 which comprised a negative electrode containing the hydrogen-absorbing alloys having a composition represented by the general formula (1) and containing, as a principal phase, at least one kind of phase selected from the group consisting of the aforementioned first phase and the aforementioned second phase indicated more excellent discharge capacity per unit weight and charge/discharge cycle life as compared with the secondary batteries of Comparative Examples 65 to 69.

EXAMPLES 120–137 and

Comparative Examples 70–73

Each element was weighed so as to obtain the compositions shown in the following Table 25, and the resultant compositions were melted in a high frequency induction furnace filled with an argon gas atmosphere, thereby preparing the ingots of hydrogen-absorbing alloys. Then, each of these ingots was heat-treated in an argon gas atmosphere at a temperature of 940° C. for 6 hours, thereby obtaining the hydrogen-absorbing alloys of Examples 120–133 and Comparative Examples 70–73.

On the other hand, each element was weighed so as to obtain the compositions shown in the following Table 25, and the resultant compositions were melted in a high frequency induction furnace filled with an argon gas atmosphere, thereby preparing the ingots of hydrogen-absorbing alloys. Then, each of these ingots was heat-treated in an argon gas atmosphere under the conditions shown below, thereby obtaining the hydrogen-absorbing alloys of Examples 134–137.

(Conditions for the Heat Treatment)

In Example 134, the treatment temperature was set to 980° C., and the treatment time was set to 6 hours.

In Example 135, the treatment temperature was set to 975° C., and the treatment time was set to 8 hours.

In Example 136, the treatment temperature was set to 1,000° C., and the treatment time was set to 5 hours.

In Example 137, the treatment temperature was set to 1,020° C., and the treatment time was set to 4 hours.

By the way, the Lm in the Table 25 was formed of a composition of: La=80 at. %, Ce=4 at. %, Pr=4 at. %, and Nd=12 at. %. Likewise, the Mm was formed of a composition of: La=35 at. %, Ce=50.3 at. %, Pr=5.5 at. %, Nd=9 at. %, and Sm=0.2 at. %.

The hydrogen-absorbing alloy ingot was pulverized in an argon gas atmosphere so as to obtain powders having an average particle diameter of 45 $\mu$m. Then, 100 parts by weight of the hydrogen-absorbing alloy powder was mixed with 0.5 part by weight of nickel powder which was prepared by means of carbonyl process and available in the market and with 0.5 part by weight of Ketjen Black, thereby to obtain a mixture. Thereafter, to 100 parts by weight of this mixture was added 1 part by weight of polytetrafluoroethylene (PTFE), 0.2 part by weight of sodium polyacrylate, 0.2 part by weight of carboxymethylcellulose and 50 parts by weight of water to obtain a mixture which was then agitated, thereby to obtain a paste. The paste was then coated on an iron porous thin plate covered with a nickel plating, and dried to obtain a coated plate. The thickness of this coated layer on the plate was adjusted by roll pressing, the resultant plate being cut into a predetermined size thereby to obtain a negative electrode containing 7 g of the hydrogen-absorbing alloy.

This negative electrode and a pasted nickel positive electrode having a nominal capacity of 1500 mAh and manufactured according to known technique were spirally wound with a separator being interposed therebetween thereby to obtain an electrode group. By the way, as for the separator, a polyolefin non-woven fabric graft-copolymerized with acrylic monomer was employed.

Then, this electrode group and 2.4 mL of an electrolyte containing 7 mol/cm$^3$ of KOH, 0.5 mol/cm$^3$ of NaOH and 0.5 mol/cm$^3$ of LiOH were placed and sealed in a closed-end cylindrical case thereby assembling an AA size cylindrical nickel-hydrogen secondary battery having a nominal capacity of 1500 mAh.

Then, the secondary batteries of Examples 120–137 and Comparative Examples 70 and 73 were subjected to a charge/discharge test after being left to stand at room temperature for 24 hours as follows. Namely, each of the secondary batteries was subjected to the charge/discharge cycle four times wherein these batteries were charged with a current of 150 mA for 15 hours, followed by the discharging thereof with 150 mA until the voltage was lowered down to 0.8V.

Thereafter, the charge/discharge cycle was repeated in an environment of 40° C. until the discharge capacity thereof was lowered to 80% or less of the discharge capacity of the first charge/discharge cycle, at which moment the number of the charge/discharge cycle was measured. The number of the charge/discharge cycle and the discharge capacity of the first charge/discharge cycle are shown in the following Table 25. By the way, the charging step in this charge/discharge cycle was performed by way of $-\Delta V$ method wherein the charging current was set to 1500 mA and the charging was terminated when the voltage was lowered by 10 mV from the maximum charge voltage. On the other hand, the discharging in this charge/discharge cycle was continued using a current of 3000 mA until the voltage of the battery was reduced to 1.0V.

Table 26 shows the results of measurement on the characteristics of the hydrogen-absorbing alloys of Examples 120 to 137 and Comparative Examples 70 to 73, which are performed as explained in the following paragraphs (1) to (3).

(1) The crystal system of the principal phase in each hydrogen-absorbing alloys was determined by observing the crystal structure obtained from an X-ray diffraction pattern formed using CuKα-ray as an X-ray source. The crystal structure of the principal phase are also shown in Table 26.

By the way, the hydrogen-absorbing alloys of Examples 134 and 137 contained, as a principal phase, a phase having a crystal structure which was similar to the $Ce_2Ni_7$ type structure. Specifically, the alloy of Example 134 indicated a highest peak in 2θ of 42.1°±1°, in an X-ray diffraction using CuKα-ray, and the intensity ratio thereof as represented by the following formula (I) was 25%. On the other hand, the alloy of Example 135 indicated a highest peak in 2θ of 42.1°±1°, in an X-ray diffraction using CuKα-ray, and the peak appeared in 2θ of 31° to 34° was found as being split into two.

$$I_3/I_4 \qquad (I)$$

wherein $I_4$ is an intensity of a peak exhibiting a highest intensity in the X-ray diffraction; and $I_3$ is an intensity of a peak appearing within 2θ of 31 to 34° in the X-ray diffraction.

On the other hand, the hydrogen-absorbing alloys of Examples 136 and 137 contained, as a principal phase, a phase having a crystal structure which was similar to the $PuNi_3$ type structure. Specifically, the alloy of Example 136 indicated a highest peak in 2θ of 42.1°±1°, in an X-ray diffraction using CuKα-ray, and the intensity ratio thereof as represented by the above formula (I) was 22%. On the other hand, the alloy of Example 137 indicated a highest peak in 2θ of 42.1°±1°, in an X-ray diffraction using CuKα-ray, and the peak appeared in 2θ of 31° to 34° was found as being split into two.

(2) In the same manner as explained above with reference to Example 94, the areal ratio of the principal phase of each of the hydrogen-absorbing alloys was measured, the results being shown in Table 26.

(3) Each hydrogen-absorbing alloys was tested to measure, as one of the hydrogen absorption characteristics, a rechargeable hydrogen storage capacity (JIS H7003: Term for Hydrogen Absorbing Alloy) from the iso-thermal line of pressure-composition which was measured under a hydrogen pressure of less than 10 atm. at a temperature of 60° C. by making use of Sievert's method (JIS H7201). The results are shown in Table 26.

TABLE 25

| Composition | | Capacity (mAh/g) | Cycle life |
|---|---|---|---|
| Example 120 | $La_{0.76}Mg_{0.24}Ni_{3.32}Al_{0.08}$ | 1350 | 325 |
| Example 121 | $La_{0.6}Pr_{0.14}Mg_{0.26}Ni_{3.18}Mn_{0.02}Si_{0.01}$ | 1335 | 220 |
| Example 122 | $La_{0.52}Nd_{0.2}Mg_{0.28}Ni_{3.1}Co_{0.1}Fe_{0.01}Al_{0.08}$ | 1360 | 265 |
| Example 123 | $Lm_{0.77}Mg_{0.23}Ni_{3.35}Al_{0.1}Mo_{0.01}$ | 1355 | 315 |
| Example 124 | $Lm_{0.8}Mg_{0.2}Ni_{3.4}Co_{0.05}Mn_{0.02}Al_{0.1}Ta_{0.01}$ | 1350 | 245 |
| Example 125 | $La_{0.75}Ce_{0.05}Mg_{0.2}Ni_{3.5}Zn_{0.02}Al_{0.12}Li_{0.01}$ | 1320 | 270 |
| Example 126 | $La_{0.74}Y_{0.08}Mg_{0.18}Ni_{3.45}Co_{0.08}Sn_{0.02}$ | 1330 | 265 |
| Example 127 | $Lm_{0.7}Mg_{0.3}Ni_{3.15}Cu_{0.05}Al_{0.06}$ | 1368 | 250 |
| Example 128 | $Lm_{0.74}Mg_{0.26}Ni_{3.35}Co_{0.02}W_{0.01}B_{0.01}Al_{0.05}$ | 1365 | 275 |
| Example 129 | $Lm_{0.68}Mm_{0.11}Mg_{0.21}Ni_{3.4}Al_{0.12}Ga_{0.03}$ | 1335 | 295 |
| Example 130 | $Lm_{0.66}Mm_{0.1}Mg_{0.24}Ni_{3.3}Co_{0.06}Mn_{0.03}V_{0.02}Al_{0.07}$ | 1345 | 230 |
| Example 131 | $Lm_{0.76}Ca_{0.01}Mg_{0.23}Ni_{3.3}Cr_{0.01}Al_{0.05}$ | 1385 | 295 |
| Example 132 | $Lm_{0.75}Zr_{0.02}Mg_{0.23}Ni_{3.28}P_{0.01}Al_{0.1}$ | 1355 | 300 |
| Example 133 | $Lm_{0.78}Ti_{0.01}Mg_{0.21}Ni_{3.4}Al_{0.15}S_{0.01}$ | 1345 | 310 |
| Example 134 | $Lm_{0.77}Mg_{0.23}Ni_{3.23}Al_{0.12}$ | 1335 | 305 |
| Example 135 | $Lm_{0.72}Mm_{0.06}Mg_{0.22}Ni_{3.3}Co_{0.02}Mn_{0.01}Sn_{0.02}Al_{0.07}$ | 1340 | 285 |
| Example 136 | $Lm_{0.77}Mg_{0.23}Ni_{3.13}Co_{0.2}Mn_{0.02}Al_{0.12}$ | 1330 | 230 |
| Example 137 | $Lm_{0.72}Mm_{0.06}Mg_{0.22}Ni_{3.1}Co_{0.2}Mn_{0.03}Nb_{0.02}Al_{0.07}$ | 1325 | 220 |
| Comparative Example 70 | $La_{0.3}Mg_{0.7}Ni_{4.7}$ | 500 | 25 |
| Comparative Example 71 | $La_{0.55}Mg_{0.45}Ni_{2.12}$ | 1100 | 35 |
| Comparative Example 72 | $(La_{0.32}Ce_{0.48}Pr_{0.05}Nd_{0.13}Sm_{0.02})_{0.975}Mg_{0.025}Ni_{2.925}Mn_{0.35}Cu_{0.1}Nb_{0.075}$ | 1020 | 25 |
| Comparative Example 73 | $(La_{0.3}Ce_{0.49}Pr_{0.05}Nd_{0.14}Sm_{0.02})_{0.975}Mg_{0.025}Ni_3Mn_{0.35}Cu_{0.1}Ga_{0.05}$ | 1230 | 30 |

TABLE 26

|  | Crystal structure of principal phase | Areal ratio of principal phase | Rechargeable hydrogen storage capacity (H/M) |
| --- | --- | --- | --- |
| Example 120 | $Ce_2Ni_7$ type | 97% | 1.09 |
| Example 121 | $Ce_2Ni_7$ type + $PuNi_3$ type | 94% | 1.08 |
| Example 122 | $Ce_2Ni_7$ type + $CeNi_3$ type | 92% | 1.06 |
| Example 123 | $Ce_2Ni_7$ type + $PuNi_3$ type | 91% | 1.05 |
| Example 124 | $Ce_2Ni_7$ type | 94% | 1.07 |
| Example 125 | $Ce_2Ni_7$ type | 89% | 1.03 |
| Example 126 | $Ce_2Ni_7$ type | 88% | 0.92 |
| Example 127 | $Ce_2Ni_7$ type + $PuNi_3$ type | 95% | 1.08 |
| Example 128 | $Ce_2Ni_7$ type | 92% | 1.05 |
| Example 129 | $Ce_2Ni_7$ type | 96% | 1.08 |
| Example 130 | $Ce_2Ni_7$ type + $CeNi_3$ type | 92% | 1.05 |
| Example 131 | $Ce_2Ni_7$ type | 94% | 1.08 |
| Example 132 | $Ce_2Ni_7$ type + $PuNi_3$ type | 90% | 0.99 |
| Example 133 | $Ce_2Ni_7$ type | 89% | 0.97 |
| Example 134 | Similar to $Ce_2Ni_7$ type | 82% | 0.89 |
| Example 135 | Similar to $Ce_2Ni_7$ type | 83% | 0.87 |
| Example 136 | Similar to $PuNi_3$ type | 72% | 0.86 |
| Example 137 | Similar to $PuNi_3$ type | 74% | 0.85 |
| Comparative Example 70 | $CaCu_5$ type | 78% | 0.3 |
| Comparative Example 71 | $MgCu_2$ type | 79% | 0.2 |
| Comparative Example 72 | $Ce_2Ni_7$ type | 83% | 0.52 |
| Comparative Example 73 | $Ce_2Ni_7$ type | 85% | 0.51 |

As apparent from Tables 25 and 26, the hydrogen-absorbing alloys according to Examples 120 to 137 which had a composition represented by the general formula (1) and contained, as a principal phase, at least one kind of phase selected from the group consisting of the aforementioned first phase and the aforementioned second phase indicated a higher rechargeable hydrogen storage capacity as compared with the hydrogen-absorbing alloys of Comparative Examples 70 to 73. By the way, the hydrogen-absorbing alloy of Comparative Example 70 contained, as a principal phase, an $AB_5$ type crystal phase such as a $CaCu_5$ type crystal phase, while the hydrogen-absorbing alloy of Comparative Example 71 contained, as a principal phase, an $AB_2$ type crystal phase such as a $MgCu_2$ type crystal phase. Further, the hydrogen-absorbing alloy of Comparative Examples 72 and 73 were of the kind where the atomic ratio of Mn was 0.135 or more, which correspond to the hydrogen-absorbing alloy disclosed in the aforementioned Japanese Patent Unexamined Publication H11-29832.

It will be also seen that the secondary batteries of Examples 120 to 137 are more excellent in both discharge capacity per unit weight and charge/discharge cycle life as compared with the secondary batteries of Comparative Examples 70 and 73.

EXAMPLES 138–153 and

Comparative Examples 74–79

Each element was weighed so as to obtain predetermined compositions, and the resultant compositions were melted in a high frequency induction furnace filled with an argon gas atmosphere, thereby preparing the hydrogen-absorbing alloy ingots of Examples 138–145 and Comparative Examples 74–76. On the other hand, the alloys of $RNi_5$ type, $R_2Ni_7$ type, $RNi_3$ type, $RNi_2$ type and MgNi type, which are relatively high in melting point, were manufactured by high frequency induction furnace, and then, the resultant alloys were mixed together to obtain mixtures, which were then melted to prepare the hydrogen-absorbing alloys of Examples 146–153 and Comparative Examples 77–79.

Out of these alloys thus obtained, the alloys of Comparative Examples 74, 75 and 78, and the alloys of all of Examples 138–153 were heat-treated at a temperature of 900° C. for 7 hours. After being further heat-treated at a temperature of 700° C. for 40 hours, the alloys were pulverized to prepare alloy powders having a particle diameter of 25 μm or less. On the other hand, the alloys of Comparative Examples 76, 77 and 79 were pulverized, without performing the heat treatment thereof, to prepare alloy powders having a particle diameter of 125 μm or less.

<Evaluation of Hydrogen Absorption Rate>

Figure 7:
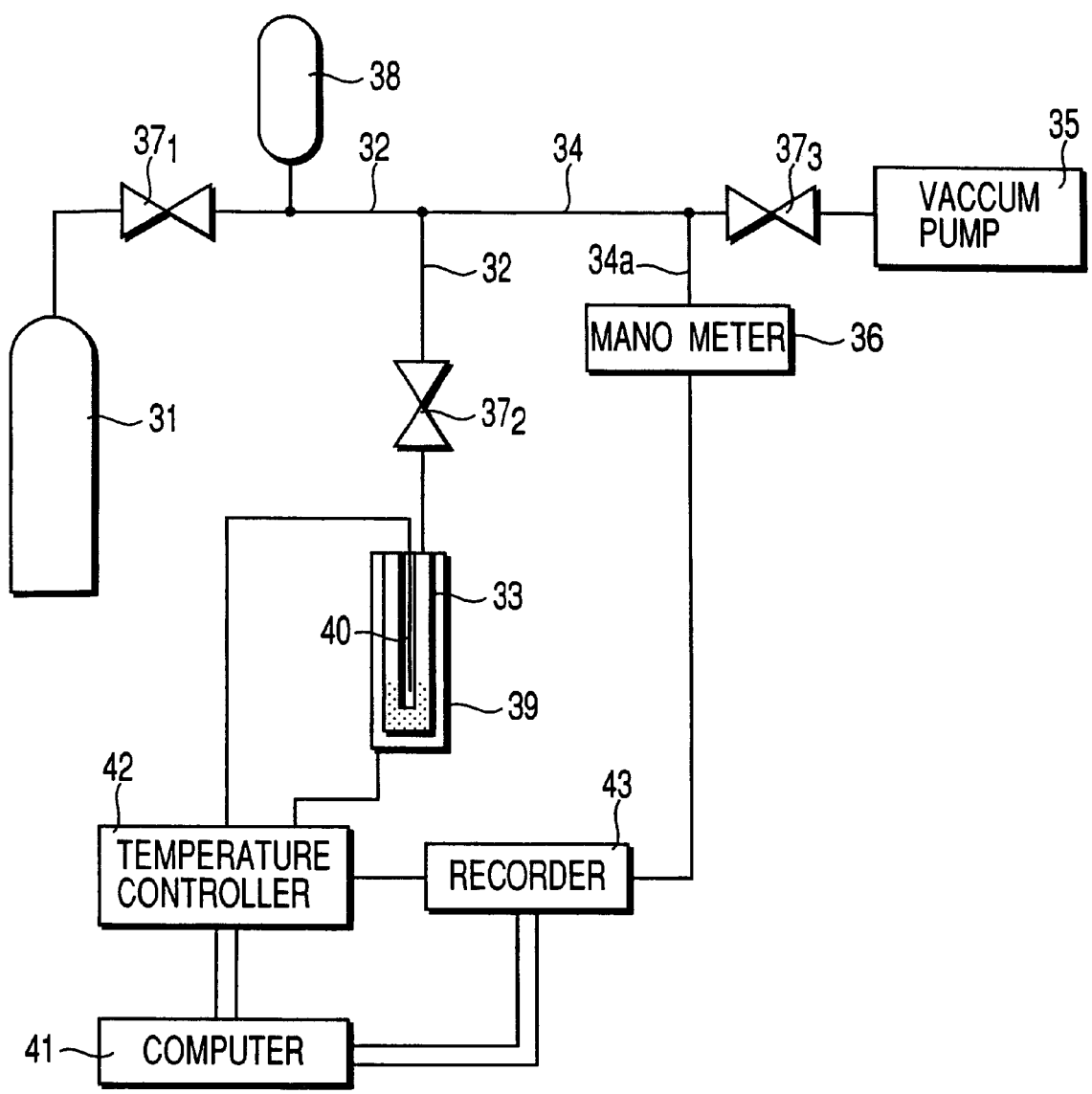
FIG. 7 is a schematic diagram showing a temperature scanning type hydrogen absorption/desorption characteristics evaluating apparatus to be employed for evaluating a hydrogen-absorbing alloy.

The hydrogen absorption rate of the hydrogen-absorbing alloys of Examples 138–153 and Comparative Examples 74–79 was measured by making use of the temperature scanning type hydrogen absorption/desorption characteristics evaluating apparatus shown in FIG. 7.

Referring to FIG. 7, a hydrogen gas cylinder 31 is connected via a pipe 32 to a test sample vessel 33. The middle portion of the pipe 32 is branched, and a distal end of the branched pipe 34 is connected to a vacuum pump 35. A manometer 36 is mounted on a pipe portion 34a branched from the branched pipe 34. On the pipe 32 interposed between the hydrogen gas cylinder 31 and the test sample vessel 33, there are mounted a first valve $37_1$ and a second valve $37_2$ in the mentioned order starting from the hydrogen gas cylinder 31. A pressure accumulator 38 is attached to a portion of the pipe 32 which is located between the first valve $37_1$ and the second valve $37_2$. Further, the vacuum pump 35 is connected via a third valve $37_3$ with the branched pipe 34a.

The test sample vessel 33 is provided with a heater 39. A thermocouple 40 is disposed inside the test sample vessel 33. A temperature controller 42 to be controlled by a computer 41 is connected to the thermocouple 40 as well as to the heater 39 so as to control the temperature of the heater 39 on the basis of a temperature detected from the thermocouple 40. A recorder 43 to be controlled by the computer 41 is connected to the manometer 36 as well as to the temperature controller 42.

Then, each of these hydrogen-absorbing alloys according to Examples 138–153 and Comparative Examples 74–79 was charged into the test sample vessel 33 (ambient temperature: 80° C.) shown in FIG. 7. Thereafter, the first valve $37_1$ was closed, and both of the second valve $37_2$ and the third valve $37_3$ were opened. Under this condition, the vacuum pump 35 was actuated to exhaust the air in each of the pipe 32, the branched pipe 34 and the pressure accumulator 38. Then, after the second valve $37_2$ and the third valve $37_3$ were closed, the first valve $37_1$ was opened to supply hydrogen from the hydrogen gas cylinder 31 to each of the pipe 32, the branched pipe 34 and the pressure accumulator 38 thereby carrying out a hydrogen displacement of them. Subsequently, the first valve $37_1$ was closed and at the same time, the quantity of hydrogen introduced was calculated from the pressures of the system indicated by the manometer 36. Thereafter, the second valve $37_2$ was opened thereby feeding hydrogen to the test sample vessel 33, and the temperature thereof was monitored by the thermocouple 40. Then, the temperature of the test sample vessel 33 was controlled to rise at a constant rate by making use of the computer 41 and the temperature controller 42. The temperature of the test sample vessel 33 was scanned by making use of a heater 39 which was designed to receive the control signals. At the same time, a change in pressure if any within the test sample vessel 33 was detected by means of the manometer 36 and recorded in the recorder 43.

As described above, a constant volume of hydrogen was introduced into the test sample vessel 33 at a temperature of 80° C., and the quantity of hydrogen absorbed in each of the hydrogen-absorbing alloys during the period of five hours starting from the initiation of introducing hydrogen was detected from the changes in pressure inside the test sample vessel 33, and at the same time, the hydrogen absorption rate was determined by calculating the quantity of hydrogen absorption per unit time (H/M·h$^{-1}$). The results are shown in the following Tables 27 and 28.

In the following Tables 27 and 28, the compositions of the hydrogen-absorbing alloys as well as the intensity ratios ($I_1/I_2$) are shown. By the way, $I_2$ is an intensity of a peak exhibiting a highest intensity in the X-ray diffraction pattern using CuKα-ray; and $I_1$ is an intensity of a peak exhibiting a highest intensity within 2θ of 8 to 13° in the X-ray diffraction pattern.

<Evaluation of Secondary Battery Comprising a Negative Electrode Containing a Hydrogen-absorbing Alloy>

The powder of each hydrogen absorbing alloy which was pulverized in advance to 75 μm or less was mixed with electrolytic copper powder at a ratio of 1:1 (weight ratio), and 1 g of the resultant mixture was pressed for 5 minutes with a pressure of 10,000 kg/cm$^2$ by making use of a tablet-molding machine (10 mm in inner diameter), thus obtaining pellets. These pellets were then sandwiched between Ni wire nettings, and the peripheral portion thereof was spot-welded to achieve the press-bonding thereof. Subsequently, to this press-bonded body was connected Ni lead wires by means of spot-welding thereby preparing 22 kinds of hydrogen absorbing alloy electrode (a negative electrode).

Each of the negative electrodes thus obtained was dipped together with a counter electrode (sintered nickel electrode) into an aqueous solution of 8N-KOH, whereby assembling test.

Then, the test cells thus prepared were subjected to a charge/discharge cycle test at a temperature of 25° C. to obtain a maximum discharge capacity. By the way, the charge/discharge conditions in this test were as follows. Namely, the cell was subjected at first to a charging for 10 hours with a current of 100 mA per 1 g of the hydrogen-absorbing alloy, and, after 10 minute cessation, discharged with a current of 20 mA per 1 g of the hydrogen-absorbing alloy until the voltage (with respect to a mercury oxide electrode) was decreased down to −0.5V. This charge/discharge cycle was repeated so as to measure the maximum discharge capacity during this charge/discharge cycle. At the same time, the charge/discharge cycle life thereof was measured. The results of this test are shown in the following Tables 27 and 28.

TABLE 27

|  | Hydrogen absorbing alloy | Intensity ratio ($I_1/I_2$) | Hydrogen absorption rate (H/M · h$^{-1}$) | Discharge capacity (mAh/g) |
|---|---|---|---|---|
| Comparative Example 74 | $Ma_{0.6}L_{0.4}Ni_3$ | 0.28 | 0.21 | 100 |
| Comparative Example 75 | $Mg_{0.5}La_{0.5}Ni_3$ | 0.23 | 0.35 | 150 |
| Comparative Example 76 | $Mg_{0.45}La_{0.55}Ni_3$ (As cast) | 0.32 | 0.15 | 95 |
| Comparative Example 77 | $Mg_{0.4}L_{0.6}Ni_{3.1}$ (As cast) | 0.28 | 0.23 | 105 |
| Comparative Example 78 | $Mg_{0.65}La_{0.15}Al_{0.25}Ni_{3.2}$ | 0.31 | 0.17 | 101 |
| Comparative Example 79 | $Mg_{0.35}La_{0.55}Ag_{0.1}Ni_{3.1}$ (As cast) | 0.25 | 0.33 | 122 |
| Example 138 | $Mg_{0.45}La_{0.55}Ni_3$ | 0.14 | 0.75 | 250 |
| Example 139 | $Mg_{0.4}La_{0.6}Ni_{3.1}$ | 0.10 | 0.85 | 299 |
| Example 140 | $Mg_{0.3}La_{0.7}Ni_{3.3}$ | 0.05 | 1.10 | 405 |
| Example 141 | $Mg_{0.25}La_{0.7}Al_{0.05}Ni_{3.2}$ | 0.03 | 1.10 | 437 |
| Example 142 | $Mg_{0.35}L_{0.55}Ag_{0.1}Ni_{3.1}$ | 0.10 | 1.00 | 405 |
| Example 143 | $Mg_{0.25}Y_{0.65}V_{0.05}Mo_{0.05}Ni_{3.3}$ | 0.09 | 1.00 | 411 |

TABLE 28

|  | Hydrogen absorbing alloy | Intensity ratio ($I_1/I_2$) | Hydrogen absorption rate (H/M · h$^{-1}$) | Discharge capacity (mAh/g) |
| --- | --- | --- | --- | --- |
| Example 144 | $Ma_{0.34}La_{0.5}Mm_{0.06}Nb_{0.05}Sn_{0.05}Ni_{2.8}$ | 0.13 | 0.90 | 367 |
| Example 145 | $Mg_{0.2}Lm_{0.7}Si_{0.05}Ga_{0.05}Ni_{3.5}$ | 0.13 | 0.80 | 371 |
| Example 146 | $Mg_{0.3}La_{0.7}Ni_{2.5}Co_{0.6}$ | 0.06 | 1.10 | 410 |
| Example 147 | $Mg_{0.2}La_{0.8}Ni_{2.5}Cu_{1.5}$ | 0.13 | 0.80 | 370 |
| Example 148 | $Mg_{0.35}Lm_{0.5}Gd_{0.15}Ni_{2.6}Fe_{0.6}$ | 0.11 | 0.90 | 388 |
| Example 149 | $Mg_{0.4}La_{0.4}Ce_{0.2}Ni_{2.9}Cr_{0.3}Zn_{0.1}$ | 0.12 | 0.80 | 275 |
| Example 150 | $Mg_{0.3}La_{0.6}Al_{0.1}Ni_{2.5}Co_{0.7}$ | 0.13 | 0.80 | 374 |
| Example 151 | $Mg_{0.15}La_{0.4}Sm_{0.35}Pb_{0.05}C_{0.05}Ni_{2.9}Cr_{0.9}$ | 0.10 | 0.80 | 257 |
| Example 152 | $Mg_{0.15}Lm_{0.6}Nd_{0.1}Ta_{0.05}Ge_{0.07}B_{0.03}Ni_{2.5}Fe_{1.5}$ | 0.11 | 0.70 | 221 |
| Example 153 | $Mg_{0.25}Ca_{0.65}In_{0.05}P_{0.05}Ni_{2.9}Cu_{1.1}Zn_{0.3}$ | 0.09 | 1.00 | 419 |

As apparent from Tables 27 and 28, the hydrogen-absorbing alloys of Examples 138 to 153 having a composition represented by the aforementioned general formula (3) and exhibiting less than 0.15 in intensity ratio ($I_1/I_2$) indicated more excellent hydrogen absorption property as compared with the hydrogen-absorbing alloys of Comparative Examples 74 to 78.

It will be also seen that the secondary batteries of Examples 138 to 153 each comprising a negative electrode containing these hydrogen-absorbing alloys are greatly excellent in both discharge capacity per unit weight and charge/discharge property as compared with the secondary batteries of Comparative Examples 74 to 79.

In particular, it will be seen that the hydrogen-absorbing alloy of Example 142 is more excellent in hydrogen absorption rate as well as in the discharge capacity per unit weight as compared with the hydrogen-absorbing alloy of Comparative Example 79 having the same composition as that of Example 275.

EXAMPLES 154 to 171 and

Comparative Examples 80 and 81

Each element was weighed so as to obtain the compositions shown in the following Table 29, and the resultant compositions were melted in a high frequency induction furnace filled with an argon gas atmosphere, thereby preparing the ingots of hydrogen-absorbing alloys. Then, each of these ingots was heat-treated in an argon gas atmosphere at a temperature of 950° C. for 5 hours, which was further followed by an additional heat treatment at a temperature of 800° C. for 20 hours, thereby obtaining the hydrogen-absorbing alloys of Examples 154 to 171 and Comparative Examples 80 and 81.

By the way, the Lm in the Table 29 was formed of a composition of: La=90 at. %, Ce=2 at. %, Pr=2 at. %, and Nd=6 at. %. Likewise, the Mm was formed of a composition of: La=45 at. %, Ce=50.3 at. %, Pr=1 at. %, Nd=3.5 at. %, and Sm=0.2 at. %.

The hydrogen-absorbing alloy ingot was pulverized in an argon gas atmosphere so as to obtain powders having an average particle diameter of 45 μm. Then, 100 parts by weight of the hydrogen-absorbing alloy powder was mixed with 0.5 part by weight of nickel powder which was prepared by means of carbonyl process and available in the market and with 0.5 part by weight of Ketjen Black, thereby to obtain a mixture. Thereafter, to 100 parts by weight of this mixture was added 1 part by weight of styrene-butadiene rubber (SBR), 0.2 part by weight of sodium polyacrylate, 0.2 part by weight of carboxymethylcellulose and 50 parts by weight of water to obtain a mixture which was then agitated, thereby to obtain a paste. The paste was then coated on an iron porous thin plate covered with a nickel plating, and dried to obtain a coated plate. The thickness of this coated layer on the plate was adjusted by roll pressing, the resultant plate being cut into a predetermined size thereby to obtain a negative electrode containing 3.2 g of the hydrogen-absorbing alloy.

This negative electrode and a pasted nickel positive electrode having a nominal capacity of 650 mAh and manufactured according to known technique were spirally wound with a separator being interposed therebetween thereby to obtain an electrode group. By the way, as for the separator, a polyolefin non-woven fabric graft-copolymerized with acrylic monomer was employed.

Then, this electrode group and 1.5 mL of an electrolyte containing 7 mol/cm$^3$ of KOH and 1.0 mol/cm$^3$ of LiOH were placed and sealed in a closed-end cylindrical case thereby assembling an AAA size cylindrical nickel-hydrogen secondary battery having a nominal capacity of 650 mAh.

Then, the secondary batteries of Examples 154–171 and Comparative Examples 80 and 81 were subjected to a charge/discharge test after being left to stand at room temperature for 24 hours as follows. Namely, each of the secondary batteries was subjected to the charge/discharge cycle four times wherein these batteries were charged with a current of 65 mA for 15 hours, followed by the discharging thereof with 65 mA until the voltage was lowered down to 0.7V.

Thereafter, the charge/discharge cycle was repeated in an environment of 45° C. until the discharge capacity thereof was lowered to 80% or less of the discharge capacity of the first charge/discharge cycle, at which moment the number of the charge/discharge cycle was measured. The number of the charge/discharge cycle and the discharge capacity of the first charge/discharge cycle are shown in the following Table 29. By the way, the charging step in this charge/discharge cycle was performed by way of −ΔV method wherein the charging current was set to 650 mA and the charging was terminated when the voltage was lowered by 10 mV from the maximum charge voltage. On the other hand, the discharging in this charge/discharge cycle was continued using a current of 1300 mA until the voltage of the battery was reduced to 1.0V.

Further, the intensity ratio ($I_1/I_2$) of each of the hydrogen-absorbing alloys of Examples 154 to 171 and Comparative Examples 80 and 81 was measured in the same manner as explained with reference to Example 138, the results being shown in the following Table 30. Additionally, each hydrogen-absorbing alloys was tested to measure a rechargeable hydrogen storage capacity (JIS H7003: Term for Hydrogen Absorbing Alloy) from the iso-thermal line of pressure-composition which was measured under a hydrogen pressure of less than 10 atm. at a temperature of 60° C. by making use of Sievert's method (JIS H7201). The results are shown in Table 30.

discharge cycle life as compared with the secondary batteries of Comparative Examples 80 and 81.

EXAMPLES 172 to 182 and

Comparative Examples 82 to 87

Each element was weighed so as to obtain the compositions shown in the following Tables 31 and 33, and the resultant compositions were melted in a high frequency induction furnace filled with an argon gas atmosphere, thereby preparing the ingots of hydrogen-absorbing alloys. Then, each of these ingots was heat-treated in an argon gas atmosphere under the conditions shown below, thereby obtaining the hydrogen-absorbing alloys of Examples 172 to 182 and Comparative Examples 82 to 87.

(Conditions for the Heat Treatment)

In Examples 172 to 178 and Comparative Examples 82 to 87, the treatment temperature was set to 945° C., and the treatment time was set to 8 hours.

In Example 179, the treatment temperature was set to 985° C., and the treatment time was set to 5 hours.

In Example 180, the treatment temperature was set to 990° C., and the treatment time was set to 4 hours.

In Example 181, the treatment temperature was set to 970° C., and the treatment time was set to 6 hours.

In Example 182, the treatment temperature was set to 1020° C., and the treatment time was set to 3 hours.

The hydrogen-absorbing alloy ingot was pulverized in an argon gas atmosphere so as to obtain powders having an average particle diameter of 65 μm. Then, 100 parts by weight of the hydrogen-absorbing alloy powder was mixed with 0.5 part by weight of nickel powder which was prepared by means of carbonyl process and available in the market and with 0.5 part by weight of Ketjen Black, thereby to obtain a mixture. Thereafter, to 100 parts by weight of this mixture was added 1 part by weight of polytetrafluoroethylene (PTFE), 0.2 part by weight of sodium polyacrylate, 0.2 part by weight of carboxymethylcellulose and 50 parts by weight of water to obtain a mixture which was then agitated, thereby to obtain a paste. The paste was then coated on an iron porous thin plate covered with a nickel plating, and dried to obtain a coated plate. The thickness of this coated

TABLE 29

| | Composition | Capacity (mAh/g) | Cycle life |
|---|---|---|---|
| Example 154 | $Lm_{0.77}Mg_{0.23}Ni_{3.32}Al_{0.09}$ | 381 | 322 |
| Example 155 | $La_{0.63}Nd_{0.14}Mg_{0.23}Ni_{3.28}Mn_{0.02}Si_{0.01}$ | 374 | 218 |
| Example 156 | $La_{0.55}Pr_{0.2}Mg_{0.23}Ni_{3.21}Co_{0.1}Fe_{0.01}Al_{0.08}$ | 385 | 262 |
| Example 157 | $Lm_{0.77}Mg_{0.23}Ni_{3.29}Al_{0.11}W_{0.01}$ | 383 | 312 |
| Example 158 | $Lm_{0.8}Mg_{0.2}Ni_{3.38}Co_{0.05}Mn_{0.02}Al_{0.11}Mo_{0.01}$ | 381 | 243 |
| Example 159 | $La_{0.77}Ce_{0.03}Mg_{0.2}Ni_{3.5}Zn_{0.02}Al_{0.12}$ | 368 | 267 |
| Example 160 | $La_{0.74}Y_{0.08}Mg_{0.18}Ni_{3.45}Co_{0.08}Sn_{0.02}$ | 372 | 262 |
| Example 161 | $Lm_{0.7}Mg_{0.3}Ni_{3.15}Cu_{0.05}Al_{0.06}Li_{0.01}$ | 388 | 248 |
| Example 162 | $Lm_{0.74}Mg_{0.26}Ni_{3.25}Co_{0.05}Ta_{0.01}B_{0.01}Al_{0.08}$ | 387 | 272 |
| Example 163 | $Lm_{0.69}Mm_{0.07}Mg_{0.24}Ni_{3.2}Al_{0.12}Ga_{0.02}$ | 374 | 292 |
| Example 164 | $Lm_{0.66}Mm_{0.11}Mg_{0.23}Ni_{3.3}Co_{0.03}Mn_{0.01}V_{0.02}Al_{0.1}$ | 378 | 228 |
| Example 165 | $Lm_{0.74}Ca_{0.01}Mg_{0.25}Ni_{3.3}Cr_{0.01}Al_{0.07}$ | 396 | 292 |
| Example 166 | $Lm_{0.76}Zr_{0.02}Mg_{0.22}Ni_{3.28}P_{0.01}Al_{0.11}$ | 383 | 297 |
| Example 167 | $Lm_{0.77}Ti_{0.01}Mg_{0.22}Ni_{3.3}Al_{0.12}S_{0.01}$ | 378 | 307 |
| Example 168 | $Lm_{0.77}Mg_{0.23}Ni_{3.23}Al_{0.12}$ | 374 | 302 |
| Example 169 | $Lm_{0.72}Mm_{0.06}Mg_{0.22}Ni_{3.3}Co_{0.02}Mn_{0.01}Sn_{0.02}Al_{0.07}$ | 376 | 282 |
| Example 170 | $Lm_{0.77}Mg_{0.23}Ni_{3.13}Co_{0.2}Mn_{0.02}Al_{0.12}$ | 372 | 228 |
| Example 171 | $Lm_{0.72}Mm_{0.06}Mg_{0.22}Ni_{3.1}Co_{0.2}Mn_{0.03}Nb_{0.02}Al_{0.07}$ | 370 | 218 |
| Comparative Example 80 | $La_{0.5}Mg_{0.5}Ni_{4.7}$ | 250 | 25 |
| Comparative Example 81 | $La_{0.35}Mg_{0.65}Ni_{3.1}$ | 200 | 20 |

TABLE 30

| | Intensity ratio ($I_1/I_2$) | Rechargeable hydrogen storage capacity (H/M) |
|---|---|---|
| Example 154 | 0.002 | 1.02 |
| Example 155 | 0 | 0.95 |
| Example 156 | 0.004 | 1.01 |
| Example 157 | 0.01 | 0.97 |
| Example 158 | 0 | 0.99 |
| Example 159 | 0.006 | 0.95 |
| Example 160 | 0.009 | 1.03 |
| Example 161 | 0.013 | 1.01 |
| Example 162 | 0.01 | 0.98 |
| Example 163 | 0.002 | 0.93 |
| Example 164 | 0.008 | 0.94 |
| Example 165 | 0.002 | 0.92 |
| Example 166 | 0.01 | 0.96 |
| Example 167 | 0 | 0.94 |
| Example 168 | 0.003 | 0.97 |
| Example 169 | 0.007 | 0.98 |
| Example 170 | 0.002 | 0.93 |
| Example 171 | 0.01 | 0.91 |
| Comparative Example 80 | 0.27 | 0.13 |
| Comparative Example 81 | 0.32 | 0.14 |

As apparent from Tables 29 and 30, the hydrogen-absorbing alloys of Examples 154 to 171 having a composition represented by the aforementioned general formula (3) and exhibiting less than 0.15 in intensity ratio ($I_1/I_2$) indicated more excellent rechargeable hydrogen storage capacity as compared with the hydrogen-absorbing alloys of Comparative Examples 80 and 81.

It will be also seen that the nickel-hydrogen secondary batteries of Examples 154 to 171 are greatly excellent in both initial discharge capacity per unit weight and charge/ layer on the plate was adjusted by roll pressing, the resultant plate being cut into a predetermined size thereby to obtain a negative electrode containing 7 g of the hydrogen-absorbing alloy.

This negative electrode and a pasted nickel positive electrode having a nominal capacity of 1500 mAh and manufactured according to known technique were spirally wound with a separator being interposed therebetween thereby to obtain an electrode group. By the way, as for the separator, a polyolefin non-woven fabric graft-copolymerized with acrylic monomer was employed.

Then, this electrode group and 2.4 mL of an electrolyte containing 7 mol/cm$^3$ of KOH and 1.0 mol/cm$^3$ of LiOH were placed and sealed in a closed-end cylindrical case thereby assembling an AAA size cylindrical nickel-hydrogen secondary battery having a nominal capacity of 1500 mAh.

Then, the secondary batteries of Examples 172 to 182 and Comparative Examples 82 to 87 were subjected to a charge/discharge test after being left to stand at room temperature for 24 hours as follows. Namely, each of the secondary batteries was subjected to the charge/discharge cycle four times wherein these batteries were charged with a current of 150 mA for 15 hours, followed by the discharging thereof with 150 mA until the voltage was lowered down to 0.8V.

Thereafter, the charge/discharge cycle was repeated 50 times in an environment of 25° C. Then, the internal impedance was measured, the results being shown in the following Table 31. By the way, the charging step in this charge/discharge cycle was performed by way of –ΔV method wherein the charging current was set to 1500 mA and the charging was terminated when the voltage was lowered by 10 mV from the maximum charge voltage. On the other hand, the discharging in this charge/discharge cycle was continued using a current of 3000 mA until the voltage of the battery was reduced to 1.0V. Thereafter, the battery was stored for two days at a temperature of 80° C., and then, the charge/discharge cycle was again repeated 50 times at a temperature of 25° C. and at the same conditions as mentioned above. Upon finishing this 50 times of repetition of charge/discharge cycle, the internal impedance was measured, the results being shown in the following Table 31. Furthermore, the battery was again stored for two days at a temperature of 80° C., and then, the charge/discharge cycle was again repeated 50 times at a temperature of 25° C. and at the same conditions as mentioned above.

Upon finishing this 50 times of repetition of charge/discharge cycle, the internal impedance was measured, the results being shown in the following Table 31. Additionally, the battery was again stored for two days at a temperature of 80° C., and then, the charge/discharge cycle was again repeated 50 times at a temperature of 25° C. and at the same conditions as mentioned above. Upon finishing this 50 times of repetition of charge/discharge cycle, the internal impedance was measured, the results being shown in the following Table 31.

Further, the crystal system of the principal phase, the areal ratio of the principal phase and the rechargeable hydrogen storage capacity of the hydrogen-absorbing alloys of Examples 172 to 182 and Comparative Examples 82 to 87 were measured in the same manner as in Example 94, the results being shown in the following Table 32.

By the way, the hydrogen-absorbing alloys of Examples 179 and 180 contained, as a principal phase, a phase having a crystal structure which was similar to the $Ce_2Ni_7$ type structure. Specifically, the alloy of Example 179 indicated a highest peak in 2θ of 42.1°±1°, in an X-ray diffraction using CuKα-ray, and the intensity ratio thereof as represented by the following formula (I) was 21%. On the other hand, the alloy of Example 180 indicated a highest peak in 2θ of=42.1±1°, in an X-ray diffraction using CuKα-ray, and peak appeared in 2θ of 31° to 34° was found as being split into two.

On the other hand, the hydrogen-absorbing alloys of Examples 181 and 182 contained, as a principal phase, a phase having a crystal structure which was similar to the $PuNi_3$ type structure. Specifically, the alloy of Example 181 indicated a highest peak in 2θ of 42.1°±1°, in an X-ray diffraction using CuKα-ray, and the intensity ratio thereof as represented by the above formula (I) was 16%. On the other hand, the alloy of Example 182 indicated a highest peak in 2θ of 42.1°±1°, in an X-ray diffraction using CuKα-ray, and the peak appeared in 2θ of 31° to 34° was found as being split into three.

TABLE 31

|  | Composition | Internal impedance (mΩ) | | | |
|---|---|---|---|---|---|
|  |  | 50 cycles | 100 cycles | 150 cycles | 200 cycles |
| Example 172 | $(La_{0.97}Ce_{0.01}Pr_{0.01}Nd_{0.01})_{0.77}Mg_{0.23}Ni_{3.19}Al_{0.09}Co_{0.02}P_{0.01}$ | 22 | 21 | 25 | 31 |
| Example 173 | $(La_{0.47}Ce_{0.03}Pr_{0.12}Nd_{0.38})_{0.8}Mg_{0.2}Ni_{3.2}Al_{0.1}Co_{0.03}Fe_{0.01}Ti_{0.01}$ | 25 | 23 | 24 | 41 |
| Example 174 | $(La_{0.97}Ce_{0.01}Pr_{0.01}Nd_{0.01})_{0.78}Mg_{0.22}Ni_{3.31}Al_{0.11}$ | 22 | 21 | 22 | 35 |
| Example 175 | $(La_{0.47}Ce_{0.03}Pr_{0.12}Nd_{0.38})_{0.76}Mg_{0.24}Ni_{3.25}Al_{0.08}Cu_{0.01}B_{0.01}$ | 24 | 24 | 25 | 38 |
| Example 176 | $(La_{0.49}Ce_{0.01}Pr_{0.10}Nd_{0.40})_{0.74}Mg_{0.26}Ni_{3.17}Al_{0.07}Nb_{0.01}Zn_{0.01}$ | 25 | 25 | 27 | 47 |
| Example 177 | $(La_{0.89}Ce_{0.01}Pr_{0.01}Nd_{0.09})_{0.78}Mg_{0.22}Ni_{3.19}Al_{0.14}Co_{0.19}Sn_{0.01}Cu_{0.01}$ | 26 | 25 | 26 | 63 |
| Example 178 | $(La_{0.88}Ce_{0.01}Pr_{0.08}Nd_{0.03})_{0.79}Mg_{0.21}Ni_{3.35}Al_{0.1}Cr_{0.01}S_{0.01}$ | 22 | 22 | 24 | 43 |
| Example 179 | $(La_{0.48}Ce_{0.03}Pr_{0.10}Nd_{0.39})_{0.76}Mg_{0.24}Ni_{3.05}Al_{0.07}Co_{0.05}W_{0.01}Si_{0.01}Mo_{0.01}$ | 25 | 24 | 24 | 55 |
| Example 180 | $(La_{0.93}Ce_{0.01}Pr_{0.01}Nd_{0.05})_{0.75}Mg_{0.25}Ni_{3.28}Al_{0.08}Co_{0.02}In_{0.01}V_{0.01}$ | 25 | 22 | 23 | 43 |
| Example 181 | $(La_{0.49}Ce_{0.02}Pr_{0.15}Nd_{0.34})_{0.82}Mg_{0.18}Ni_{3.38}Al_{0.09}Ga_{0.01}Zr_{0.01}$ | 24 | 21 | 25 | 49 |
| Example 182 | $(La_{0.98}Nd_{0.01}Y_{0.01})_{0.77}Mg_{0.23}Ni_{3.15}Al_{0.08}Mn_{0.01}N_{0.01}$ | 26 | 24 | 24 | 40 |
| Comparative Example 82 | $(La_{0.97}Ce_{0.01}Pr_{0.01}Nd_{0.01})_{0.70}Mg_{0.30}Ni_{2.53}Al_{0.4}Co_{0.20}$ | 48 | 130 | 290 | — |
| Comparative Example 83 | $(La_{0.47}Ce_{0.03}Pr_{0.12}Nd_{0.38})_{0.72}Mg_{0.28}Ni_{3.7}Al_{0.25}Co_{0.3}Cu_{0.01}Fe_{0.01}$ | 37 | 96 | 230 | — |
| Comparative Example 84 | $(La_{0.47}Ce_{0.13}Pr_{0.20}Nd_{0.20})_{0.9}Mg_{0.1}Ni_{2.75}Co_{0.25}Cr_{0.20}$ | 42 | 110 | 245 | — |
| Comparative Example 85 | $(La_{0.88}Ce_{0.03}Pr_{0.01}Nd_{0.08})_{0.45}Mg_{0.55}Ni_{3.1}Al_{0.15}Cu_{0.01}Si_{0.01}$ | 78 | 23 | — | — |
| Comparative | $(La_{0.94}Ce_{0.01}Pr_{0.01}Nd_{0.04})_{0.78}Mg_{0.22}Ni_{1.6}Mn_{0.05}Co_{1.5}Al_{0.01}$ | 64 | 190 | — | — |

TABLE 31-continued

|  | | Internal impedance (mΩ) | | | |
|---|---|---|---|---|---|
| | Composition | 50 cycles | 100 cycles | 150 cycles | 200 cycles |
| Example 86 Comparative Example 87 | $(La_{0.3}Ce_{0.5}Pr_{0.05}Nd_{0.13}Sm_{0.02})_{0.975}Mg_{0.025}Ni_{2.925}Mn_{0.35}Cu_{0.1}Nb_{0.075}$ | 50 | 130 | 270 | — |

TABLE 32

| | Crystal structure of principal phase | Areal ratio of principal phase | Rechargeable hydrogen storage capacity (H/M) |
|---|---|---|---|
| Example 172 | $Ce_2Ni_7$ type | 92% | 1.03 |
| Example 173 | $Ce_2Ni_7$ type + $PuNi_3$ type | 84% | 1.02 |
| Example 174 | $Ce_2Ni_7$ type + $CeNi_3$ type | 88% | 1.06 |
| Example 175 | $Ce_2Ni_7$ type | 91% | 1.05 |
| Example 176 | $Ce_2Ni_7$ type | 94% | 0.98 |
| Example 177 | $Ce_2Ni_7$ type + $PuNi_3$ type | 89% | 1.03 |
| Example 178 | $Ce_2Ni_7$ type | 88% | 0.92 |
| Example 179 | Similar to $Ce_2Ni_7$ type | 90% | 1.01 |
| Example 180 | Similar to $Ce_2Ni_7$ type | 92% | 1.05 |
| Example 181 | Similar to $PuNi_3$ type | 86% | 1.03 |
| Example 182 | Similar to $PuNi_3$ type | 84% | 1.05 |
| Comparative Example 82 | $CaCu_5$ type | 63% | 0.52 |
| Comparative Example 83 | $CaCu_5$ type | 61% | 0.47 |
| Comparative Example 84 | $PuNi_3$ type | 67% | 0.35 |
| Comparative Example 85 | $CaCu_5$ type | 55% | 0.24 |
| Comparative Example 86 | $MgCu_2$ type | 52% | 0.22 |
| Comparative Example 87 | $Ce_2Ni_7$ type | 83% | 0.53 |

TABLE 33

| | Ce content in the R of the alloy | La content in the R of the alloy |
|---|---|---|
| Example 172 | 1 wt % | 97 at % |
| Example 173 | 3 wt % | 47 at % |
| Example 174 | 1 wt % | 97 at % |
| Example 175 | 3 wt % | 47 at % |
| Example 176 | 1 wt % | 49 at % |
| Example 177 | 1 wt % | 89 at % |
| Example 178 | 1 wt % | 88 at % |
| Example 179 | 3 wt % | 48 at % |
| Example 180 | 1 wt % | 93 at % |
| Example 181 | 2 wt % | 49 at % |
| Example 182 | 0 wt % | 98 at % |
| Comparative Example 82 | 1 wt % | 97 at % |
| Comparative Example 83 | 3 wt % | 47 at % |
| Comparative Example 84 | 13 wt % | 47 at % |
| Comparative Example 85 | 3 wt % | 88 at % |
| Comparative Example 86 | 1 wt % | 94 at % |
| Comparative Example 87 | 50 wt % | 30 at % |

As apparent from Tables 31 to 33, the hydrogen-absorbing alloys of Examples 172 to 182 which had a composition represented by the general formula (4) indicated a higher rechargeable hydrogen storage capacity as compared with the hydrogen-absorbing alloys of Comparative Examples 82 to 87. By the way, the hydrogen-absorbing alloy of Comparative Example 87 was of the kind where the atomic ratio of Mn was 0.135 or more, which corresponds to the hydrogen-absorbing alloy disclosed in the aforementioned Japanese Patent Unexamined Publication H11-29832.

It will be also seen that the secondary batteries of Examples 172 to 182 are smaller in internal impedance as compared with the secondary batteries of Comparative Examples 82 to 87.

As explained above, it is possible according to this invention to provide a hydrogen-absorbing alloy, which is capable of inhibiting the corrosion that might be caused due to the effect of an alkaline aqueous solution such as an alkaline electrolyte, and capable of improving the hydrogen storage capacity.

It is possible according to this invention to provide a secondary battery which is large in capacity and excellent in charge/discharge life.

It is possible according to this invention to provide a hybrid car and an electromobile, which are excellent in traveling performance such as fuel consumption, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydrogen-absorbing alloy comprising at least one kind of phase selected from the group consisting of a first phase having a hexagonal crystal system (excluding a phase having a CaCu$_5$ type crystal structure) and a second phase having a rhombohedral crystal system, an areal ratio of said at least one kind of phase of said hydrogen-absorbing alloy being 50% or more, said hydrogen-absorbing alloy having a composition represented by the following general formula (1):

$$R_{1-a-b}Mg_aT_bNi_{Z-X-Y-\alpha}M1_XM2_YMn_\alpha \quad (1)$$

wherein R is at least one kind of element selected from rare earth elements, T is at least one element selected from the group consisting of Ca, Ti, Zr and Hf; M1 is at least one element selected from the group consisting of Co and Fe; M2 is at least one element selected from the group consisting of Al, Ga, Zn, Sn, Cu, Si, B, Nb, W, Mo, V, Cr, Ta, Li, P and S; and the atomic ratios of a, b, X, Y, $\alpha$ and Z are respectively a number satisfying the conditions of: $0.15 \leq a \leq 0.37$, $0 \leq b \leq 0.3$, $0 \leq X \leq 1.3$, $0 \leq Y \leq 0.5$, $0 \leq \alpha < 0.135$, and $3.0 \leq Z \leq 4.2$.

2. The hydrogen-absorbing alloy according to claim 1, wherein said first phase is constituted by a phase having Ce$_2$Ni$_7$ type crystal structure, a phase having CeNi$_3$ type crystal structure and a phase having a crystal structure which is similar to Ce$_2$Ni$_7$ or CeNi$_3$ type structure.

3. The hydrogen-absorbing alloy according to claim 2, wherein said phase having a crystal structure which is similar to Ce$_2$Ni$_7$ or CeNi$_3$ type structure, and which exhibits a highest peak within 2θ of 42.1±1° in the X-ray diffraction pattern using CuKα-ray, and an intensity ratio represented by the formula (I) below of 80% or less:

$$I_3/I_4 \quad (I)$$

wherein I$_4$ represents an intensity of the highest peak, and I$_3$ is an intensity of a peak appearing within 2θ of 31 to 34° in the X-ray diffraction.

4. The hydrogen-absorbing alloy according to claim 2, wherein said phase having a crystal structure which is similar to Ce$_2$Ni$_7$ or CeNi$_3$ type structure, and which exhibits a highest peak within 2θ of 42.1±1° in the X-ray diffraction pattern using CuKα-ray, and a peak appearing within 2θ of 31 to 34°, which is split into two or more.

5. The hydrogen-absorbing alloy according to claim 1, wherein said second phase is constituted by a phase having Gd$_2$Co$_7$ type crystal structure, a phase having PuNi$_3$ type crystal structure and a phase having a crystal structure which is similar to Gd$_2$Co$_7$ or PuNi$_3$ type structure.

6. The hydrogen-absorbing alloy according to claim 5, wherein said phase having a crystal structure which is similar to Gd$_2$Co$_7$ or PuNi$_3$ type structure, and which exhibits a highest peak within 2θ of 42.1±1° in the X-ray diffraction pattern using CuKα-ray, and an intensity ratio represented by the formula (I) below, of 80% or less:

$$I_3/I_4 \quad (I)$$

wherein I$_4$ represents an intensity of the highest peak, and I$_3$ is an intensity of a peak appearing within 2θ of 31 to 34° in the X-ray diffraction.

7. The hydrogen-absorbing alloy according to claim 5, wherein said phase having a crystal structure which is similar to Gd$_2$Co$_7$ or PuNi$_3$ type structure, and which exhibits a highest peak within 2θ of 42.1±1° in the X-ray diffraction pattern using CuKα-ray, and a peak appearing within 2θ of 31 to 34°, which is split into two or more.

8. The hydrogen-absorbing alloy according to claim 1, wherein the atomic ratios of a, X, Y and Z are respectively selected to satisfy the conditions of: $15 \leq a \leq 0.35$, $0 \leq X \leq 0.3$, $0 \leq Y \leq 0.3$, and $3.0 \leq Z \leq 4$.

9. The hydrogen-absorbing alloy according to claim 1, wherein the areal ratio of said at least one kind of phase is 70% or more.

10. The hydrogen-absorbing alloy according to claim 1, wherein said R contains La, and an La content in said R is 70% or more by weight.

11. A secondary battery which comprises a positive electrode, a negative electrode comprising a hydrogen-absorbing alloy, and an alkaline electrolyte;

wherein said hydrogen-absorbing alloy comprises at least one kind of phase selected from the group consisting of a first phase having a hexagonal crystal system (excluding a phase having a CaCu$_5$ type crystal structure) and a second phase having a rhombohedral crystal system; an areal ratio of said at least one kind of phase of said hydrogen-absorbing alloy being 50% or more, and said hydrogen-absorbing alloy has a composition represented by the following general formula (1):

$$R_{1-a-b}Mg_aT_bNi_{Z-X-Y-\alpha}M1_XM2_YMn_\alpha \quad (1)$$

wherein R is at least one kind of element selected from rare earth elements, T is at least one element selected from the group consisting of Ca, Ti, Zr and Hf; M1 is at least one element selected from the group consisting of Co and Fe; M2 is at least one element selected from the group consisting of Al, Ga, Zn, Sn, Cu, Si, B, Nb, W, Mo, V, Cr, Ta, Li, P and S; and the atomic ratios of a, b, X, Y, $\alpha$ and Z are respectively a number satisfying the conditions of: $0.15 \leq a \leq 0.37$, $0 \leq b \leq 0.3$, $0 \leq X \leq 1.3$, $0 \leq Y \leq 0.5$, $0 \leq \alpha < 0.135$, and $3.0 \leq Z \leq 4.2$.

12. The secondary battery according to claim 11, wherein said first phase is constituted by a phase having Ce$_2$Ni$_7$ type crystal structure, a phase having CeNi$_3$ type crystal structure and a phase having a crystal structure which is similar to Ce$_2$Ni$_7$ or CeNi$_3$ type structure.

13. The secondary battery according to claim 12, wherein said phase having a crystal structure which is similar to Ce$_2$Ni$_7$ or CeNi$_3$ type structure, and which exhibits a highest peak within 2θ of 42.1±1° in the X-ray diffraction pattern using CuKα-ray, and an intensity ratio represented by the formula (I) below, of 80% or less:

$$I_3/I_4 \quad (I)$$

wherein I$_4$ represents an intensity of the highest peak, and I$_3$ is an intensity of a peak appearing within 2θ of 31 to 34° in the X-ray diffraction.

14. The secondary battery according to claim 12, wherein said phase having a crystal structure which is similar to Ce$_2$Ni$_7$ or CeNi$_3$ type structure, and which exhibits a highest peak within 2θ of 42.1±1° in the X-ray diffraction pattern using CuKα-ray, and a peak appearing within 2θ of 31 to 34°, which is split into two or more.

15. The secondary battery according to claim 11, wherein said second phase is constituted by a phase having Gd$_2$Co$_7$ type crystal structure, a phase having PuNi$_3$ type crystal structure and a phase having a crystal structure which is similar to Gd$_2$Co$_7$ or PrNi$_3$ type structure.

16. The secondary battery according to claim 15, wherein said phase having a crystal structure which is similar to Gd$_2$Co$_7$ or PuNi$_3$ type structure, and which exhibits a highest peak within 2θ of 42.1±1° in the X-ray diffraction pattern using CuKα-ray, and an intensity ratio represented by one formula (I) below, of 80% or less:

$$I_3/I_4 \quad (I)$$

wherein $I_4$ represents an intensity of the highest peak, and $I_3$ is an intensity of a peak appearing within 2θ of 31 to 34° in the X-ray diffraction.

17. The secondary battery according to claim 15, wherein said phase having a crystal structure which is similar to $Gd_2Co_7$ or $PuNi_3$ type structure, and which exhibits a highest peak within 2θ of 42.1±1° in the X-ray diffraction pattern using CuKα-ray, and a peak appearing within 2θ of 31 to 34°, which is split into two or more.

18. The secondary battery according to claim 11, wherein the atomic ratios of a, X, Y and Z are respectively selected to satisfy the conditions of: $0.15 \leq a \leq 0.35$, $0 \leq X \leq 0.3$, $0 \leq Y \leq 0.3$, and $30 \leq Z \leq 4$.

19. The secondary battery according to claim 11, wherein the areal ratio of said at least one kind of phase is 70% or more.

20. A hydrogen-absorbing alloy exhibiting less than 0.15 (including 0) in intensity ratio to be calculated according to the following formula (2) and having a composition represented by the following general formula (3):

$$I_1/I_2 \quad (2)$$

wherein $I_2$ is an intensity of a peak exhibiting a highest intensity in an X-ray diffraction using CuKα-ray; and $I_1$ is an intensity of a peak exhibiting a highest intensity within 2θ of 8 to 13°, θ being Bragg angle, in the X-ray diffraction;

$$R_{1-a-b}Mg_aT_bNi_{Z-X}M3_X \quad (3)$$

wherein R is at least one kind of element selected from rare earth elements (which include Y); T is at least one element selected from the group consisting of Ca, Ti, Zr and Hf; M3 is at least one element selected from the group consisting of Co, Mn, Fe, Al, Ga, Zn, Sn, Cu, Si, B, Nb, W, Mo, V, Cr, Ta, Li, P and S; and the atomic ratios of a, b, X and Z are respectively a number satisfying the conditions of: $0.1 \leq a \leq 0.6$, $0 \leq b \leq 0.3$, $0 \leq X \leq 2$, and $2.5 \leq Z \leq 4$.

21. The hydrogen-absorbing alloy according to claim 20, wherein said "a" and X are respectively satisfy the conditions of: $0.15 \leq a \leq 0.35$, and $0 \leq X \leq 0.5$.

22. The hydrogen-absorbing alloy according to claim 20, wherein said R includes La, and the content of La is 60 at % or more.

23. The hydrogen-absorbing alloy according to claim 20, wherein said intensity ratio is 0.05 or less (including 0).

24. A secondary battery comprises a positive electrode, a negative electrode containing a hydrogen-absorbing alloy, and an alkaline electrolyte;

wherein said hydrogen-absorbing alloy exhibits less than 0.15 (including 0) in intensity ratio to be calculated according to the aforementioned formula (2) and has a composition represented by the following general formula (3):

$$I_1/I_2 \quad (2)$$

wherein $I_2$ is an intensity of a peak exhibiting a highest intensity in an X-ray diffraction using CuKα-ray; and $I_1$ is an intensity of a peak exhibiting a highest intensity within 2θ of 8 to 13°, θ being Bragg angle, in the X-ray diffraction;

$$R_{1-a-b}Mg_aT_bNi_{Z-X}M3_X \quad (3)$$

wherein R is at least one kind of element selected from rare earth elements (which include Y); T is at least one element selected from the group consisting of Ca, Ti, Zr and Hf; M3 is at least one element selected from the group consisting of Co, Mn, Fe, Al, Ga, Zn, Sn, Cu, Si, B, Nb, W, Mo, V, Cr, Ta, Li, P and S; and the atomic ratios of a, b, X and Z are respectively a number satisfying the conditions of: $0.1 \leq a \leq 0.6$, $0 \leq b \leq 0.3$, $0 \leq X \leq 2$, and $2.5 \leq Z \leq 4$.

25. The secondary battery according to claim 24, wherein said "a" and X respectively satisfy the conditions of: $0.15 \leq a \leq 0.35$, and $0 \leq X \leq 0.5$.

26. The secondary battery according to claim 24, wherein said R includes La, and the content of La is 60 at % or more.

27. The secondary battery according to claim 24, wherein said intensity ratio is 0.05 or less (including 0).

* * * * *